(12) United States Patent
Butts, Jr.

(10) Patent No.: US 9,751,399 B1
(45) Date of Patent: Sep. 5, 2017

(54) APPARATUSES, METHODS, AND SYSTEMS FOR THE DISPOSITION OF FUEL TANKS ON LONG-HAUL TRUCKS

(71) Applicant: Jesse James Butts, Jr., Rancho Mirage, CA (US)

(72) Inventor: Jesse James Butts, Jr., Rancho Mirage, CA (US)

(73) Assignee: Jesse James Butts, Jr.

( * ) Notice: Subject to any disclaimer, the term of this patent is extended or adjusted under 35 U.S.C. 154(b) by 0 days.

(21) Appl. No.: 14/944,135

(22) Filed: Nov. 17, 2015

Related U.S. Application Data

(60) Provisional application No. 62/080,815, filed on Nov. 17, 2014, provisional application No. 62/220,765, filed on Sep. 18, 2015.

(51) Int. Cl.
*B60K 15/07* (2006.01)
*B60K 15/067* (2006.01)
*B60K 15/073* (2006.01)
*G05D 3/12* (2006.01)
*B60K 15/03* (2006.01)

(52) U.S. Cl.
CPC .......... *B60K 15/067* (2013.01); *B60K 15/073* (2013.01); *G05D 3/12* (2013.01); *B60K 2015/0319* (2013.01)

(58) Field of Classification Search
CPC .............................................. B60K 2015/0675
See application file for complete search history.

(56) References Cited

U.S. PATENT DOCUMENTS

| | | | | |
|---|---|---|---|---|
| 4,025,080 A | * | 5/1977 | Gedeon | B60K 15/07 224/401 |
| 4,059,281 A | * | 11/1977 | Evans | B60K 15/07 180/69.2 |
| 4,770,428 A | * | 9/1988 | Sugiyama | F17C 13/085 224/401 |
| 5,806,892 A | * | 9/1998 | Colburn | B60K 15/067 224/401 |
| 5,845,940 A | * | 12/1998 | Colburn | B60K 15/067 280/830 |
| 6,676,163 B2 | * | 1/2004 | Joitescu | B60K 15/07 280/834 |
| 7,621,565 B2 | * | 11/2009 | Ross, Jr. | B60K 15/07 248/240 |
| 8,469,402 B2 | * | 6/2013 | Minoura | A01D 34/82 280/830 |

(Continued)

*Primary Examiner* — Rami Khatib
*Assistant Examiner* — Navid Ziaeianmehdizadeh
(74) *Attorney, Agent, or Firm* — Cooley LLP

(57) ABSTRACT

CNG and/or other types of fuel can be placed in the space between the tractor and the front of the trailer or internal to the cargo volume of the trailer. The tanks can be mounted permanently on the front of the trailer or they could reside on the tractor and be transferred to the front of the trailer after hook up. After the tractor hooks up to a trailer, the tanks are lifted up via two jacks operating at two lift points near the top at each end of the tank module framework, the tanks are then translated backward by a single actuator operating on the midpoint of the horizontal jack support beam which is riding on the tractor frame rails. Then the tanks are lowered to rest on detachable cantilevers attached to the steel understructure near the front of the trailer.

27 Claims, 71 Drawing Sheets

(56) References Cited

U.S. PATENT DOCUMENTS

| | | | |
|---|---|---|---|
| 8,820,289 B2* | 9/2014 | Green | F02M 21/0224 123/195 C |
| 9,248,736 B2* | 2/2016 | Green | B60K 15/063 |
| 2002/0121772 A1* | 9/2002 | Koster | B60K 1/04 280/830 |
| 2005/0121572 A1* | 6/2005 | Mascarenhas | B66F 9/07518 248/218.4 |
| 2007/0119646 A1* | 5/2007 | Minami | B60K 15/067 180/271 |
| 2008/0023957 A1* | 1/2008 | Diehl | B60K 15/07 280/834 |
| 2009/0152043 A1* | 6/2009 | Lee | B60K 15/07 180/314 |
| 2010/0051567 A1* | 3/2010 | Ross, Jr. | B60K 15/07 211/85.18 |
| 2010/0078244 A1* | 4/2010 | Pursifull | B60K 15/07 180/69.5 |
| 2011/0288738 A1* | 11/2011 | Donnelly | F02D 19/0697 701/99 |
| 2012/0080466 A1* | 4/2012 | Schultheis | F17C 13/084 224/400 |
| 2012/0152215 A1* | 6/2012 | Mazaika | F02M 21/0224 123/575 |
| 2013/0069357 A1* | 3/2013 | Green | B60K 15/067 280/834 |
| 2013/0245864 A1* | 9/2013 | Frazier | B61C 3/00 701/19 |
| 2013/0284752 A1* | 10/2013 | Rund | B60K 15/03177 220/660 |
| 2013/0334804 A1* | 12/2013 | Hirukawa | B60K 15/073 280/835 |
| 2014/0060946 A1* | 3/2014 | Willi | B60K 15/07 180/69.4 |
| 2014/0061266 A1* | 3/2014 | Milton | F17C 5/06 224/404 |
| 2014/0137953 A1* | 5/2014 | Gibb | F17C 1/00 137/351 |
| 2014/0191498 A1* | 7/2014 | Shipp | B60K 15/07 280/834 |
| 2015/0090518 A1* | 4/2015 | Yoshida | B60K 13/04 180/309 |

* cited by examiner

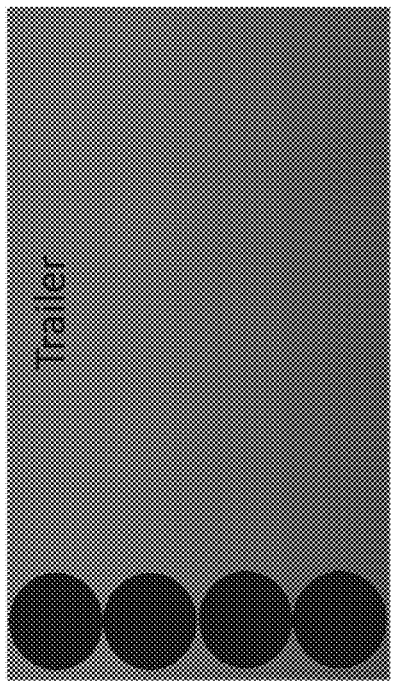
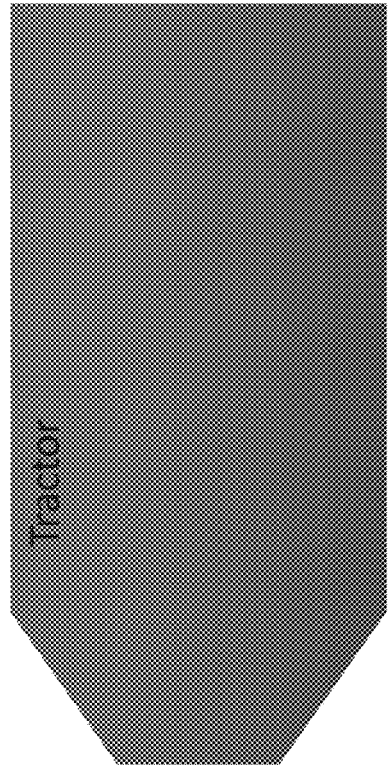
FIGURE 2C

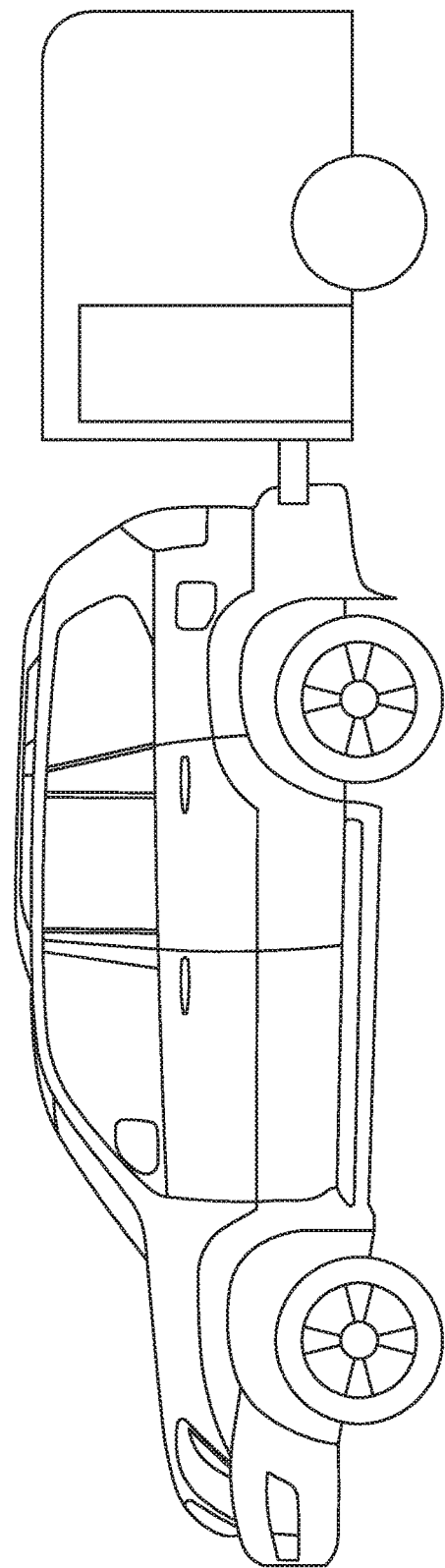

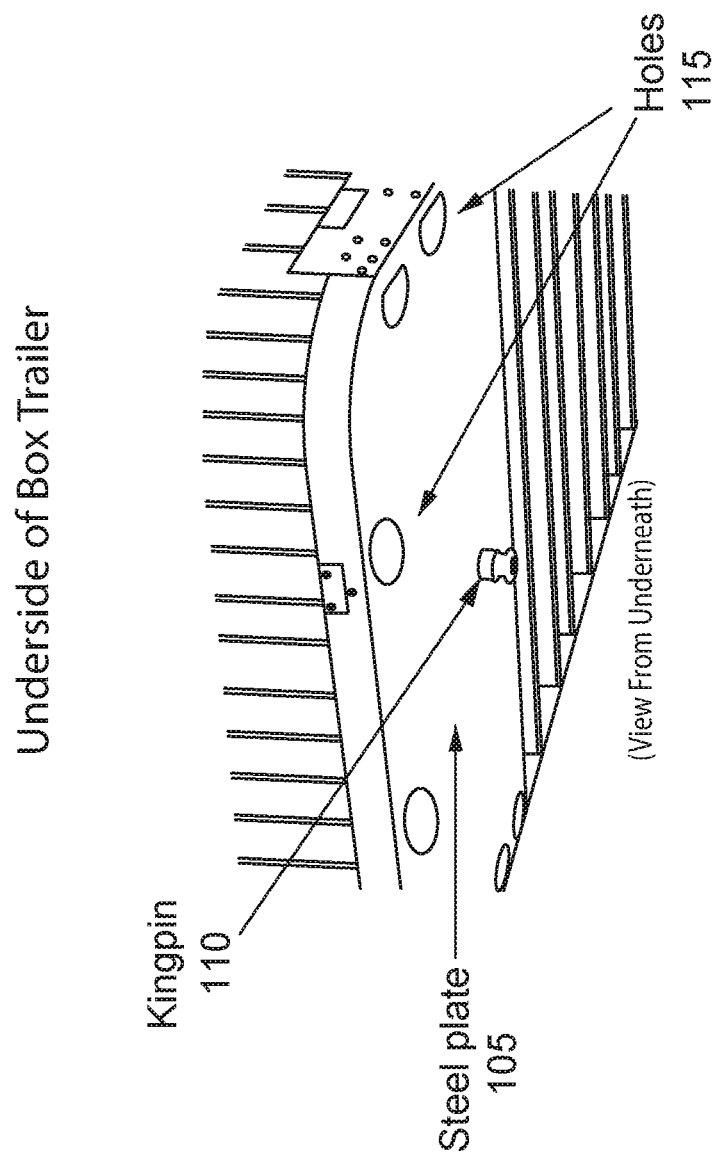

Weight of beam ~ 22lbs

Sample Vertical Lift Jack

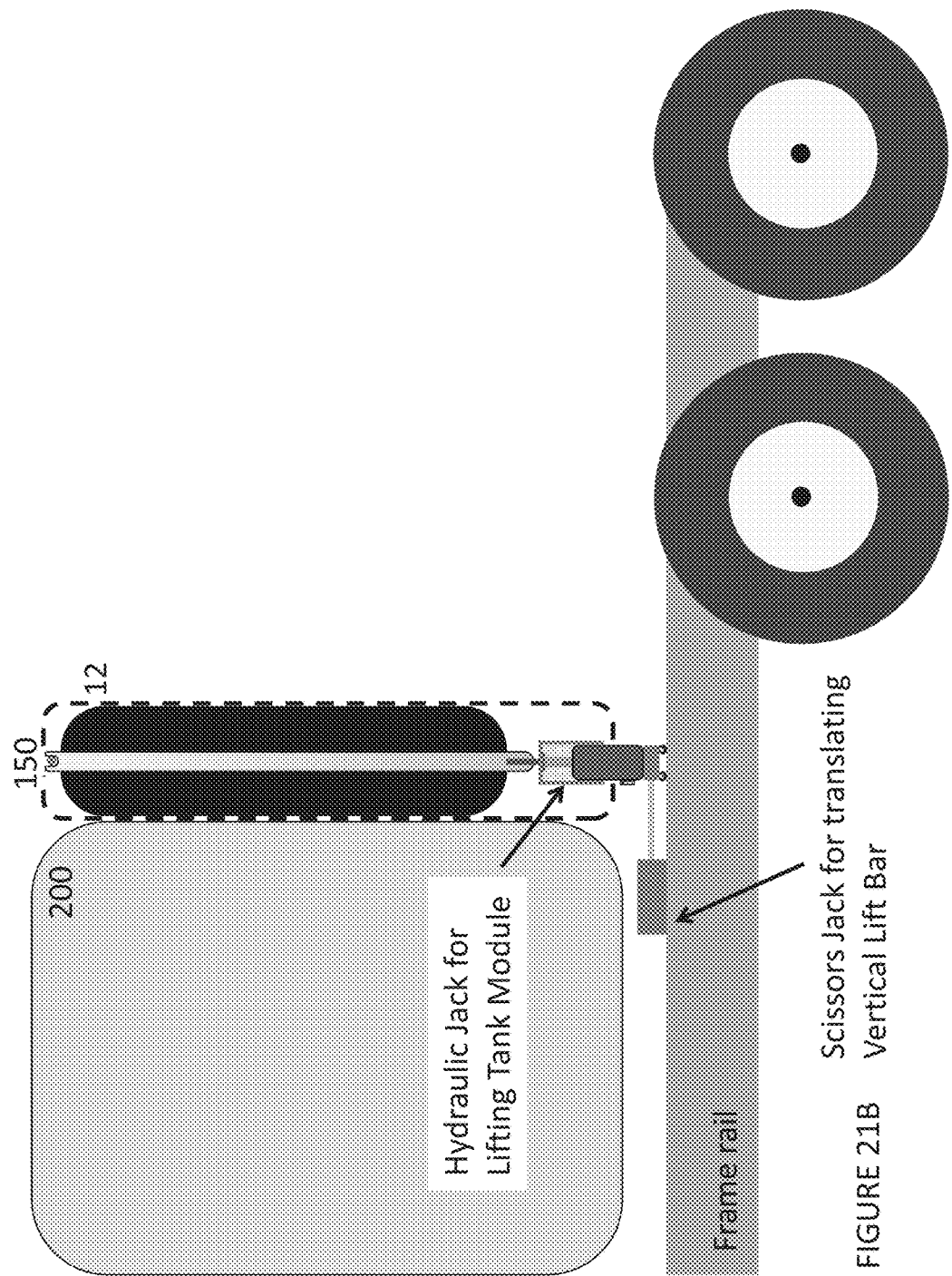

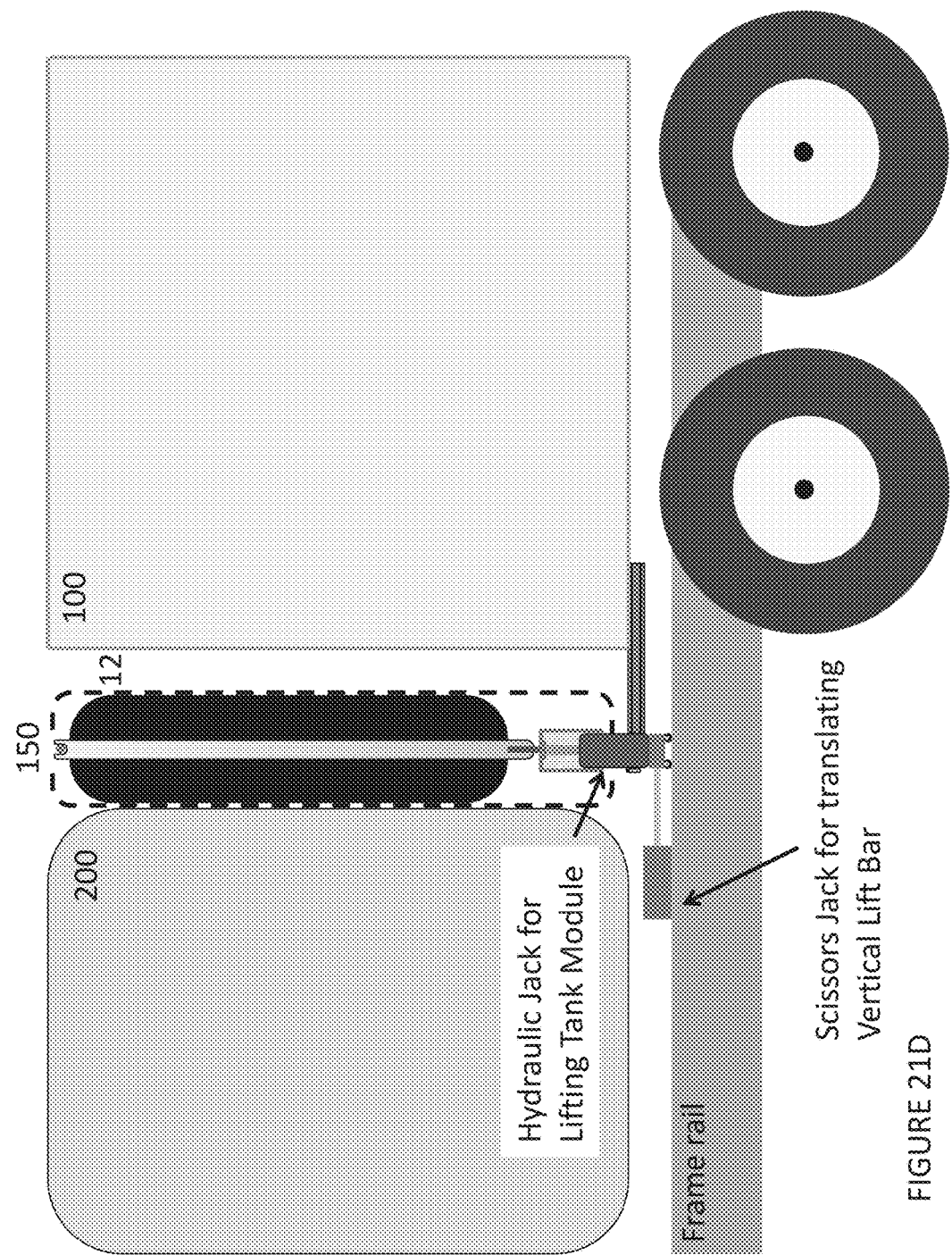

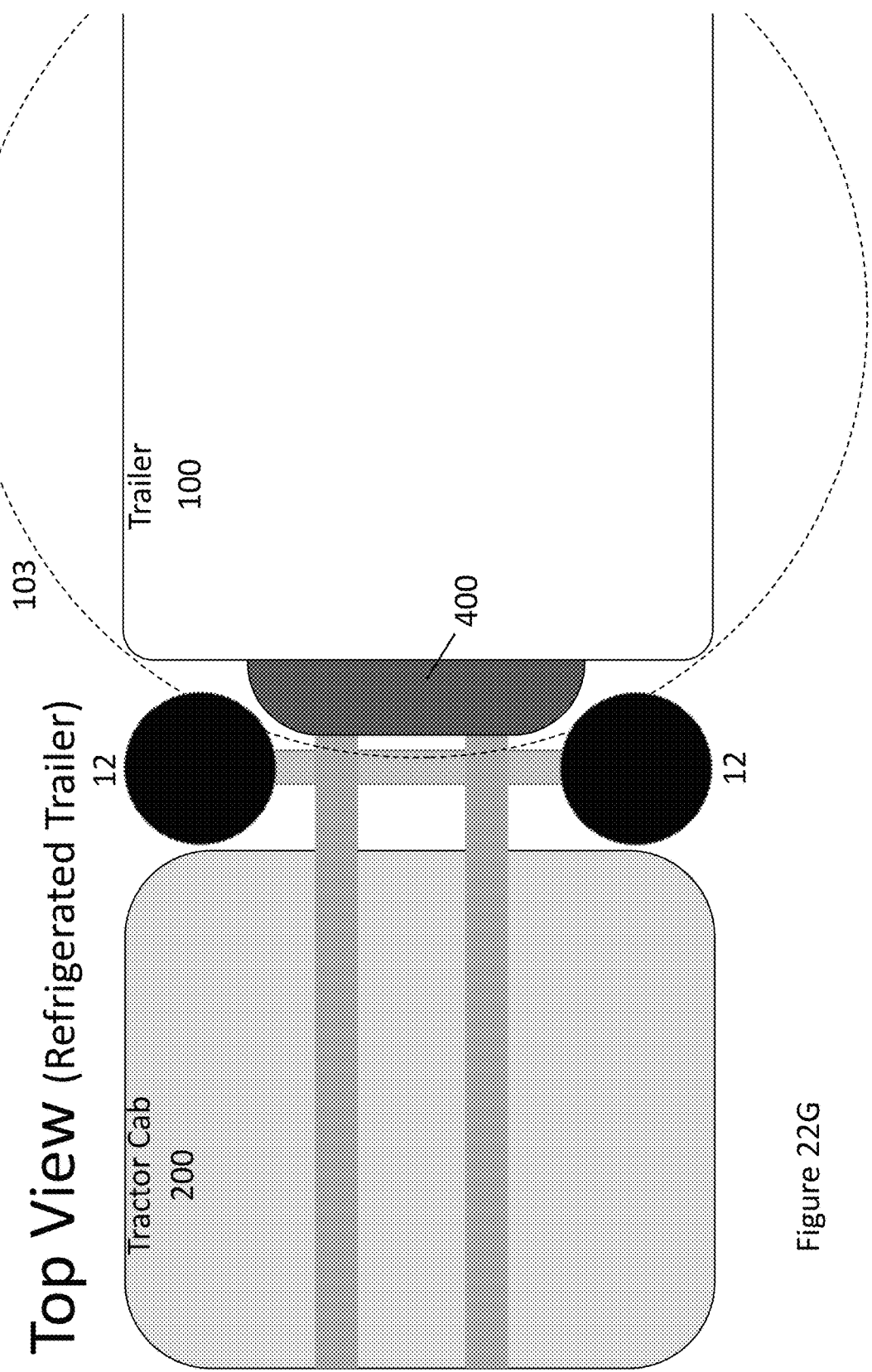

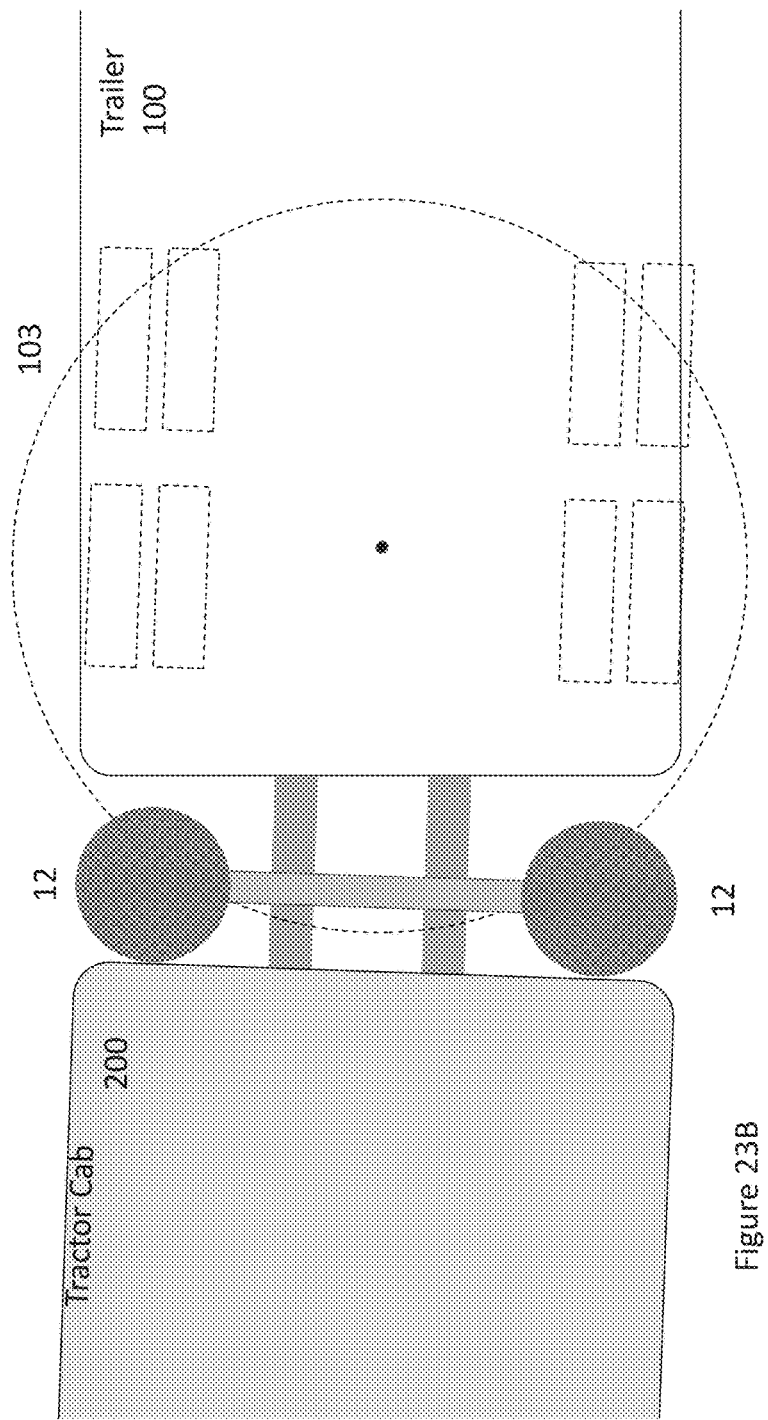

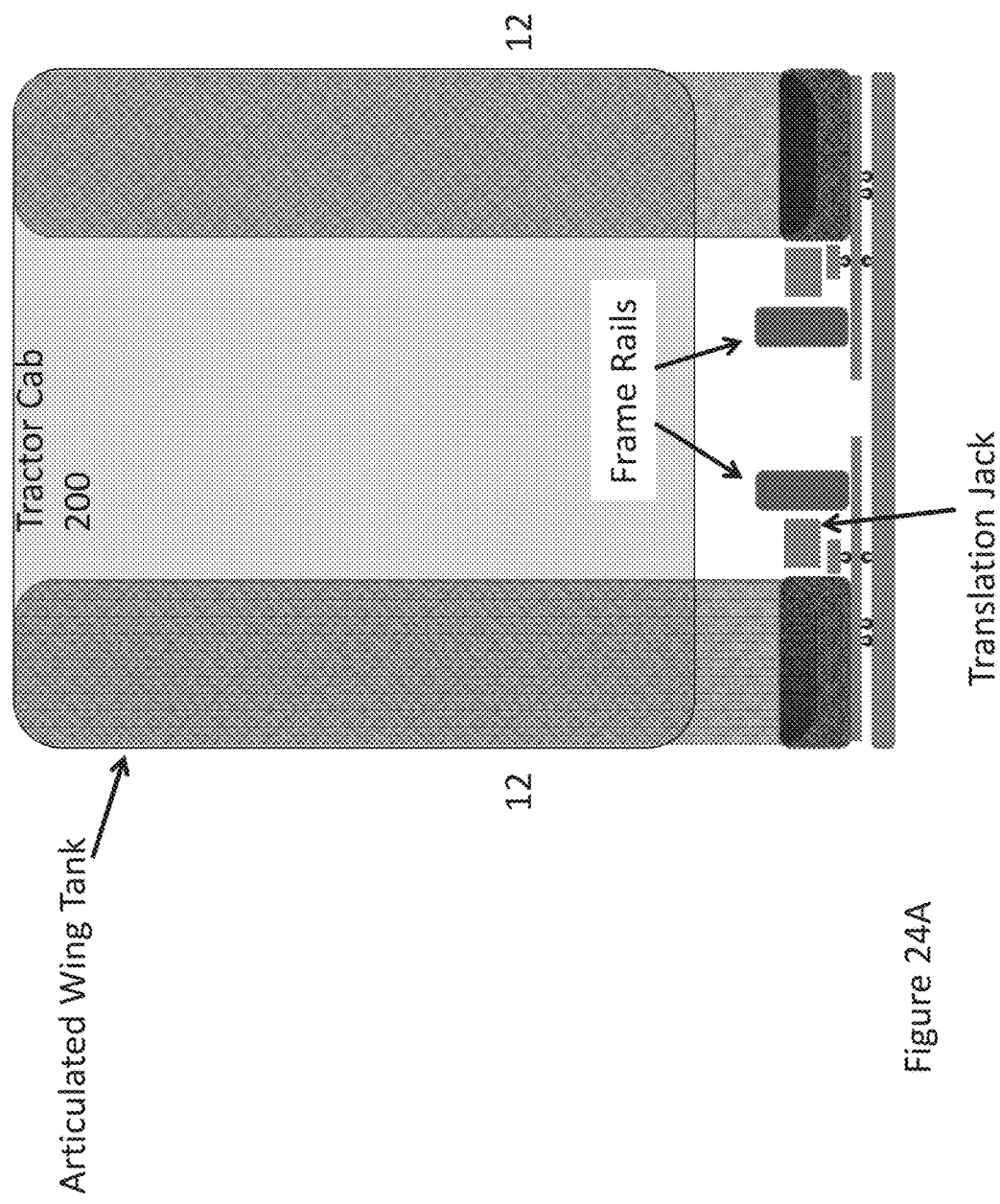

APPARATUSES, METHODS, AND SYSTEMS FOR THE DISPOSITION OF FUEL TANKS ON LONG-HAUL TRUCKS

CROSS-REFERENCE TO RELATED APPLICATIONS

This application claims priority to U.S. Provisional Patent Application No. 62/080,815, filed Nov. 17, 2014 and entitled "Apparatuses, Methods, and Systems for the Disposition of Fuel Tanks on Long-Haul Trucks," and U.S. Provisional Patent Application No. 62/220,765 and entitled "Apparatuses, Methods, and Systems for the Disposition of Fuel Tanks on Long-Haul Trucks." The present application incorporates herein by reference the disclosures of each of the above-referenced applications in their entireties.

FIELD OF THE DISCLOSURE

This application generally relates to storage of fuel and/or compressed natural gas. In some embodiments, these may be used as the fuel for long haul trucks.

BACKGROUND

Long haul trucks must store enough fuel to travel between gas stations during long trips. While diesel gas stations are fairly ubiquitous and can be found throughout the United States, the same cannot be said for other fuel types, including natural gas and compressed natural gas. Natural gas and compressed natural gas can be cheaper than diesel and other current fuels, and some predictions suggest that natural gas will remain relatively inexpensive, at least in part because of the recent abundance of "shale" gas resulting from modern fracking and horizontal drilling technologies. Natural gas also burns cleaner, and there is a fairly significant domestic supply of natural gas.

Despite the advantages, most long haul trucks have not been converted to use or carry natural gas or compressed natural gas. There is a lack of infrastructure with few fueling systems, and few vehicles that use natural gas or compressed natural gas. This has essentially created a chicken-and-egg problem, where trucks cannot convert to natural gas or compressed natural gas because there are too few fueling stations, and there aren't enough fueling stations because there is insufficient demand.

Additionally, in order to obtain an energy equivalent of the diesel tanks that long haul trucks currently use, the volume of compressed natural gas is approximately four times that of equivalent diesel. One cubic foot of compressed natural gas at 3600 psi contains as much energy as two gallons (or 0.27 cubic feet) of diesel fuel. Thus for, the equivalent of 500 gallons (66.84 cubic feet) of diesel fuel, one would need CNG pressurized tanks with a total volume of 250 cubic feet. As a result, the truck would need approximately four times the volume capacity of the diesel fuel tanks currently used in order to get the same range between fuel stops. Equal volume compressed natural gas tanks would provide only about one-fourth the energy and one-fourth the range between refueling stops.

SUMMARY

In some embodiments, compressed natural gas (CNG) fuel tank storage primarily on or within a truck can permit intercity and long haul trucking to operate with improved financial efficiency. Additionally, the CNG fuel tank storage can obviate the need for on-the-road refueling, thus overcoming the lack of fuel availability and infrastructure.

In some implementations, fuel storage may be primarily on or in the trailer of a semitrailer truck vehicle, which can reduce the need for on-the-road fill-ups. Fuel tanks can be mounted on or within the trailer of the vehicle. In some embodiments, the fuel tanks can be separated from the balance of the cargo, and the fuel may be fed to the engine of the truck pulling the trailer.

In some embodiments, a module of one fuel tank or an assembly of multiple fuel tanks for compressed natural gas (CNG) is provided. Because of the space and infrastructure limitations in current designs, the CNG tanks are not capable of simply replacing the standard gas or diesel tank storage tanks. Therefore, the tanks can be incorporated into the cargo space within the trailer or can be attached to the tractor and/or trailer. The module or assembly can be mounted within the cargo bay of the trailer or at the front of a flatbed trailer or on the front of a box trailer.

In another embodiment, the tanks can be incorporated into the space between the tractor and the trailer. The tanks can be attached to the tractor, trailer, or both. In some implementations there may not be enough room for the tanks to be attached to both the tractor and the trailer. In embodiments with less space between the tractor and trailer, there is typically more usable volume on the trailer than on the tractor because of the geometry and interference with the tractor and trailer when turning. Thus, for close tractor-trailer separations, more tank volume can be mounted on the trailer.

In some implementations, the tanks may be attached to the tractor and may be transferred to the trailer when the tractor and trailer are connected. The added tank volume can increase the overall fuel tank volume, which increases the range of the trucks, allowing them to go further between refueling stops. In yet another embodiment, a combination of in-trailer tanks and tanks mounted between the tractor and trailer can be used.

In some embodiments, the CNG tanks may contain an absorbent in the tank to increase the amount of gas in the tank. This storage concept is called Absorbed Natural Gas or ANG storage. At 3600 psi the amount of gas stored can be increased by ~20% with current ANG technology. It is to be understood that any reference to tanks throughout the disclosure can refer to CNG tanks, ANG tanks, diesel tanks, gasoline tanks, liquid natural gas (LNG), and/or the like, and a combination of different types of tanks and/or fuels can be used.

Each fuel tank within the assembly has an input filling line from a source of supply and an output line to supply fuel to the engine for operation of the vehicle. The output line embodies a pressure regulator to step down from the high pressure in the tank to the lower pressure required for input to the engine fuel system. Various mechanisms can be deployed for the smooth transition of fuel feed from each tank. In some embodiments, these mechanisms can be used for the smooth transition of fuel feed from each successive tank in a multiple tank assembly.

In some embodiments, strapping and/or bracing mechanisms can be used to retain the assembly in a fixed position and/or mount the fuel tank assembly structure to the floor of the trailer and to the sidewalls of the trailer if present. In other embodiments, such as when the fuel tank assembly is attached between the tractor and the trailer, strapping and/or bracing mechanisms can be used to retain the assembly in a fixed position and/or mount the fuel tank assembly to the tractor and/or trailer. In some such embodiments, the fuel tank assembly may be attached to the trailer during refueling and/or when the tractor is not attached to a trailer.

In some implementations, the fuel tank assembly can reside with or be very near the tractor. In the normal mode of operation, the tractor hooks up to a trailer, such as when the trailer has been loaded with cargo. Once the tractor and trailer are hitched, the tanks can be transferred to the front of the trailer. In some embodiments, the truck can go on the road in this configuration, taking the trailer to its destination. The tanks can be transferred back to the tractor and the tractor can unhook from the trailer. The tractor can then hitch to another trailer and repeat the process. The trailers can be fully loaded, partially loaded, or empty. The tractor can refill the tanks at a suitable filling station along the road.

In some implementations, the tanks can be refilled in any configuration. For example, the tanks can be refilled when the tanks are on the back of the tractor and the tractor is not connected to a trailer. The tanks can also be refilled when the tractor is connected to the trailer and the tanks are at the front of the trailer. In some embodiments, the tanks can be attached to the front of the trailer when the tractor is not attached to the trailer. In this implementation, the tanks may be refilled when the tractor is not attached to the trailer, and can also be refilled when the tractor is attached to the trailer. The fuel tank assembly may be moved from the tractor to the trailer when the trailer is attached to the tractor. Various mechanisms can be used to transfer the tank assembly.

In one aspect, the disclosure pertains to an articulated wing system for a vehicle. The system includes a moveable support structure attached to at least a first tank and at least one sensor. A controller is configured to cause the support structure to translate a position of the first tank relative to the vehicle in response to a signal from the at least one sensor.

In another aspect the disclosure relates to an articulated wing system for a tractor. The system includes a moveable support structure attached to a first tank and a second tank. The system further includes at least one sensor. A controller is configured to cause the support structure to translate a position of at least one of the first tank and the second tank relative to a longitudinal axis of the vehicle in response to a signal from the at least one sensor.

The disclosure is also directed to a method for moving at least one tank associated with a vehicle connected to a trailer. The method includes receiving, from at least one sensor, a signal indicative of at least one of a steering angle of the vehicle and an angle between the vehicle and the trailer. The method further includes generating, based upon the signal, a tank position command. A position of the at least one tank is then translated relative to the vehicle in response to the tank position command.

In a further aspect the disclosure pertains to a vehicle including a first tank and a second tank, each of which contain fuel for the vehicle. A pair of frame rails extends substantially parallel to a longitudinal axis of the vehicle. The vehicle further includes an articulated wing system including a moveable support structure attached to the pair of frame rails, the first tank and the second tank. The wing system also includes at least one sensor and a controller. The controller may be configured to cause the support structure to translate, in response to signals from the at least one sensor, positions of the first tank and the second tank along a transverse axis intersecting the longitudinal axis.

The disclosure also relates to an articulated wing tank system for a vehicle. The system includes a first tank, a second tank and a moveable support structure. The moveable support structure is configured to move the first tank and the second tank and includes a first horizontal translation actuator attached to the first tank and a second horizontal translation actuator attached to the second tank. The system further includes at least one sensor and a controller. The controller is configured to send tank position commands to the first horizontal translation actuator and the second horizontal translation actuator in response to signals from the at least one sensor.

Various embodiments provide apparatuses, methods, and systems that permit long distance truckers to switch to CNG from gasoline or diesel fuel without having to worry about the lack of CNG filling stations on America's highways and byways.

BRIEF DESCRIPTION OF THE FIGURES

FIGS. 2A-E illustrate truck trailers with assemblies containing multiple CNG fuel tanks.

FIG. 5 is a photo-diagram of a small trailer attached to a sport utility vehicle (SUV) wherein the small trailer has a tank assembly therein, such that the module can serve as the source of fuel for the sports utility vehicle.

FIG. 8 shows a plate located at the underside of the trailer to which specially designed beams may be attached to support the tanks.

FIGS. 21A-I show an embodiment of the motion of the tanks and transfer mechanism between the tractor and trailer.

FIGS. 22A-H show a flow diagram, data flow, and embodiments where the CNG tanks are mounted on the tractor but are moved outward during sharp turns to avoid interference with the trailer.

FIGS. 23A-F show a top view of some embodiments where CNG tanks are moved outward to avoid interference with the trailer.

FIGS. 24A-D show a view towards the back of the tractor according to some embodiments, where the CNG tanks are moved outward to avoid interference with the trailer.

DETAILED DESCRIPTION

Figure 1:
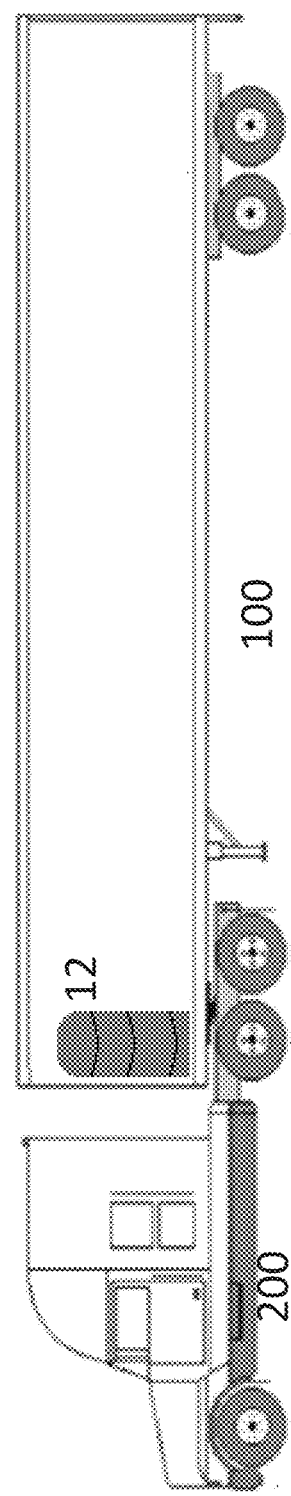
FIG. 1 illustrates a semitrailer truck trailer with an assembly containing multiple CNG fuel tanks.
Figure 2A:
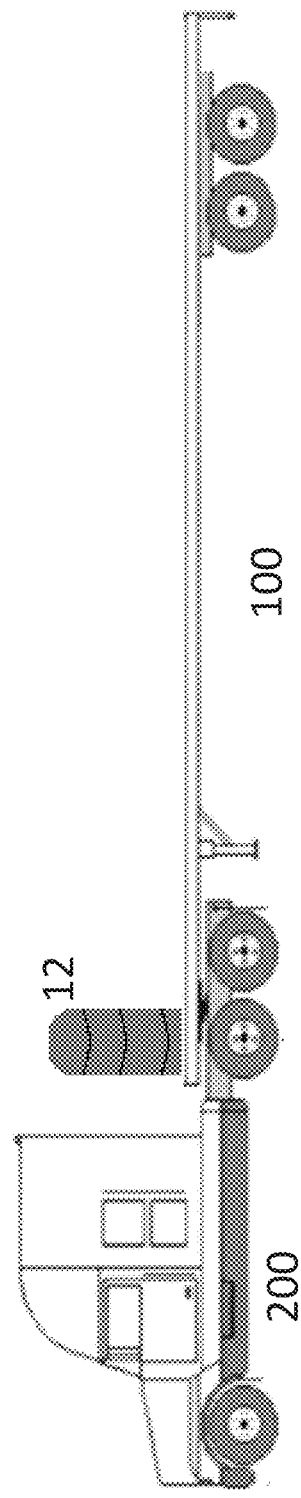
Figure 2B:
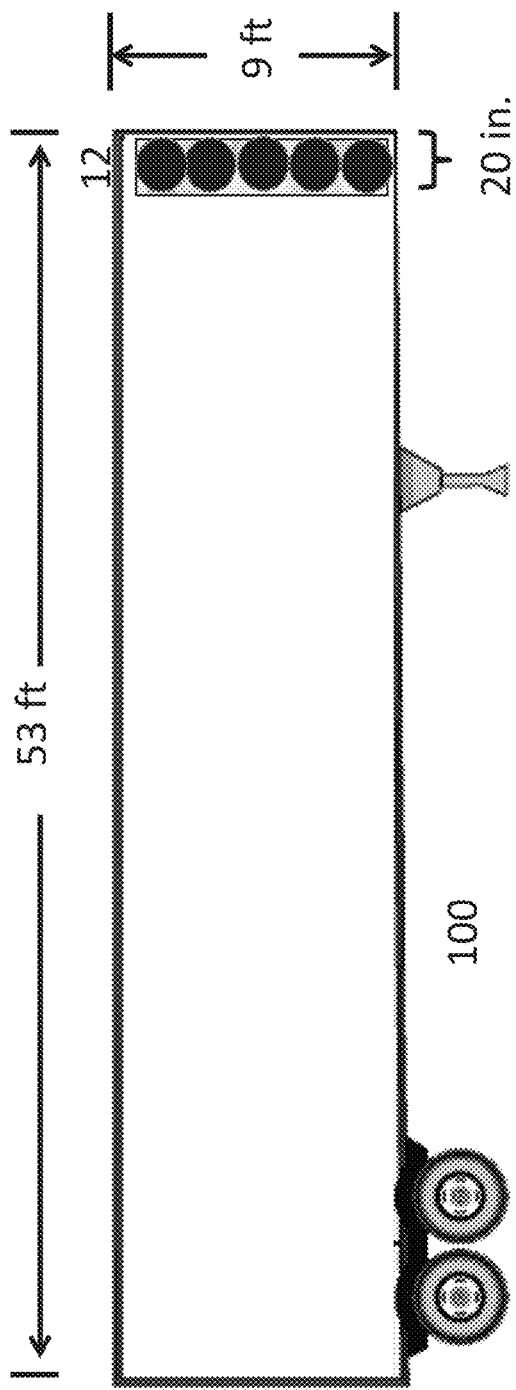
Figure 2D:
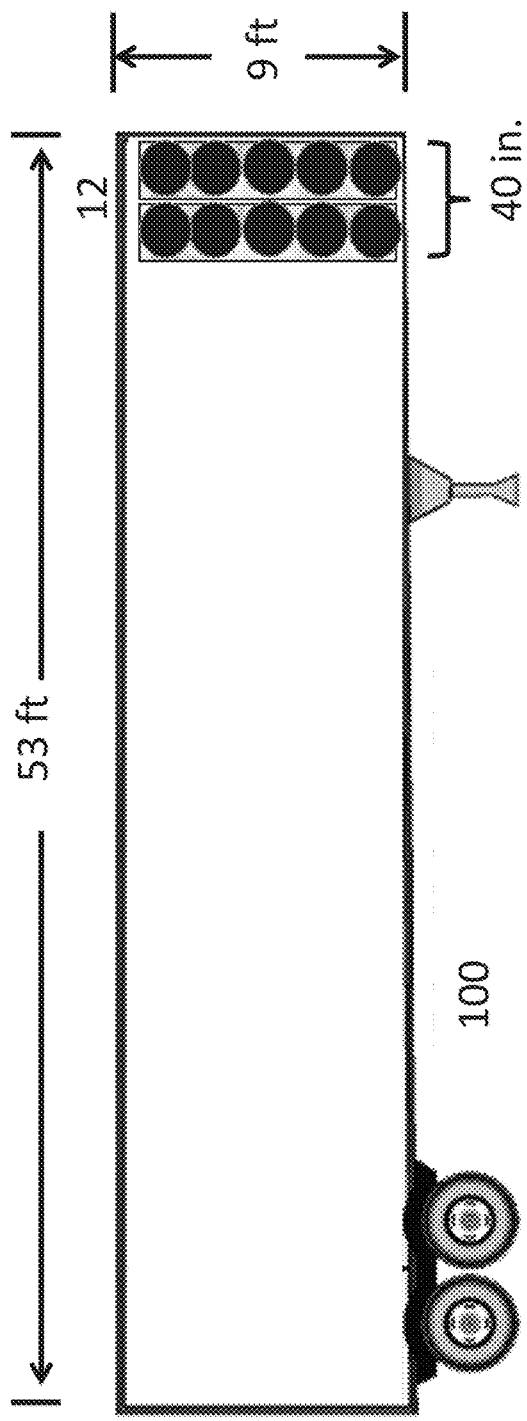
Figure 2E:
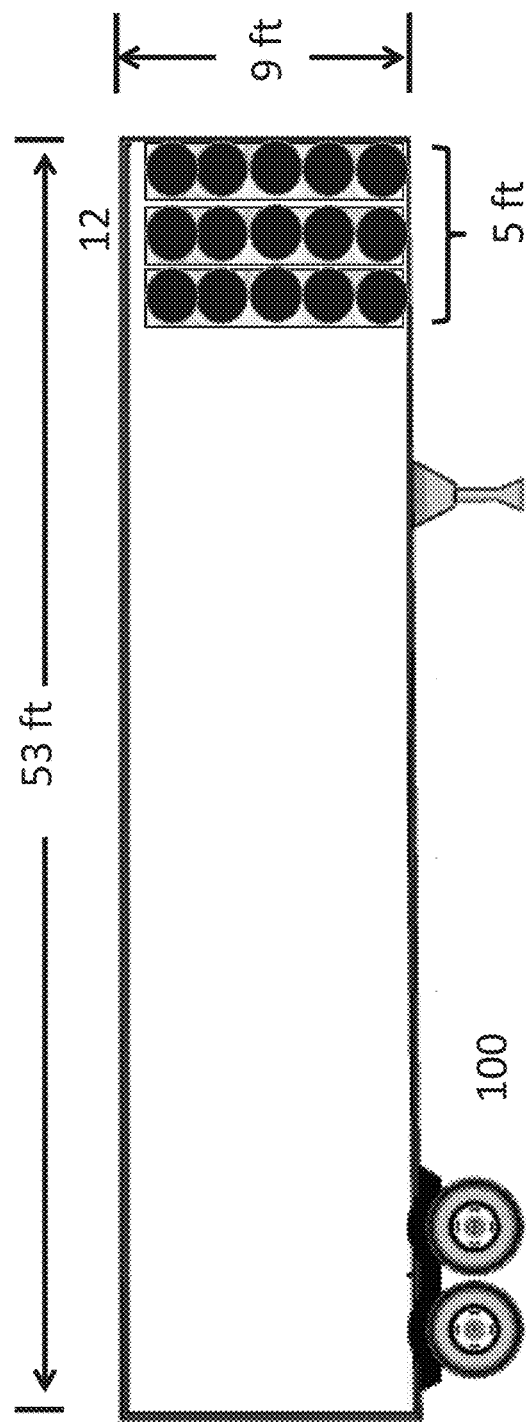

The present disclosure provides systems, methods, and devices for storing CNG fuel within, on the tractor of, or on the trailer of a large semi-truck trailer vehicle. In FIG. 1, a trailer 100 is seen wherein a single assembly of this invention is shown disposed on the trailer at the head end thereof. The mounting mechanism, the piping and valves are not shown. FIG. 2A is a side elevational view wherein an unenclosed "flat bed" long haul trailer having a fuel tank assembly stowed in the forward portion of the trailer. In some embodiments, the single assembly can include one row and/or column of tanks 12 at the front of the trailer 100. FIG. 2B shows the tanks configured as rows; FIG. 2C shows the tanks configured as columns. FIG. 2D shows an embodiment with two rows of tanks 12 at the front of the trailer; FIG. 2E shows three rows of tanks 12. In some implementations, each row of tanks 12 may be approximately twenty (20) inches wide. In some embodiments, the area of the figures marked as tanks 12 (as shown throughout the figures) may include the tanks themselves, as well as a structure envelope and/or space for plumbing, pressure regulators, input/output lines, and/or the like.

Figure 3:
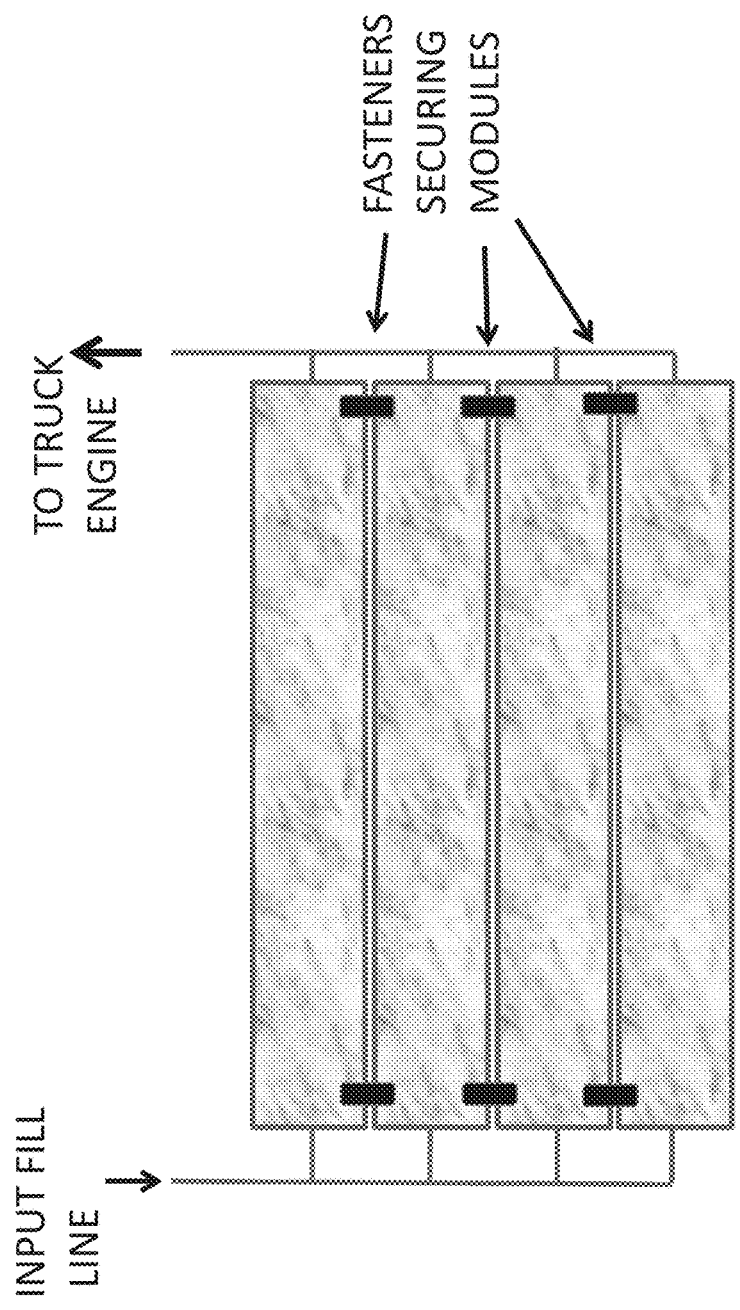
FIG. 3 is a diagrammatic elevational view of an assembly of 4 CNG modules

FIG. 3 shows an assembly of four modules 14 forming an assembly 10. Although four modules are shown, any number of modules can be used to form an assembly. In some implementations, this may depend upon the size of the pressure vessels 12 and the elevation of an enclosed trailer as well as any load restrictive statutes of any particular state.

A main input line 15 can be connected to a series of individual fill lines 23 for each tank 12. The main input line 15 can be used to fill each of the plurality of pressure vessels 12. In some implementations, the plurality of pressure vessels 12 can be stored within a rectilinear box or housing 13.

In some embodiments, the pressure vessels 12 can be made of carbon fibers that are wound under tension on a male mandrel in the desired pattern. The fiber strands are coated with synthetic resin as they are wound. Once the mandrel is completely covered to the desired thickness, the mandrel is placed in an oven to solidify (set) the resin. Once the resin has cured, the mandrel is removed, leaving the hollow final product. Each pressure vessel can be disposed in a separate steel or aluminum alloy rectilinear box such at the weight of the contents of any one tank does not bear down upon an adjacent tank. In some implementations, each housing 13 may be formed from sheet steel or aluminum utilizing known fabrication techniques.

Within each module 14 is an output line 16 connected to an input end of a respective pressure regulator valve 18. From the output end of each pressure regulator 18 there is connected an output line 17. Each output line 17 is connected to a main feed line 19 that leads to the truck engine. A series of straps (shown in FIG. 4), as well as fasteners 20 connect each tank housing to the adjacent housing for stability and to the trailer itself.

In some embodiments, electronically controlled ball valves may be employed in the main output feed line 19 to shut down each pressure vessel as it approaches the empty point, such that the flow of compressed natural gas is continuous and uninterrupted as the source of feed switches from the uppermost to each successive tank within the assembly. In some embodiments, various other valve mechanisms may be used. In further embodiments, the output feed line can be shut down as it approaches a minimum fill point, for example, such that the vessels are never fully emptied.

Figure 4:
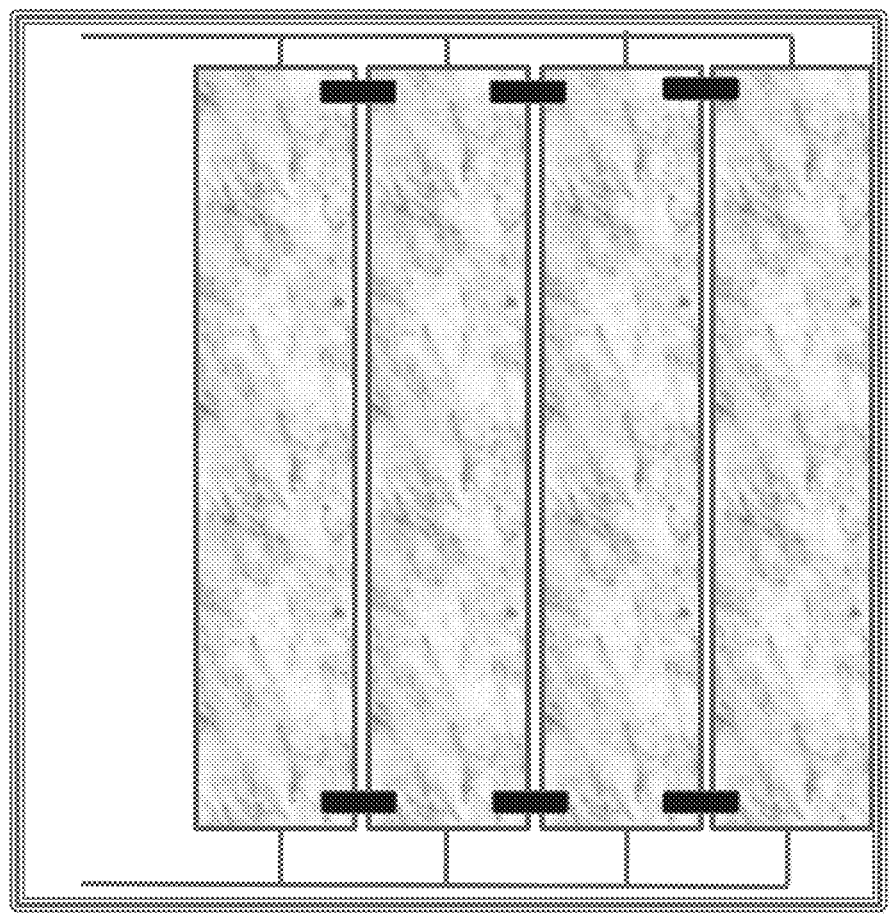
FIG. 4 is a diagrammatic cutaway perspective view of the assembly of FIG. 3 disposed within a trailer.

FIG. 4 is a cutaway perspective view of a closed trailer with an assembly of four modules disposed therein. The fill port 22 is connected by suitable piping (not shown) to fill line 16, which in turn is connected to an individual fill line 23. In some embodiments, each individual fill line 23 has a fill regulator valve therein to prevent the buildup of excess pressure due to overfilling of any individual tank. Embodiments of the output side of each module have been discussed relative to FIG. 3.

In some implementations, output line 19 exits the truck and connects, via a coupling mechanism, to the fuel line leading to the fuel injectors of the truck's engine. In some embodiments, individual retention strap ends 24 can attach on both the left side and right side of each module. Additional straps (not shown) may attach each module to the forward wall of the trailer. In some embodiments, the straps can extend along the entire rear wall of each module.

While one use may be long haul trucks, these tanks can be employed on a trailer that is towed behind much smaller vehicles such as cars or SUVs. FIG. 5 shows an alternative embodiment carrying compressed natural gas (CNG) in small detachable trailers towed behind the vehicle. The vehicle would be drivable whether or not the tanks were attached. While the vehicle user might not attach the trailer for short trips, the CNG trailer can be used for long trips.

One cubic foot of compressed natural gas (CNG) at 3600 psi contains as much energy as two (2) gallons of diesel fuel or gasoline. Thus, the equivalent of 100 gallons of diesel fuel or gasoline we would need CNG pressurized tanks with a total volume of only fifty (50) cubic feet. A tank configuration with this volume can fit on a small trailer less than ten (10) feet long and would enable the vehicle to travel thousands of miles without refueling. Trailers with virtually any range could be made available, and the user can attach a CNG trailer sized to his particular trip needs. This can limit the number of refueling stops, and sometimes eliminate the need for all refueling stops, on many trips.

In one such embodiment, the module can be disposed within a small, e.g., five- to six-foot long, ball hitch attached trailer, 300. The fuel can be delivered from the individual output lines 16 through each pressure regulator 18 to the respective individual feed lines 17 to the main feed line 19 for delivery to the engine. In some implementations, the engine may have been adapted to utilize CNG as its fuel source. This embodiment may have a 200 gallon capacity, which would provide a driving range of up to about 1000 miles. In yet another embodiment, the tanks can be employed in a trailer attached to a personal vehicle.

While not shown in the FIGS. 1-5, a barrier wall may be used to separate the one or more modules of the assembly disposed on or in the trailer. In some embodiments, the one or more modules can be interposed between the assembly and the cargo being transported.

Figure 6A:
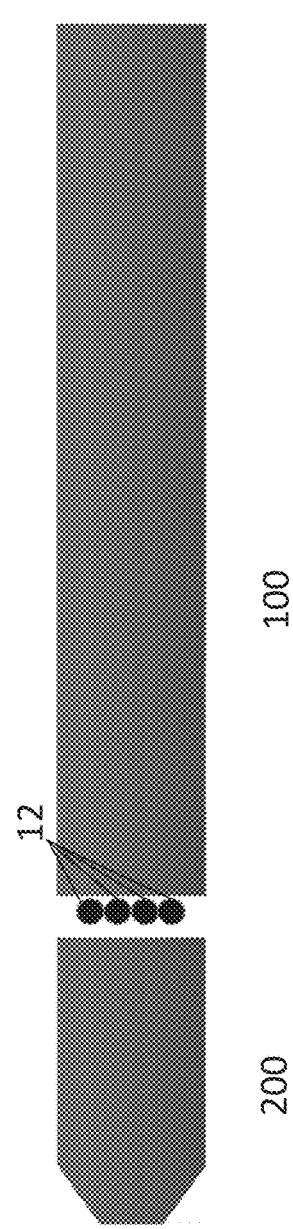
FIGS. 6A-C illustrate embodiments wherein the tanks are located between the tractor and the trailer.

FIG. 6A shows an alternative embodiment in which the tanks 12 may be positioned between the tractor 200 and the trailer 100. The tanks 12 may be contained within a housing (not shown). In some embodiments, the tanks 12 may be permanently affixed to the front of the trailer 100. The tanks 12 may also be permanently positioned at the back of the tractor 200. In other implementations, the tanks 12 may be positioned at the front of the trailer 100 when the tractor 200 and trailer 100 are connected. The tanks 12 may be movable between the back of the tractor 200 and front of the trailer 100.

Figure 6B:
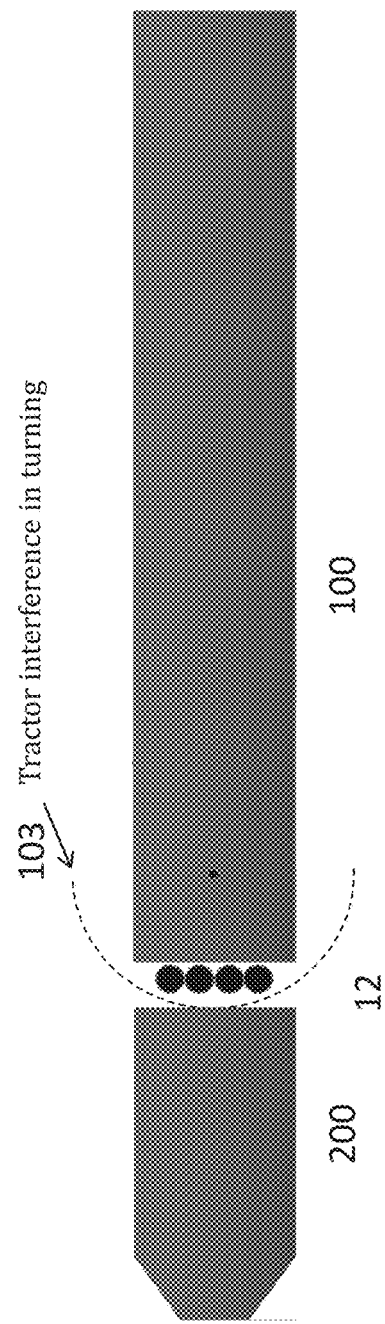

FIG. 6B shows an embodiment in which the tanks 12 are positioned at the front of the trailer 100. As shown by the dotted line, this allows for minimal interference when the tractor-trailer is turning. In some implementations, the size of the tanks 12 may vary depending on the interference radius 103 of the tractor 200 when turning.

Figure 6C:
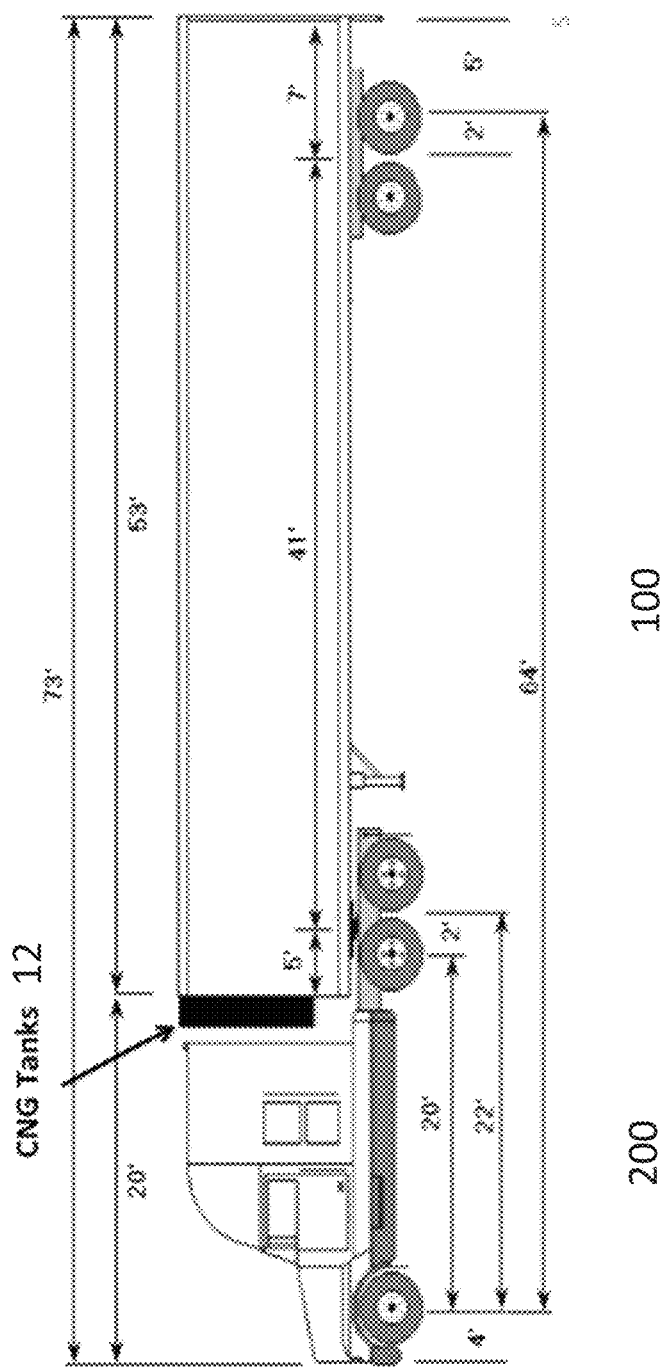

FIG. 6C shows an exemplary embodiment in which the tanks 12 are attached to the front of the trailer 100. In such an embodiment, a seventy-three (73) foot truck with a fifty-three (53) foot long trailer may have a pivot position located five (5) feet back from the front of the trailer. There may be at least two and a half (2.5) feet of clearance between the back of the tractor 200 and the front of the trailer 100. This clearance allows the truck to turn and jackknife, such that when the truck turns or jackknifes, the tractor 200 does not contact the trailer 100.

In order to ensure that the tanks 12 are not damaged during regular turning of the truck and that the tanks 12 are not damaged if the truck jackknifes, the tanks are configured to sit inside the interference radius 103 of the truck. The interference radius 103, shown in FIG. 6B, can be determined based on the half-width of the trailer and the pivot point of the cab using the Pythagorean Theorem, where the half-width of the trailer and distance to the pivot point of the cab form a right angle, and the Pythagorean theorem is used to determine the hypotenuse of the right triangle. This hypotenuse represents the minimum clearance length required by the trailer during the truck's turn. For example, based on the Pythagorean theorem, if the half-width of the trailer 100 is fifty-one (51) inches, and the pivot is sixty (60) inches back, the clearance radius required is approximately seventy-nine (79) inches, Therefore, knowing that the pivot is sixty (60) inches from the front of the trailer 100, the clearance required is a minimum of nineteen (19) inches. For various reasons, most trucks leave at least thirty (30) inches of clearance.

Figure 7A:
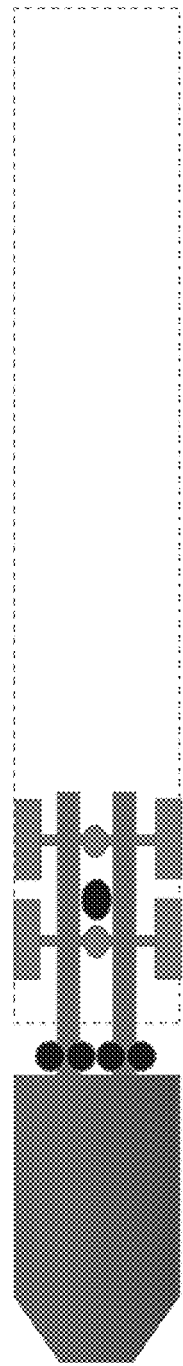
FIGS. 7A-B show an embodiment wherein the tanks are initially connected to the tractor but can be transferred to be attached to the trailer.

FIG. 7A shows an embodiment wherein the tractor 200 is not attached to a trailer. The trailer outline is shown in the figure by the dotted line 101. The tanks 12 may attach to the tractor 200 when a trailer 100 is not attached to the tractor. Often, there is approximately one tractor corresponding to three separate trailers; one in transport, one being loaded, and one being unloaded. Accordingly, the tanks 12 may generally correspond to the tractor 200 rather than the trailers 100. Thus, in some implementations, this can result in about a third (⅓) of the number of tanks 12 required to achieve the same system capability where the tanks 12 are attached to the trailers 100 instead of the tractors 200. Furthermore, the tractor 200 may then refuel all of the tanks without the trailer 100 being attached.

Figure 7B:
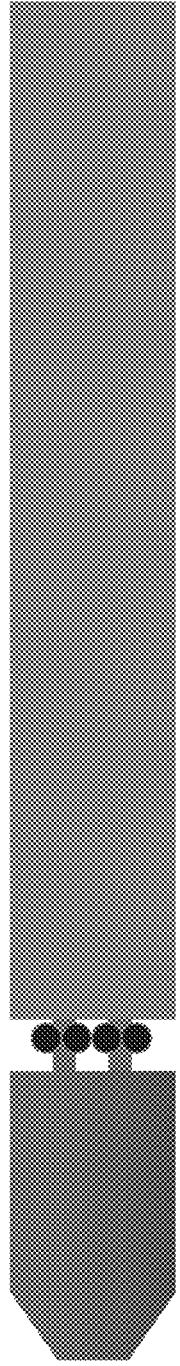

In some implementations, the tanks 12 may be transferred to the front of the trailer 100 when the trailer is attached to the tractor 200, as shown in FIG. 7B. In some embodiments, the tanks 12 may be jacked up off of the horizontal support beam, moved backward along but well above and clear of the frame rails, to a position above the detachable cantilevers, and then lowered to be supported by the cantilevers attached to the steel understructure at the front of the trailer. In another embodiment, the tanks 12 may be transferred from the tractor 200 to the trailer 100 using a fork lift and/or other machinery capable of lifting the heavy tanks.

FIG. 8 shows an exemplary front underside of a box trailer to which attachment mechanisms can be attached to support the tanks 12. While some trailers may have hooks on the front of the trailer to which the tanks 12 may be attached, many trailers do not have any such hooks. Most trailers, however, do have holes 115 in a steel plate 105 underneath the steel bed near the front and along the side and a few feet back from the front of the trailer.

FIGS. 9A-H show example embodiments of a cantilever mechanism 300 for attaching the tanks to the trailer 100. In some embodiments, one or more steel members 125 can be attached to the steel plate 105 via one or more attachment mechanisms. In some implementations, the steel members 125 may be square steel tubes, I-beams, and/or the like. The steel members 125 may be used to support the tanks 12.

Figure 9A:
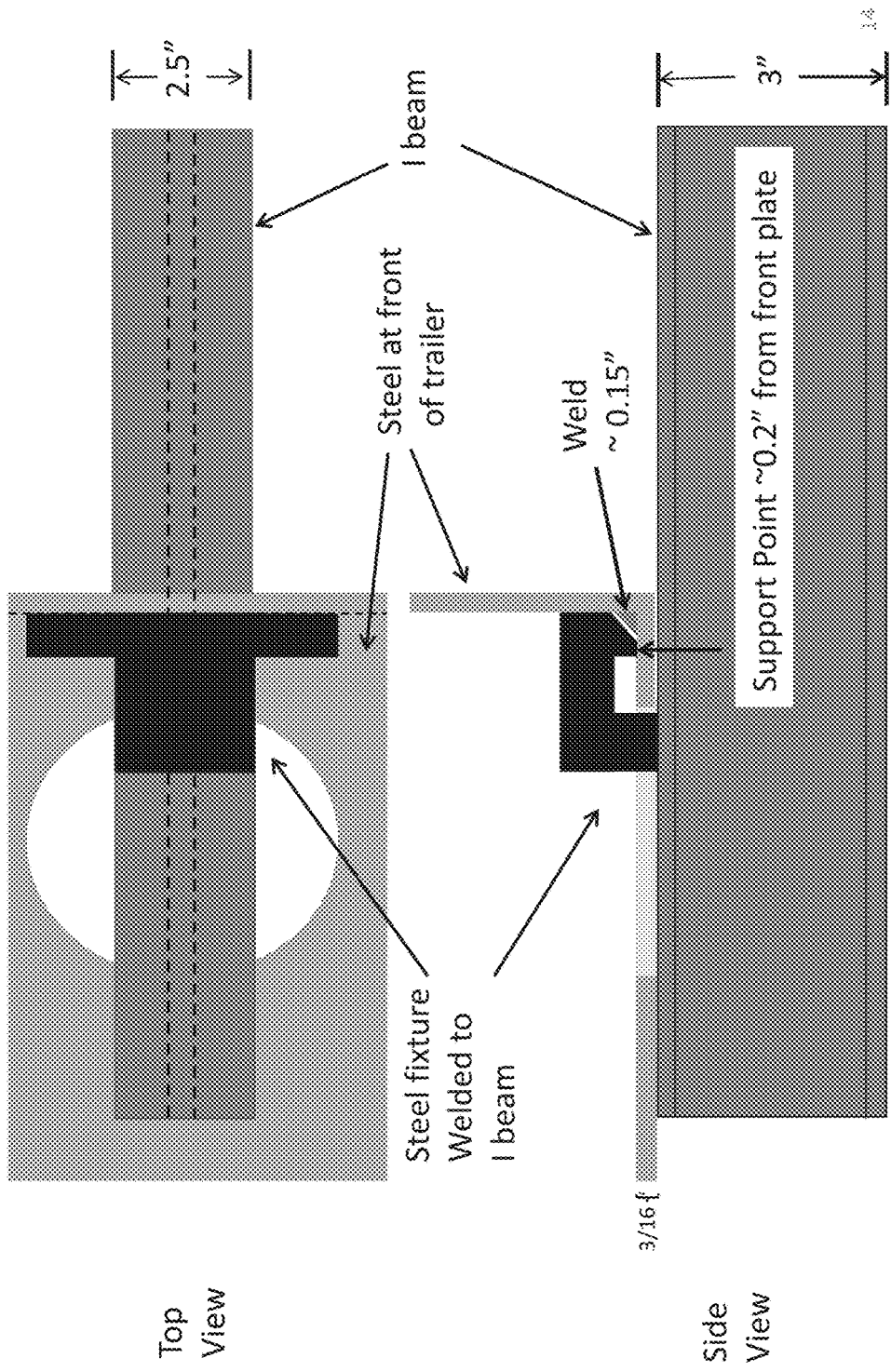
FIGS. 9A-H show embodiments of the cantilever support mechanism.
Figure 9B:
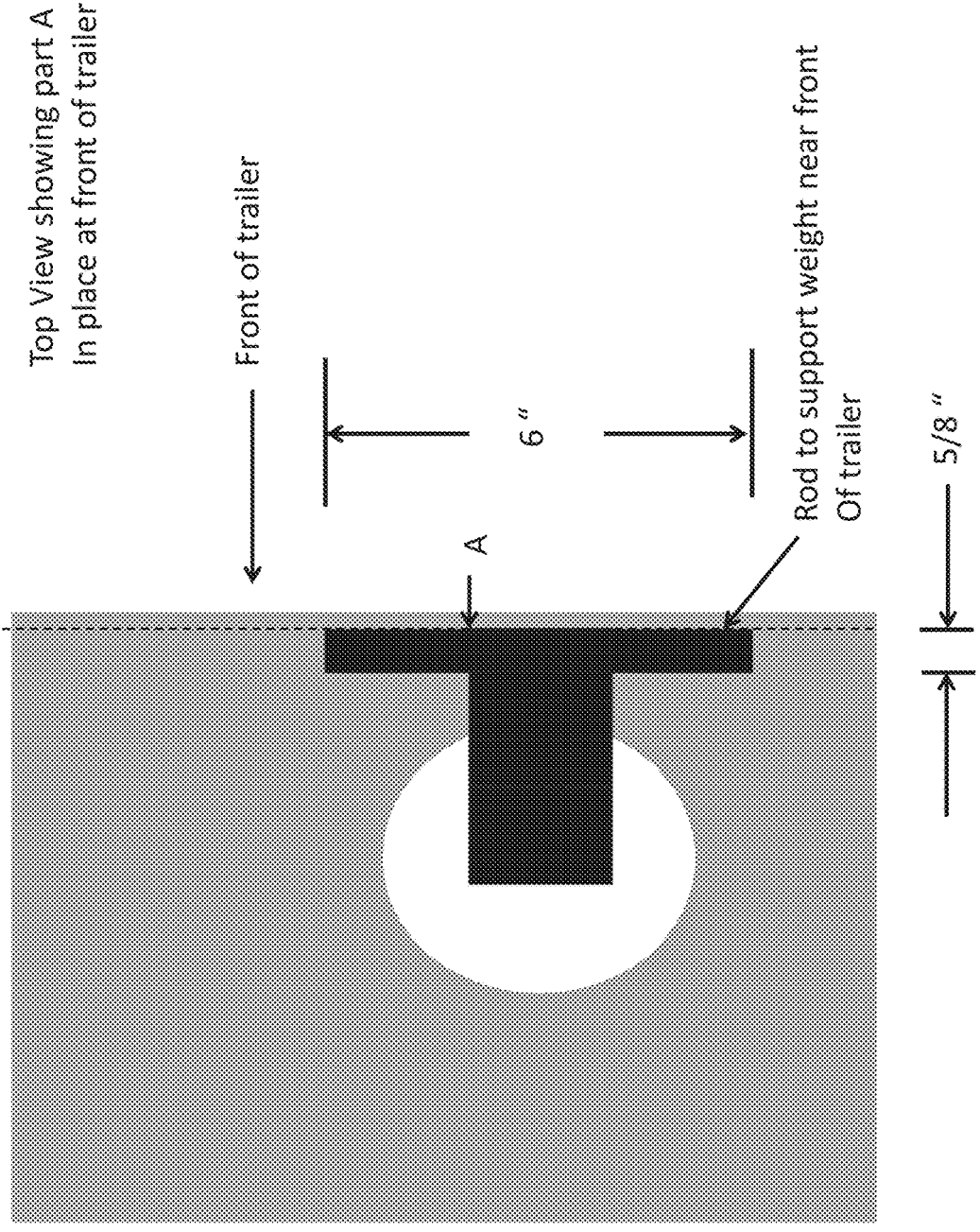
Figure 9C:
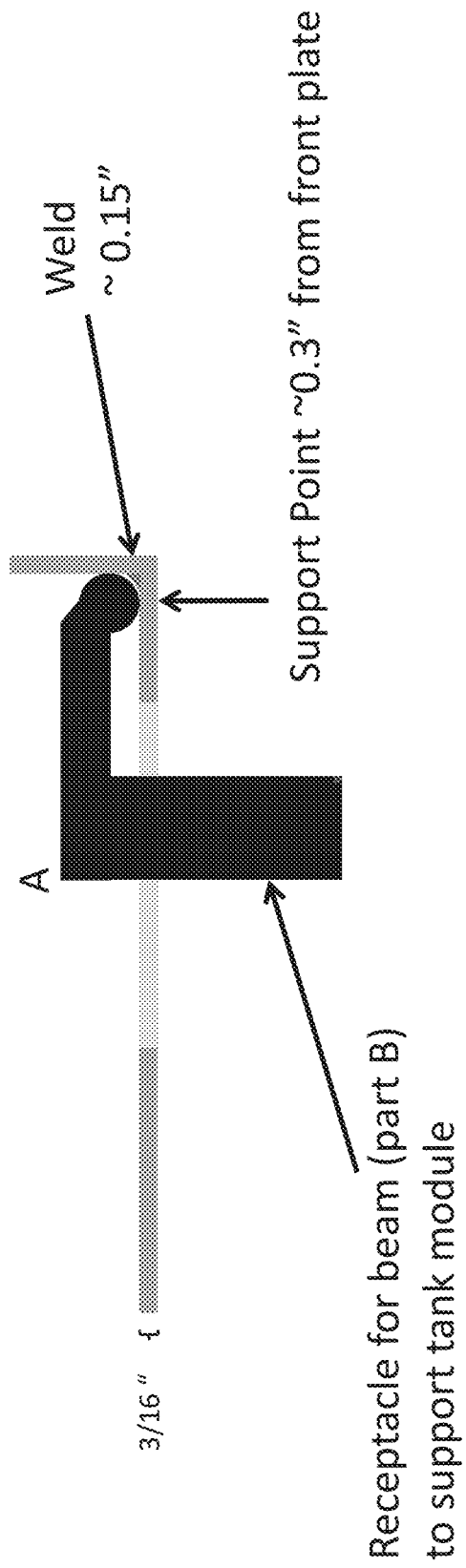
Figure 9D:
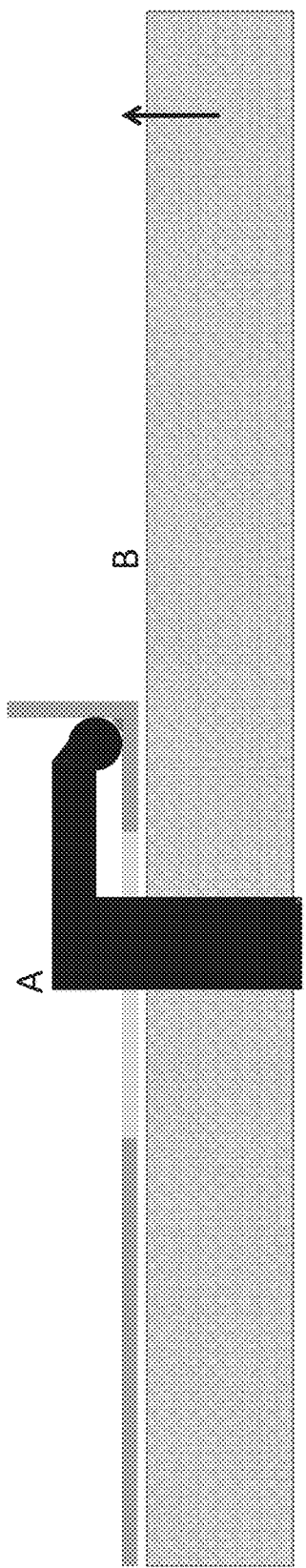
Figure 9E:
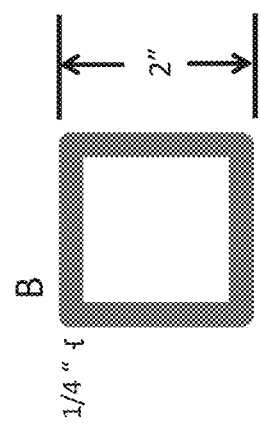

FIGS. 9B-G show various embodiments wherein cantilever 300 may be comprised of parts A and B. In the top view of FIG. 9B, part A is configured at the front of the trailer. A horizontal rod at the proximal end of part A is positioned at the front of the trailer and configured to support weight. A vertical rod at the distal end of part A extends downwards, through the hole, and is configured to receive support beam B. FIG. 9C shows a side view of part A, as described above with respect to FIG. 9B. FIG. 9D shows the side view of FIG. 9C, wherein support beam B is positioned through the vertical rod of part A. The end view of beam B according to some embodiments is shown in FIG. 9E.

Figure 9F:
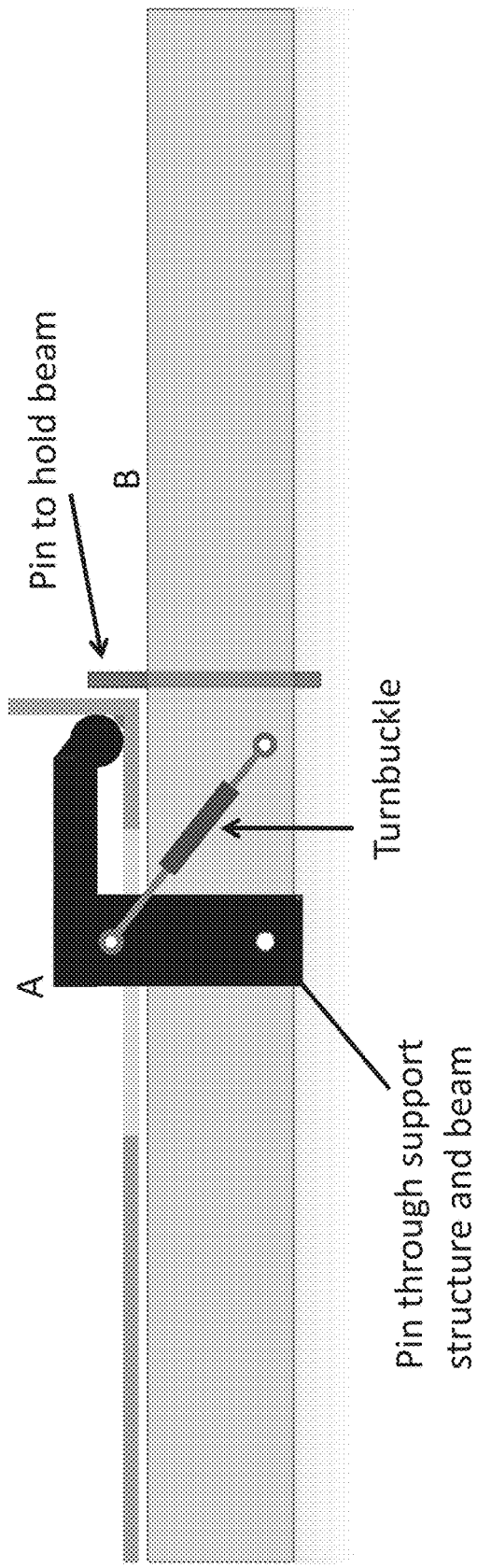
Figure 9G:
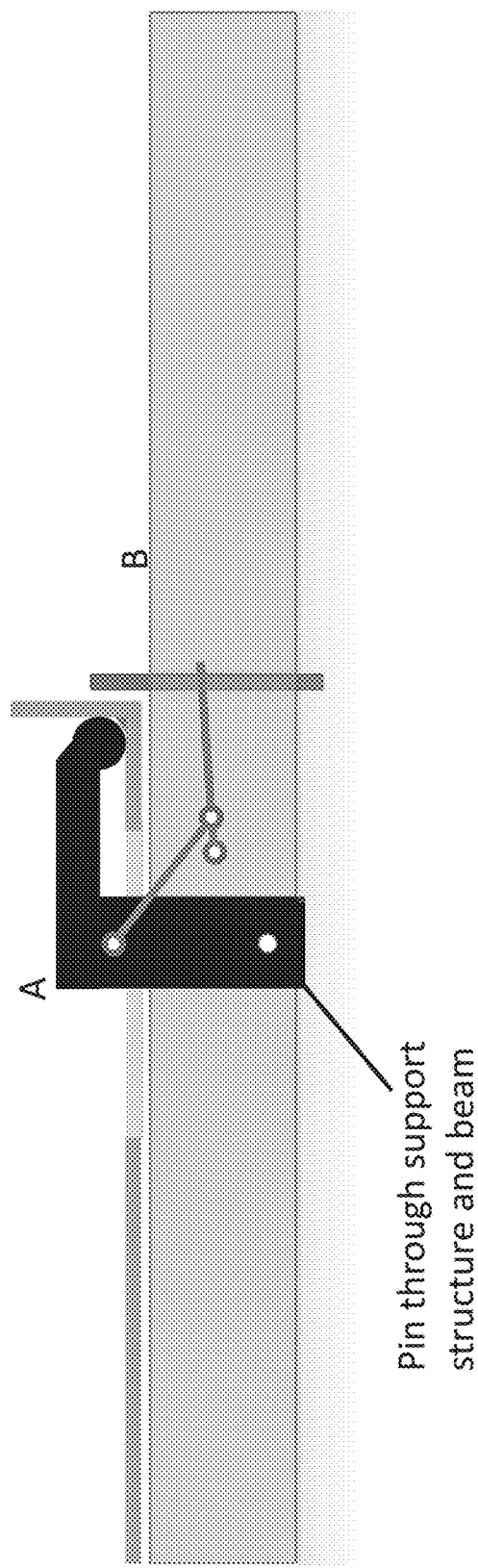
Figure 9H:
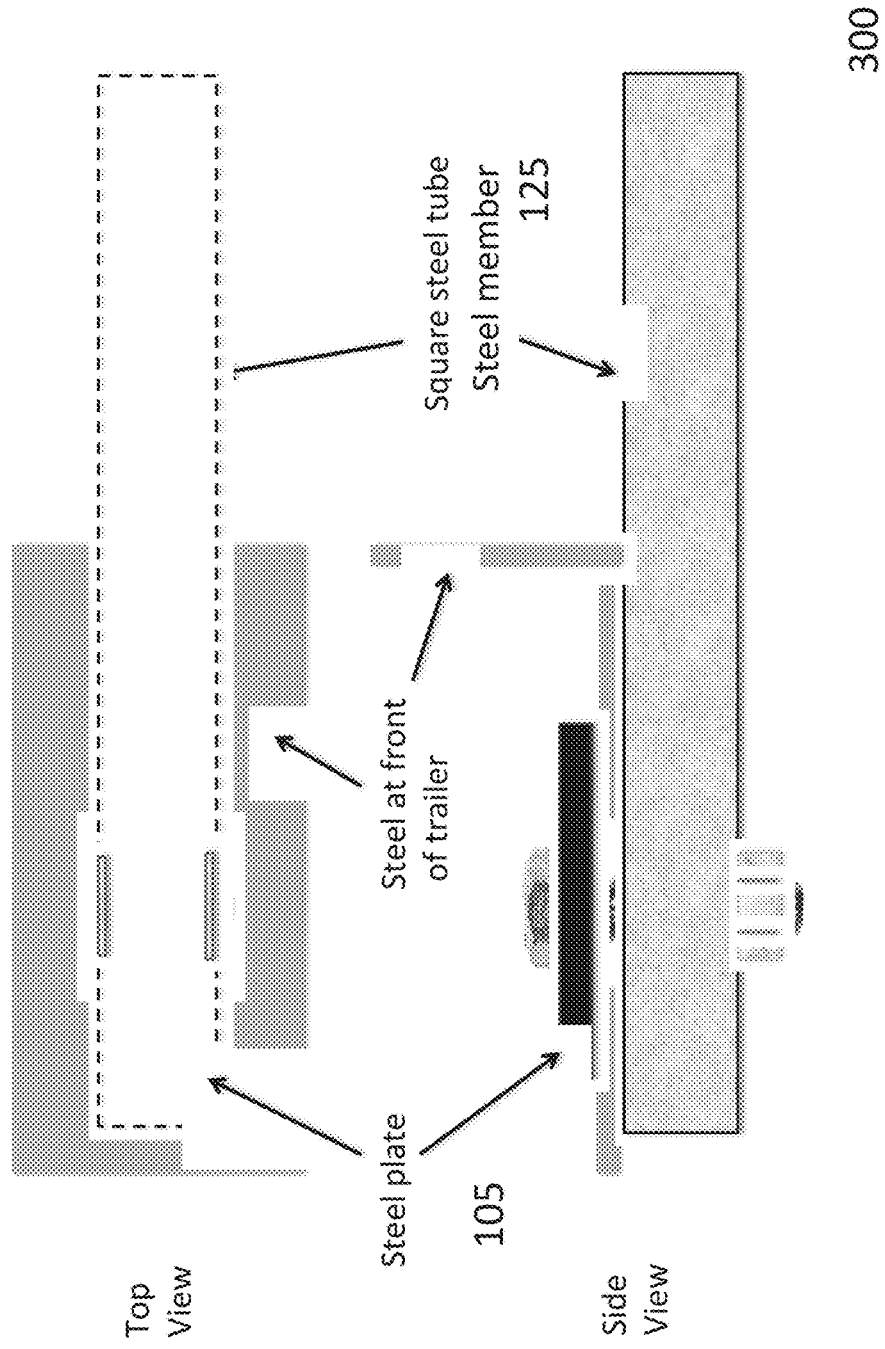

In some embodiments, part A may be held at the front of the trailer by a weld, for example, as shown in FIGS. 9B-D. In other implementations, part A may be held in place using hardware, either instead of or in addition to the weld. This hardware is configured to pull part A securely against the front of the trailer structure. FIG. 9F shows a side view of part A and B, wherein part A is secured to part B using a pin, which extends through parts A and B, and a turn buckle, which connects parts A and B. Additionally, a pin may also be used to hold the beam. FIG. 9G shows an alternative embodiment, wherein a pin extends through part A and part B, and additional hardware is used to connect part A, part B, and the pin.

Figure 10:
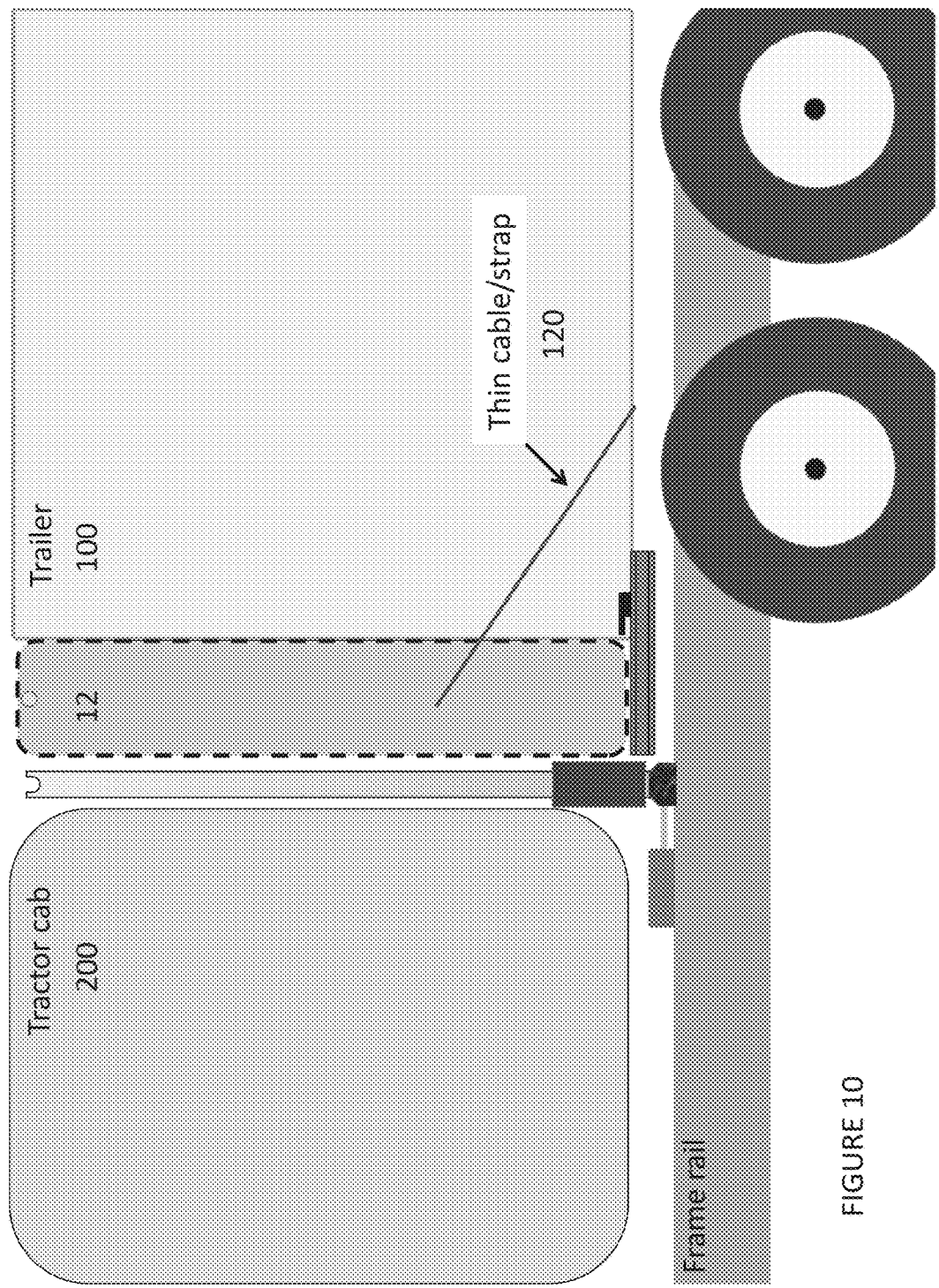
FIG. 10 shows an embodiment wherein the tanks are secured using a cable and/or strap.

In some embodiments, the cantilever support 300 is supplemented by one or more cables and/or straps 120 may be used to attach the tanks and/or a tank encasement to the trailer using the holes 115, as shown in FIG. 10. In some implementations, two straps or two cables may be used, where one strap or one cable is attached to through the holes 115 on the underside of the trailer on one side of the trailer and the other strap or cable is attached through the holes 115 on the underside of the other side of the trailer. In some implementations, another connecting mechanism may be used, while the straps are to supplement the connecting mechanism where extra force is exerted, such as during severe breaking or sharp turns. In some embodiments, the strap may be a four (4) inch wide strap, and the strap material may be sufficiently strong to secure the straps without causing any damage to the surface of the trailer 100. In another implementation, the tanks 12 may be attached to the trailer 100 using a cable 120 that attaches under the front center of the trailer 100 to a hook at the back top of a frame holding the tanks 12. In such an embodiment, a steel cable may be used.

Many box trailers have a steel plate with holes on the underside at the front allowing for the cantilever support mechanisms described above to be used. For these trailers, the trailers may not need to be modified. Some trailers, however, do not have the steel plate with holes. For these, the front end of the trailer can be modified in order to allow the cantilever support mechanism to be attached. In some implementations, a steel female receptacle structure can be welded to the underside of the steel structure of the trailer. A male cylindrical or I-beam structure can then be inserted and locked in place to support the tank modules.

Figure 11:
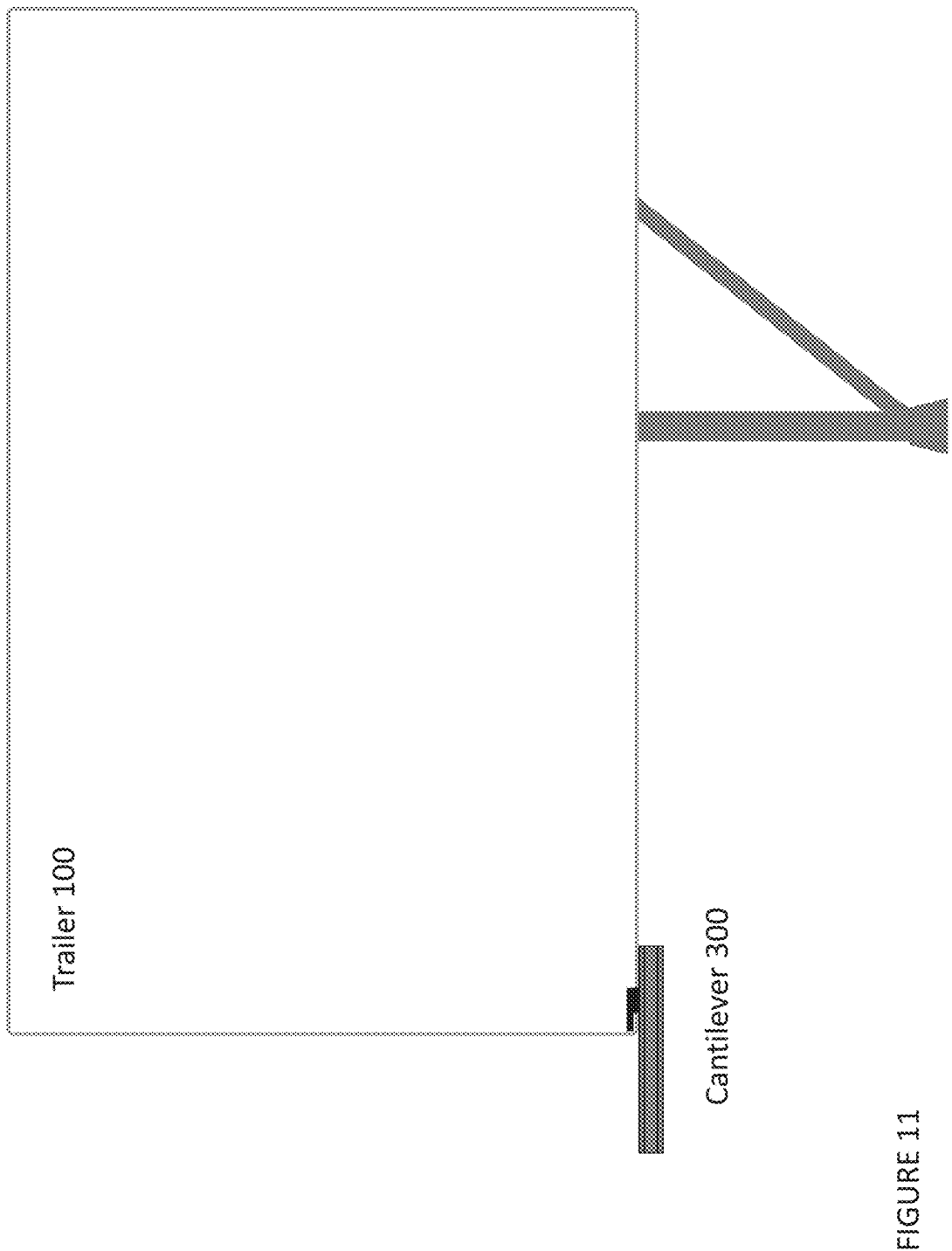
FIG. 11 shows the cantilever mechanism attached to the trailer.

FIG. 11 shows an embodiment where the cantilever 300 is attached to the trailer 100. In some embodiments, the cantilever 300 is attached to the trailer 100 before the trailer is connected to the tractor 200.

Figure 12A:
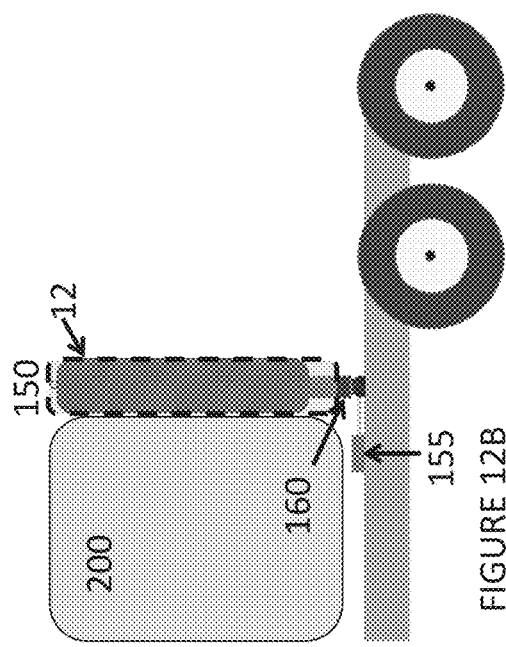
FIGS. 12A-D show an implementation wherein the tanks are loaded onto the tractor and transferred from the tractor to the trailer.
Figure 12B:
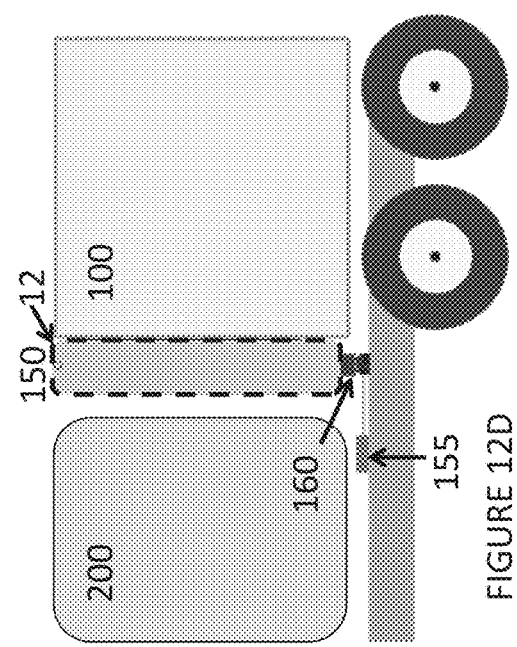
Figure 12C:
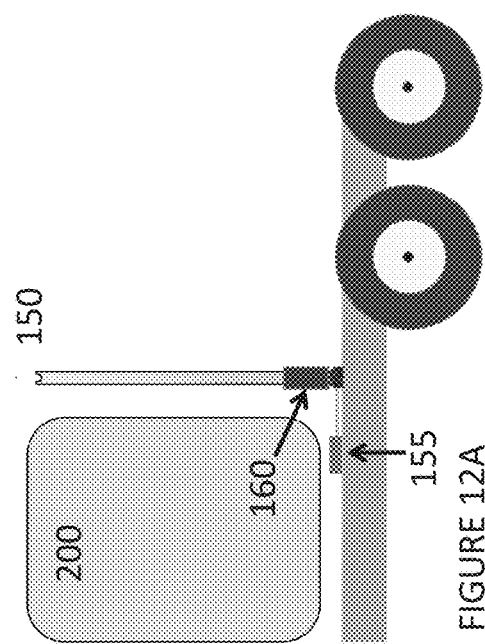
Figure 12D:
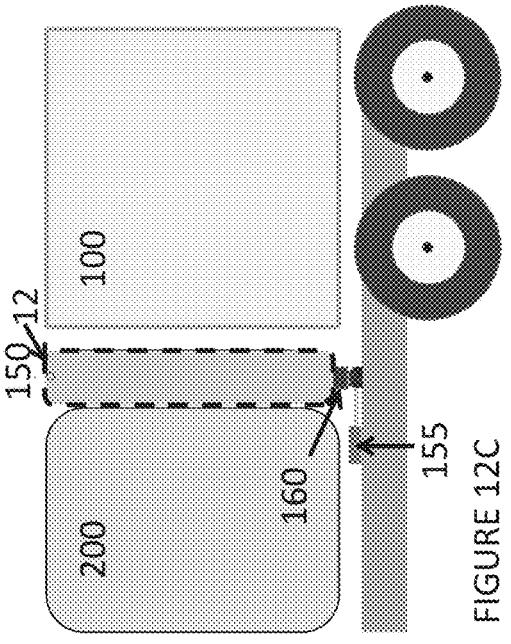

FIGS. 12A-12D show an implementation wherein the tanks are loaded onto the tractor and transferred from the tractor 200 to the trailer 100. FIG. 12A shows the tractor 200 with transfer mechanism 150 connected thereto. In some embodiments, the transfer mechanism 150 comprises an articulator 155 for positioning the transfer beams, and hydraulic jacks 160 for lifting the tanks or tank module, translating it backwards and lowering it into place on the trailer 100. FIG. 12B shows the transfer mechanism 150 connected to the tractor 200 with the tanks or tank module 12 attached thereto. In FIG. 12C, the tractor 200 is attached to the trailer 100, while the tanks 12 are still adjacent to the tractor 200. The articulator is then deployed to transfer the tanks 12 to the trailer 100.

Figure 13:
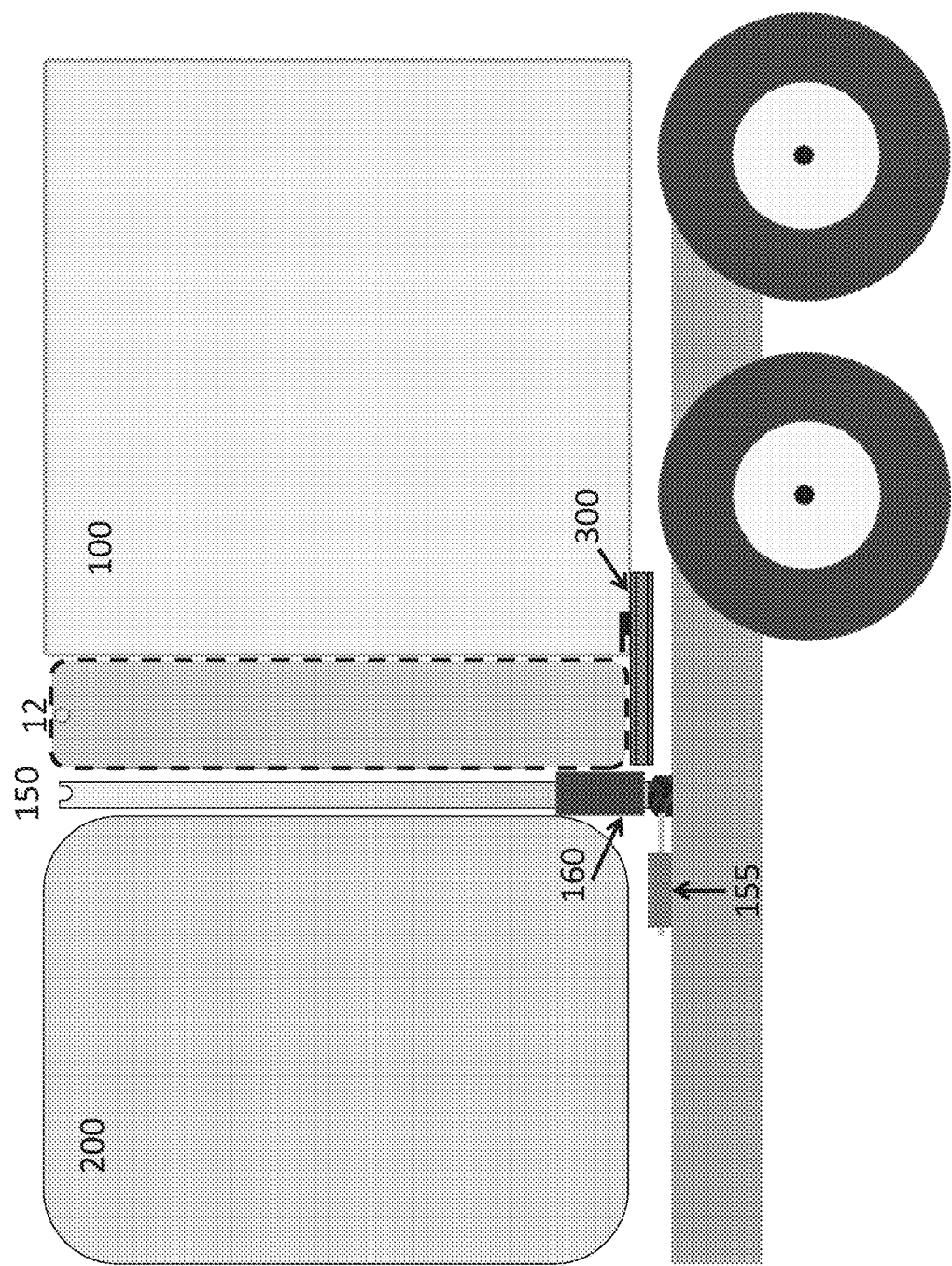
FIG. 13 shows a configuration with the transfer mechanism retracted from the tank.

FIG. 13 shows a configuration with the transfer mechanism 150 retracted from the tank and moved back to the stowed on-the-road position. The tractor 200 is connected to the trailer 100. Cantilever mechanism 300 is attached to the trailer 100, and the tanks 12 are also connected thereto. The transfer mechanism 150 may be stowed behind the tractor 200.

Figure 14A:
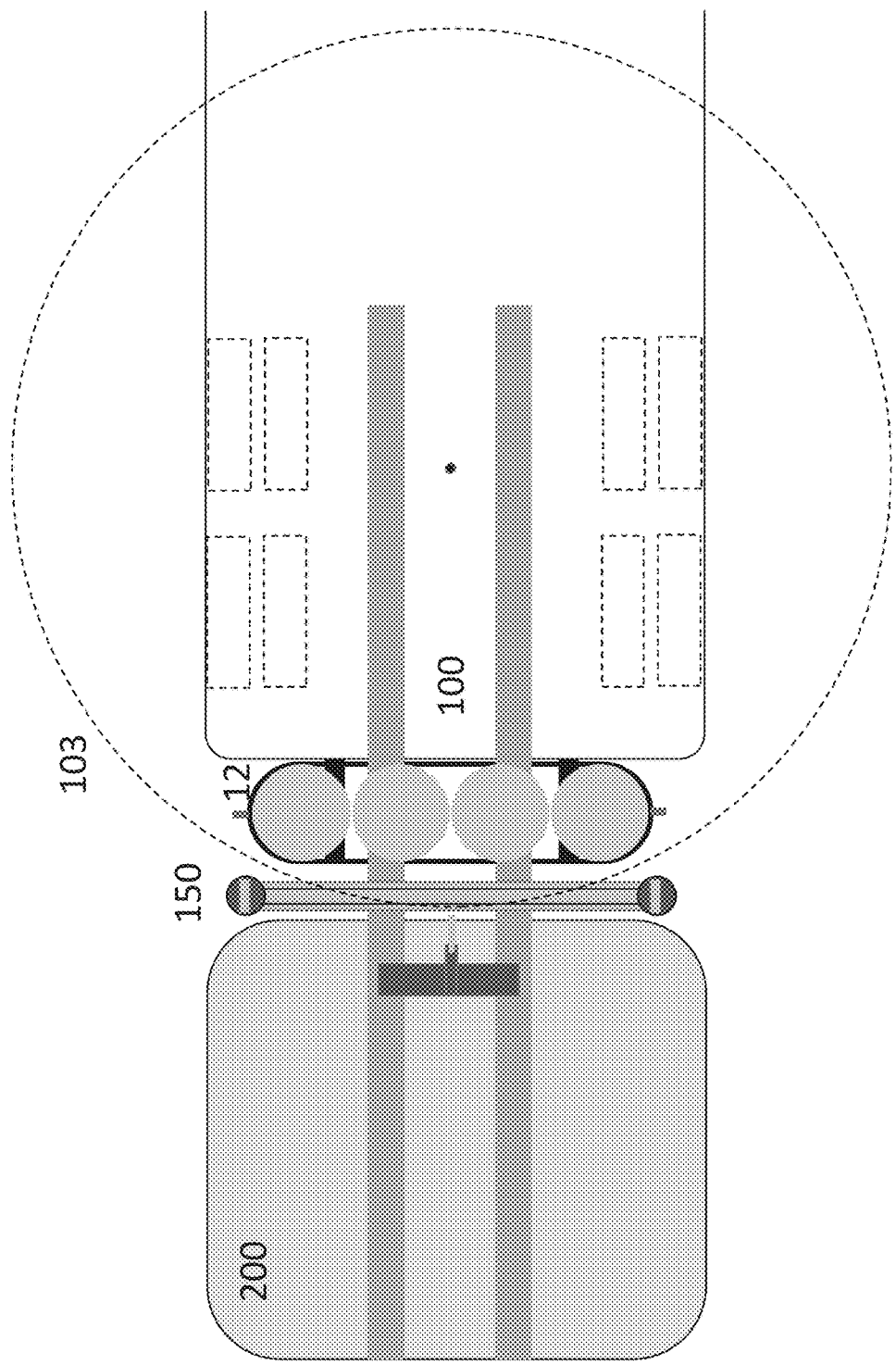
FIG. 14A shows a top view of the embodiment shown in FIG. 13.
Figure 14B:
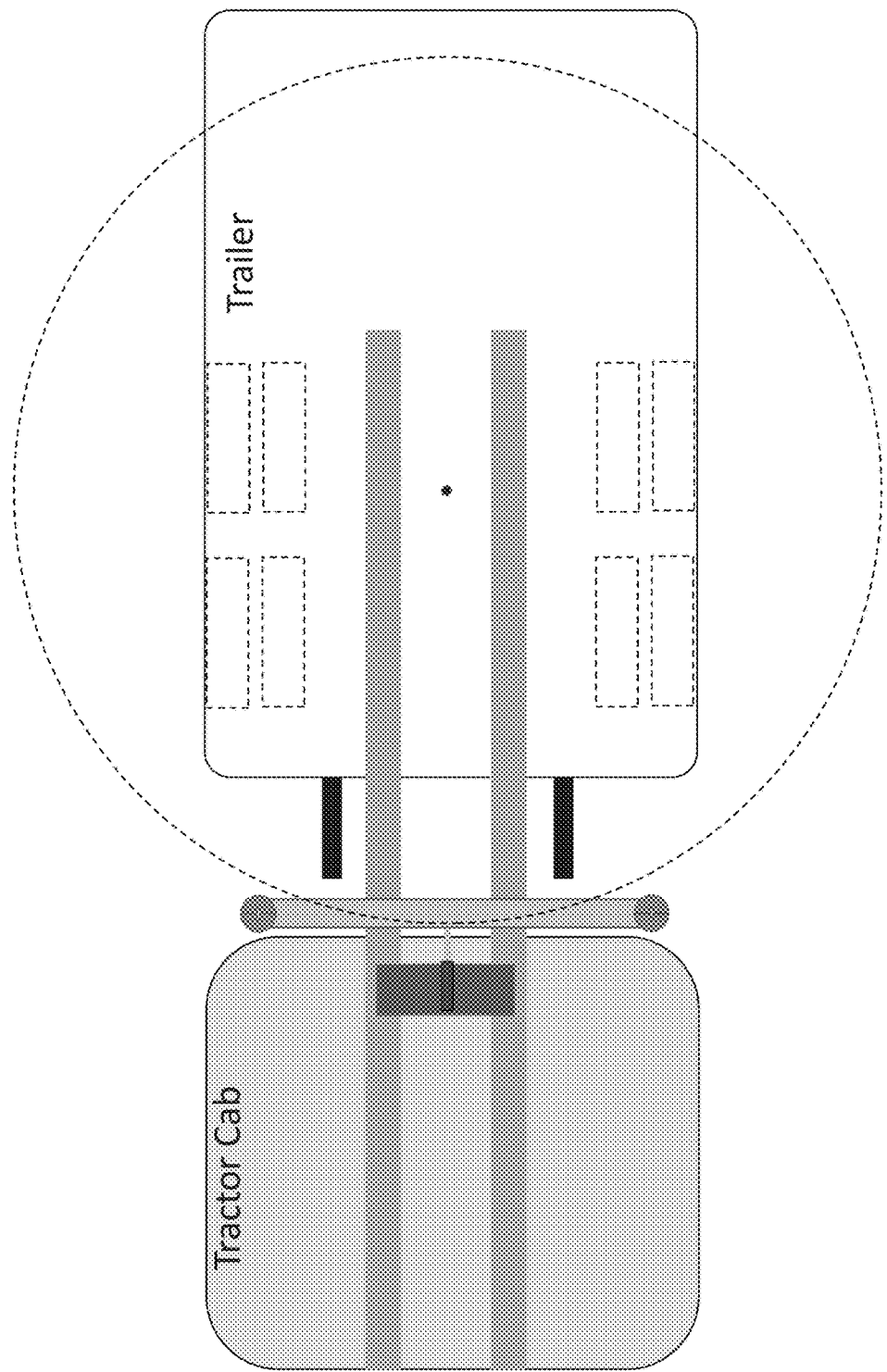
FIG. 14B shows a top view of the embodiment shown in FIG. 14A without the tanks.

FIG. 14A shows a top view of the embodiment shown in FIG. 13. The tractor 200 is attached to the trailer 100. The transfer mechanism 150 is disposed behind the tractor 200, and the tanks 12 are connected to the trailer 100. The tractor interference radius 103, is shown in the figure as the dotted circle, is the same circle as described above with respect to FIG. 6B. FIG. 14B shows a top view of the embodiment of FIG. 14A without the tanks.

As shown from this top view, the tanks 12 may be a module containing multiple tanks. All of the tanks and the module are within the tractor interference radius 103. In some embodiments, the module may contain several tanks, and the tanks may be the same volume and may have the same radius, while in other embodiments, the tanks may have differing volumes and/or radii.

Figure 15A:
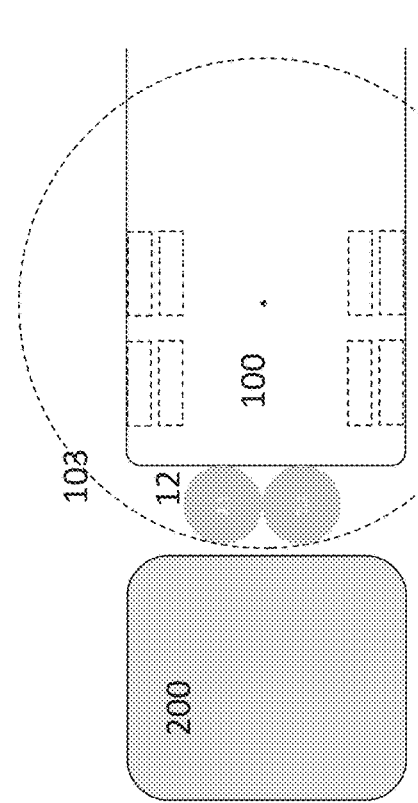
FIGS. 15A-C show various embodiments with tanks of differing volumes between the tractor and the trailer.
Figure 15B:
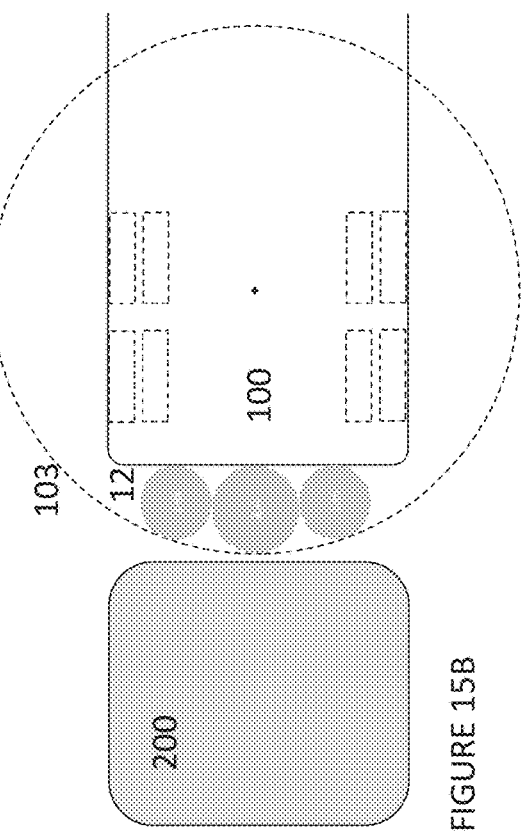
Figure 15C:
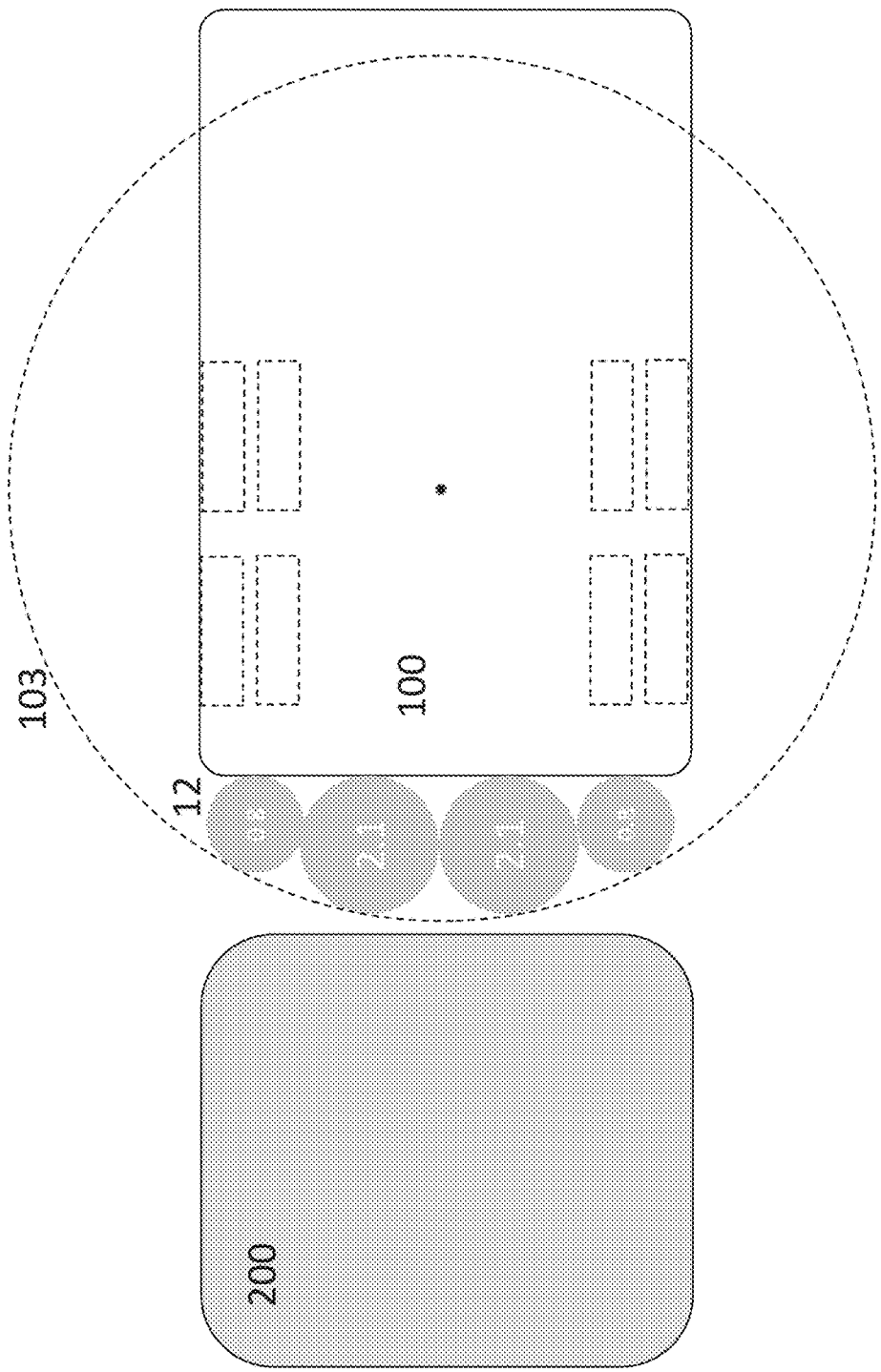

In some implementations, the volumes of the tanks 12 can be optimized based on the tractor interference radius 103. FIG. 15A shows an embodiment with two tanks 12, where each tank is optimized such that the tanks fill as much of the space within the tractor interference radius 103 as possible. In such an embodiment, each tank 12 may be able to hold the equivalent of 2.1×, where x is the volume of one of the four equal volume tanks. This means that the tanks in this configuration hold more volume than the four tanks of equal volume. FIG. 15B shows yet another embodiment, wherein three tanks are optimized to fit within the tractor interference radius 103. In this embodiment, the tanks can hold 1.45×, 2.4×, and 1.45×, where x is the volume of one of the four equal volume tanks. This configuration therefore holds more volume than the configuration shown in FIG. 15A. FIG. 15C shows yet another embodiment. Here, four tanks are optimized to fit within the tractor interference radius 103. Each tank holds the following volume where x is the volume of one tank when there are four tanks of equal volume: 0.8×, 2.1×, 2.1× and 0.8× for a total volume of 5.8×. This configuration, therefore, contains as much volume as 5.8 of the equal volume tanks shown in FIG. 14.

Figure 16:
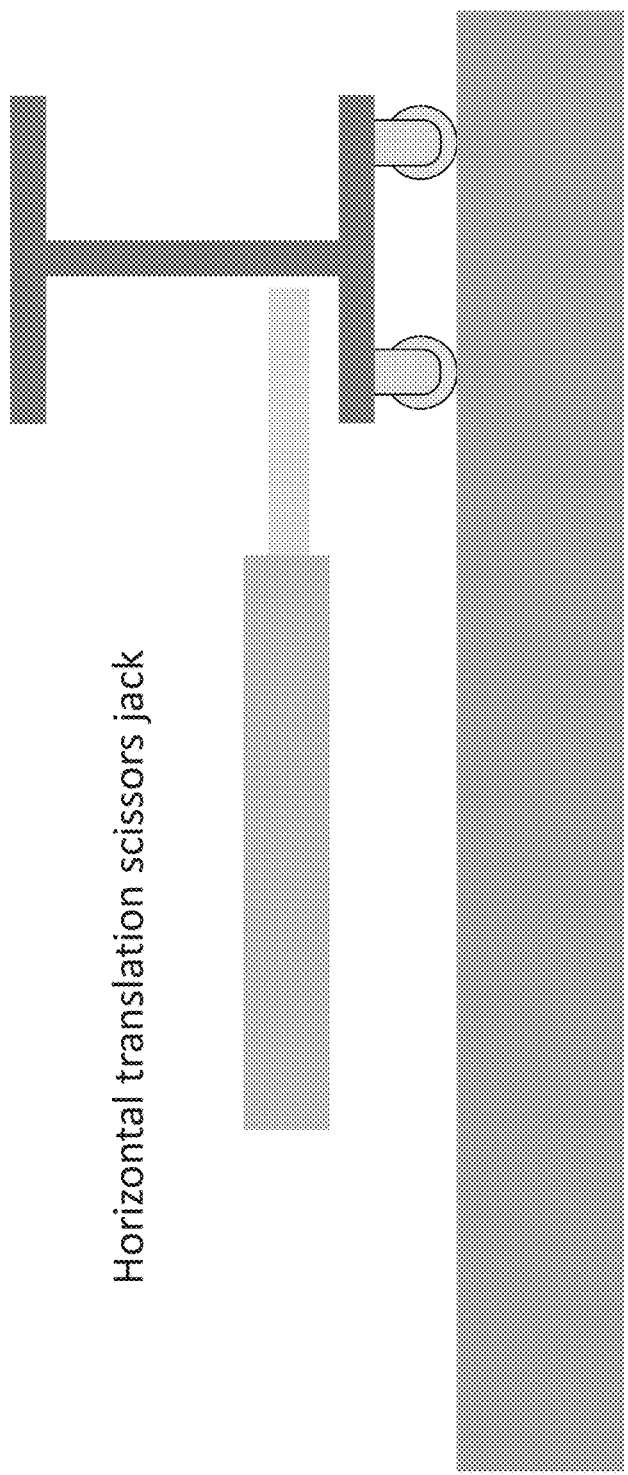
FIG. 16 shows a horizontal translation scissors jack.

Various horizontal support beams, vertical lift jacks, horizontal translation jacks, and vertical lift bars can be used as part of transfer mechanism 150 and transfer mechanism 170. A horizontal translation scissor jack is shown in FIG. 16. In some embodiments, the horizontal translation scissors jack is the actuator, which pushes backward and pulls forward the horizontal transfer beam. This in turn supports the two hydraulic jacks and the vertical transfer beams, which can then raise and lower the tank module during the tank transfers. Also shown in FIG. 16 is an end view of the horizontal transfer beam (shown as an I-beam) which is supported and rides on the frame rail via rollers. In some implementations, four rollers can be used. The near frame rail and rollers are shown in FIG. 16.

The horizontal translation scissors jack can be used in the horizontal motion steps in the tank transfer process. In some implementations, this process may include lifting, moving horizontally, lowering, lifting, moving horizontally, and lowering. In transferring from tractor 200 to trailer 100, the tanks 12 can be lifted from the resting point on the tractor 200, for example the top of the horizontal transfer beam. The tanks 12 can then move towards the trailer 100 until the tanks 12 are over the final resting point on the trailer 100. The tanks 12 can then be lowered to the resting point on the trailer 100. In some embodiments, this process can account for additional space, such as a couple inches, to clear the vertical transfer beam of the support rod at the top of the tank module.

In some embodiments, the transfer mechanism 150 may have a final store position at the back of the tractor 200. After the tanks 12 have been moved to the front of the trailer 100, the transfer mechanism 150 pull or be pulled forward the final storage point on the tractor, then lowered to a final store position. This may be analogous to the operation of a forklift, as it lifts, moves, lowers, etc.

Figure 17:
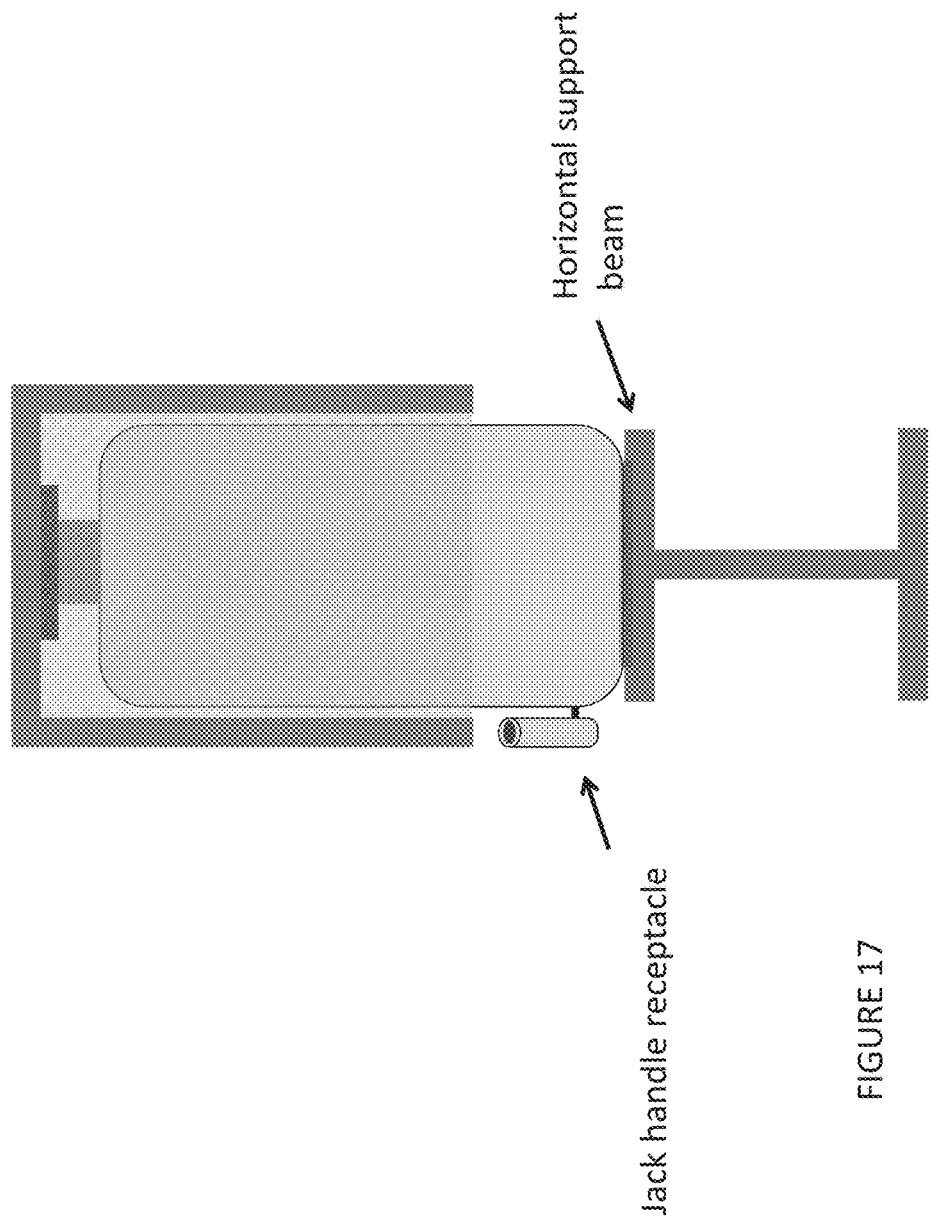
FIG. 17 shows a vertical translation jack.
Figure 18C:
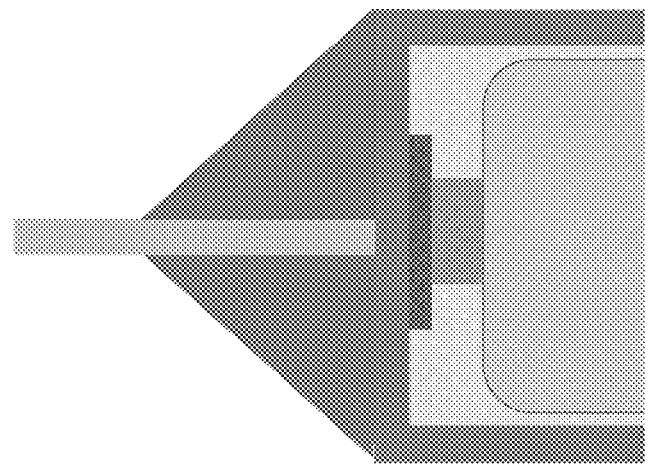
FIGS. 18A-C show various views of a vertical lift bar
Figure 18B:
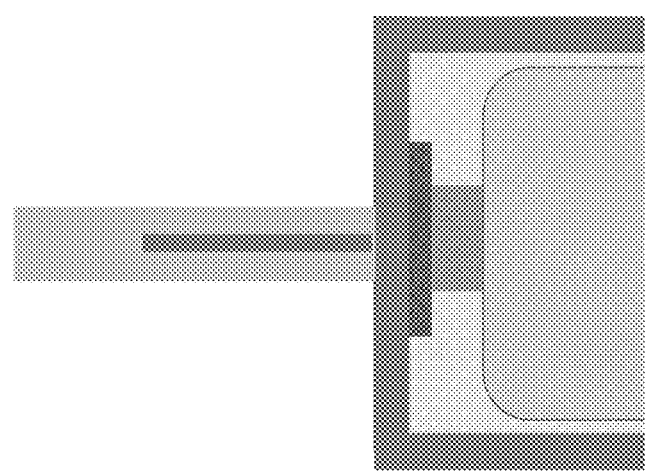
Figure 18A:
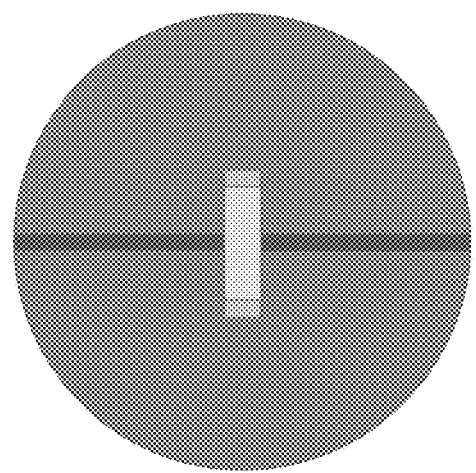
Figure 19:
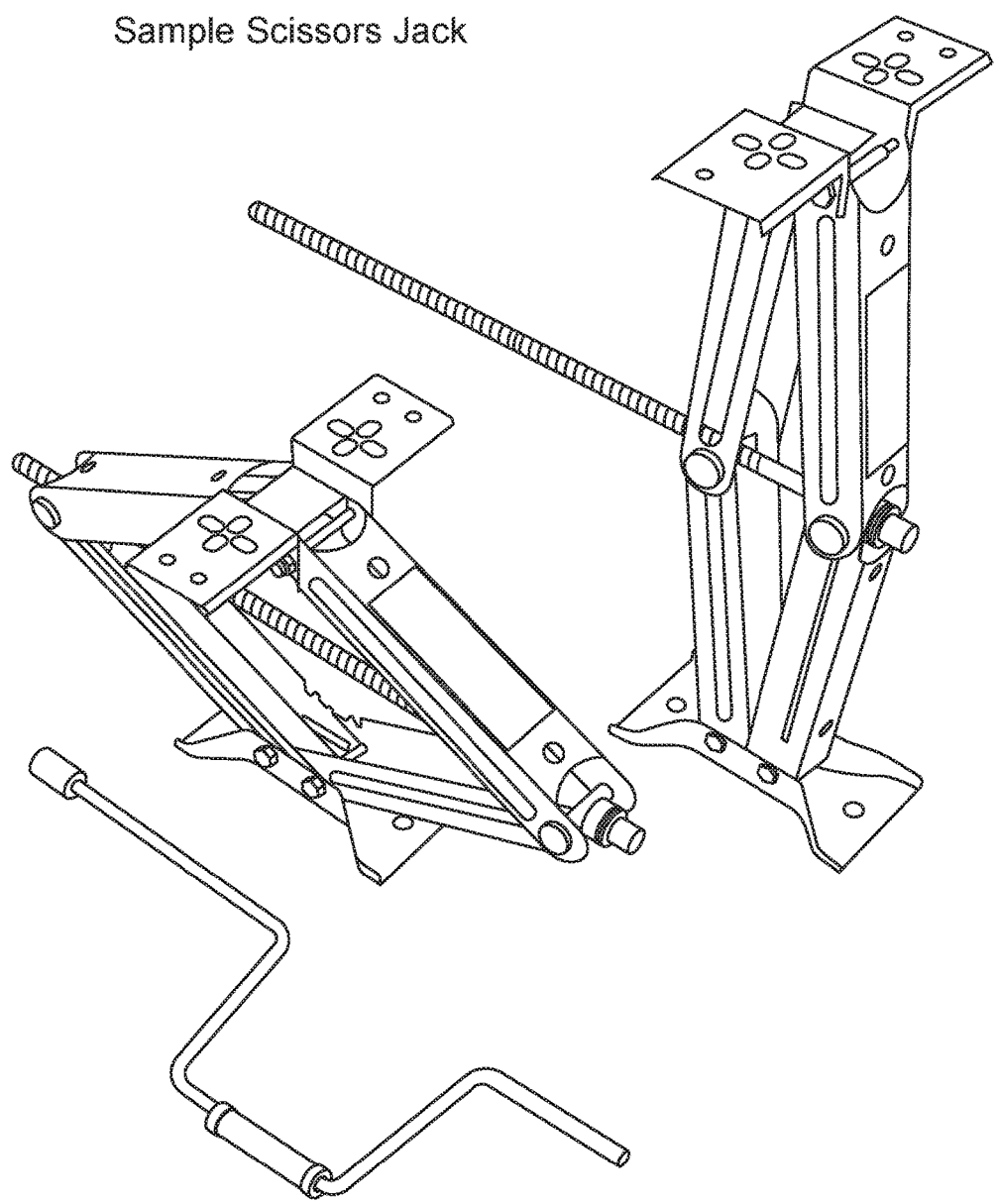
FIG. 19 shows a sample scissors jack.
Figure 20:
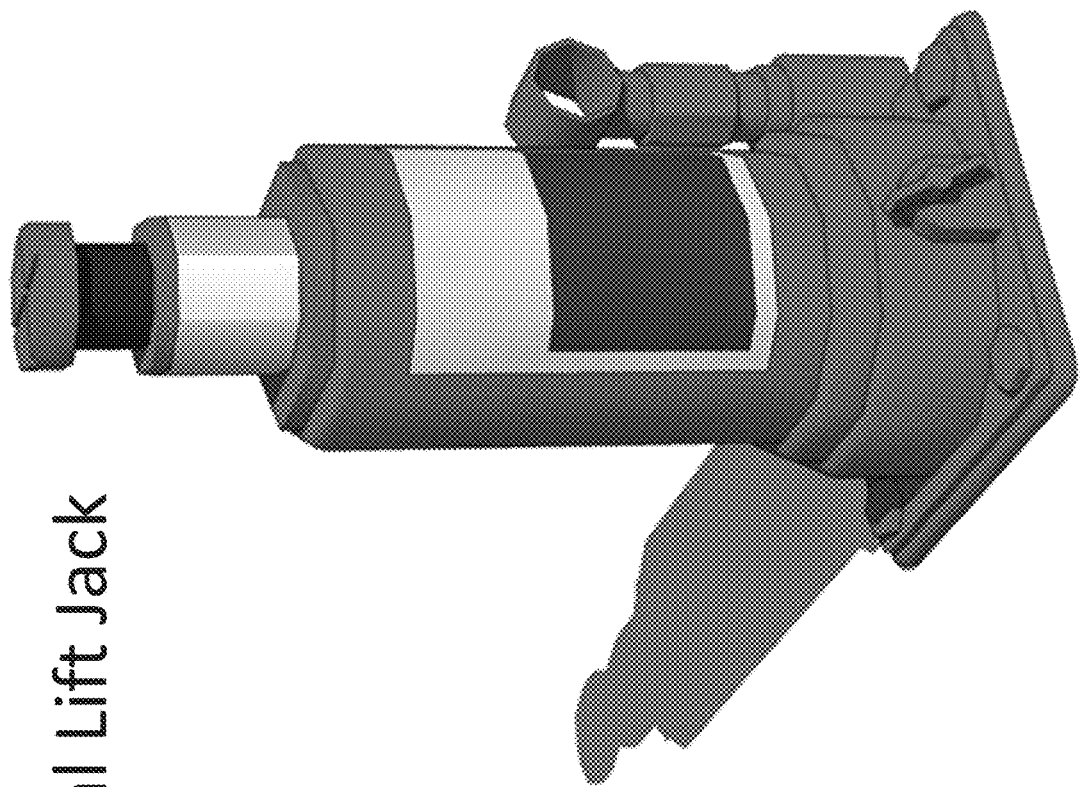
FIG. 20 shows a sample vertical lift jack.

A vertical translation jack is shown in FIG. 17. The vertical translation jacks can be used as the actuators to cause the vertical lifting and lowering movements described above. A vertical lift bar may also be used; the top view is shown in FIG. 18A, the side view is shown in FIG. 18B, and the front view is shown in FIG. 18C. A scissors jack, as shown in FIG. 19, and/or a vertical lift jack, as shown in FIG. 20, may also be implemented.

Figure 21A:
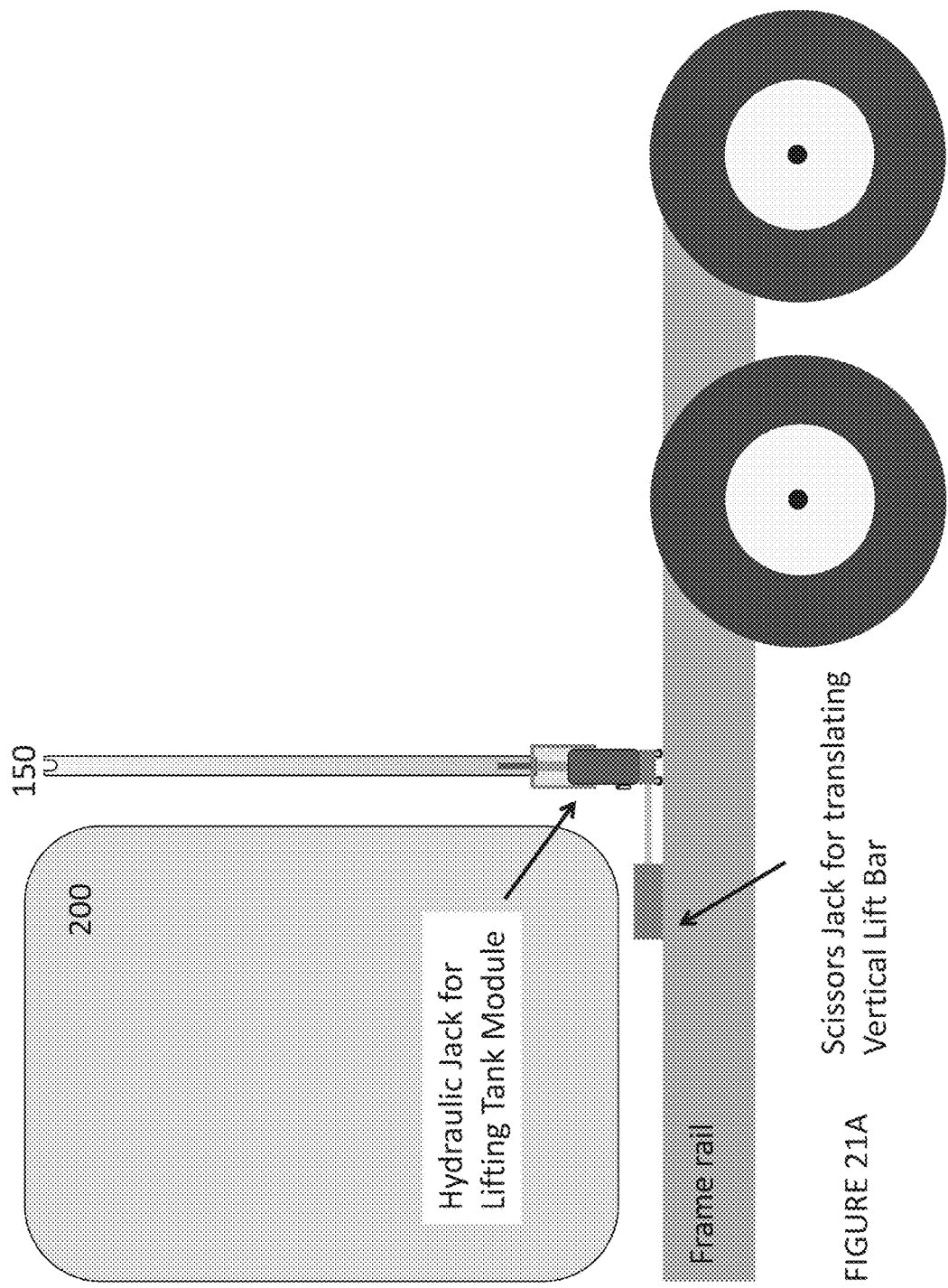
Figure 21C:
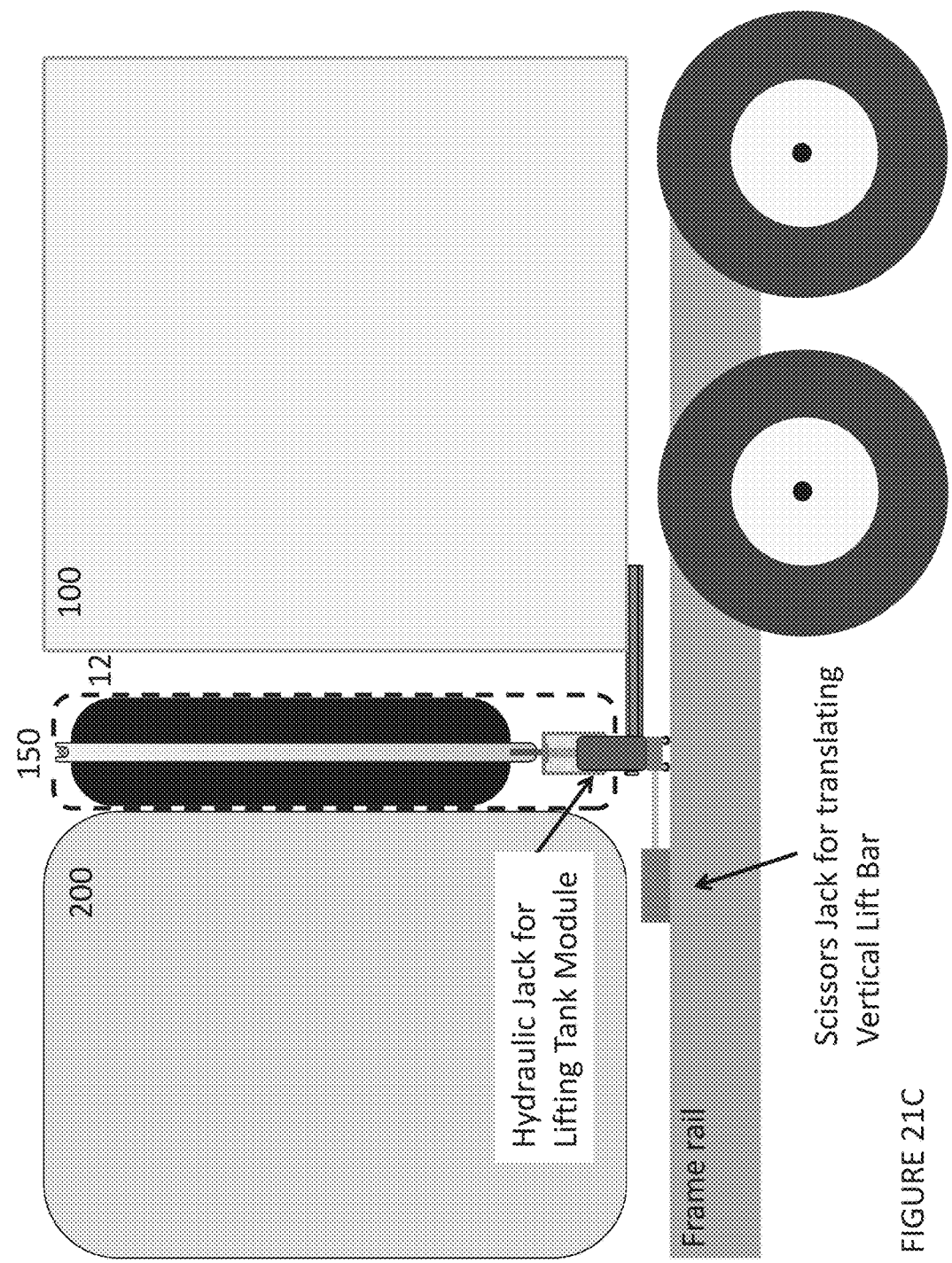
Figure 21E:
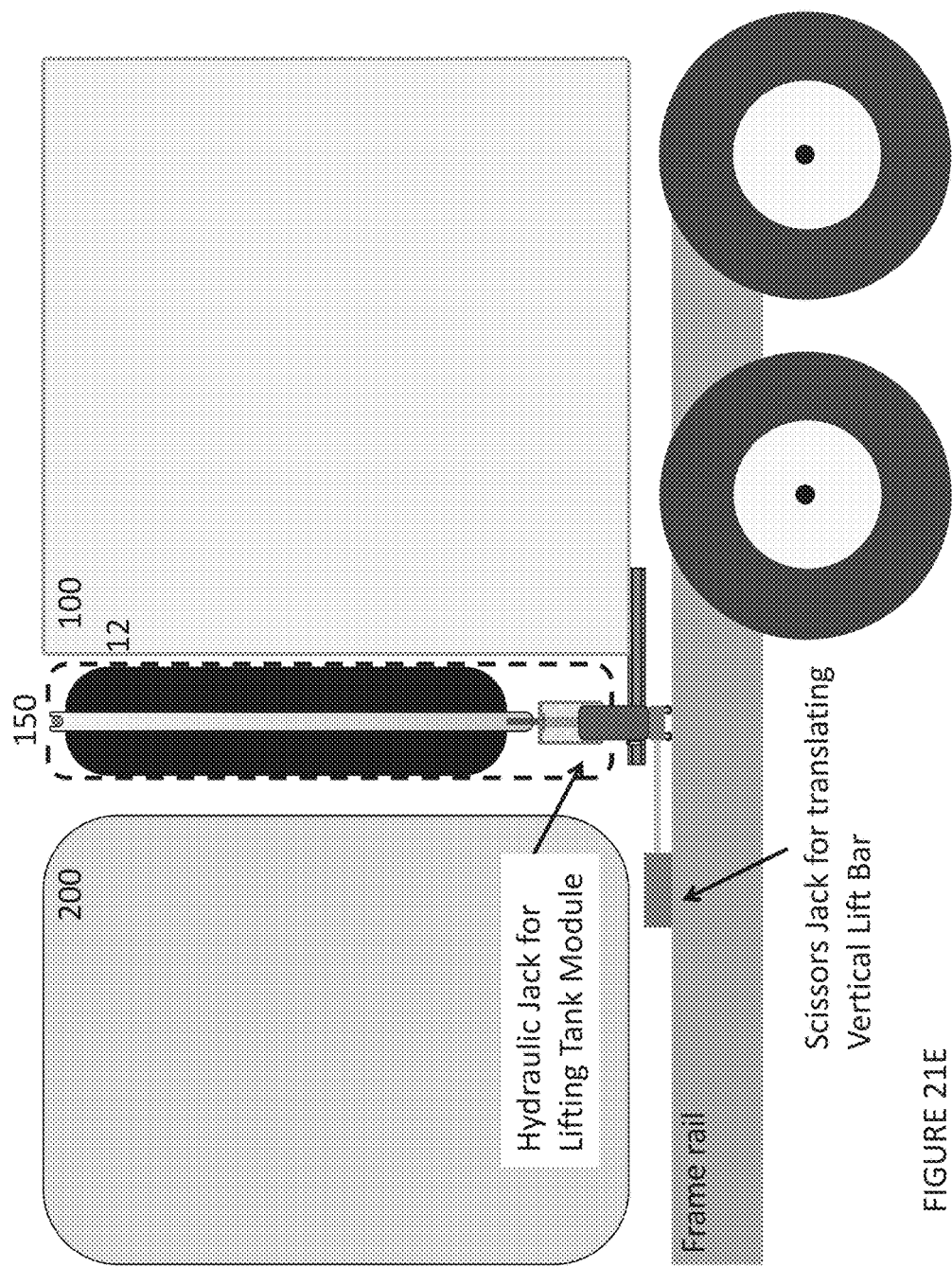
Figure 21F:
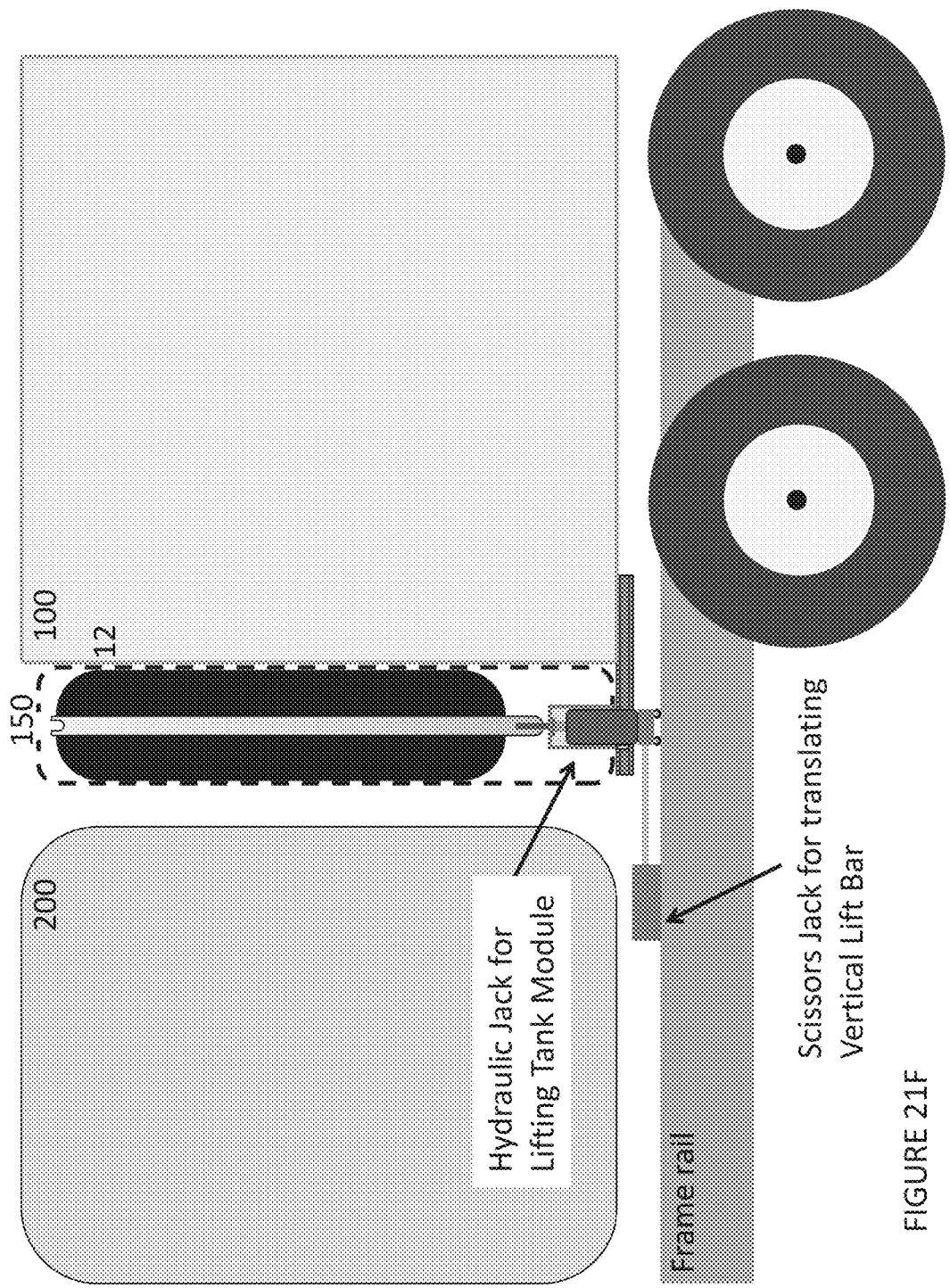
Figure 21G:
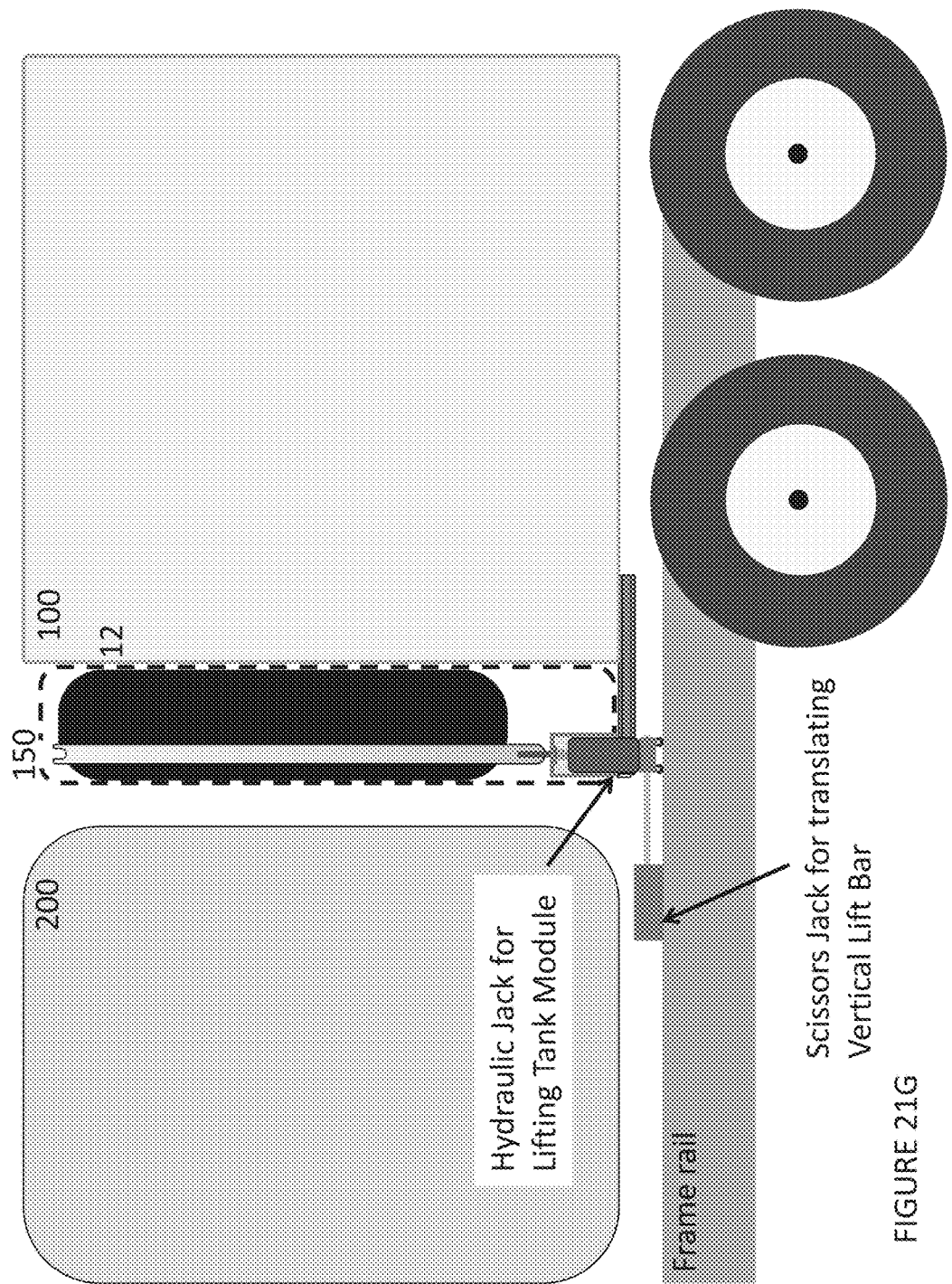
Figure 21H:
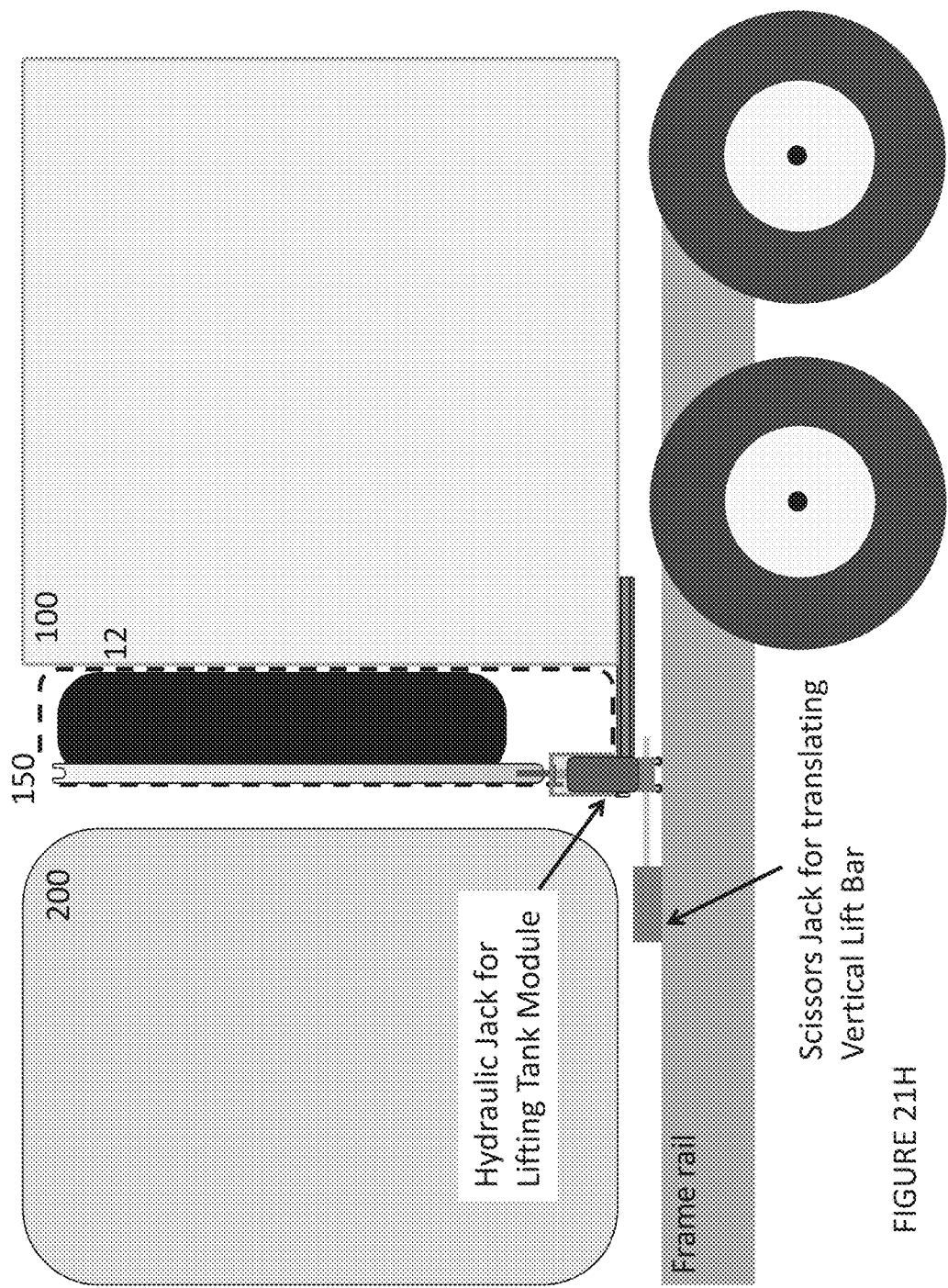
Figure 21I:
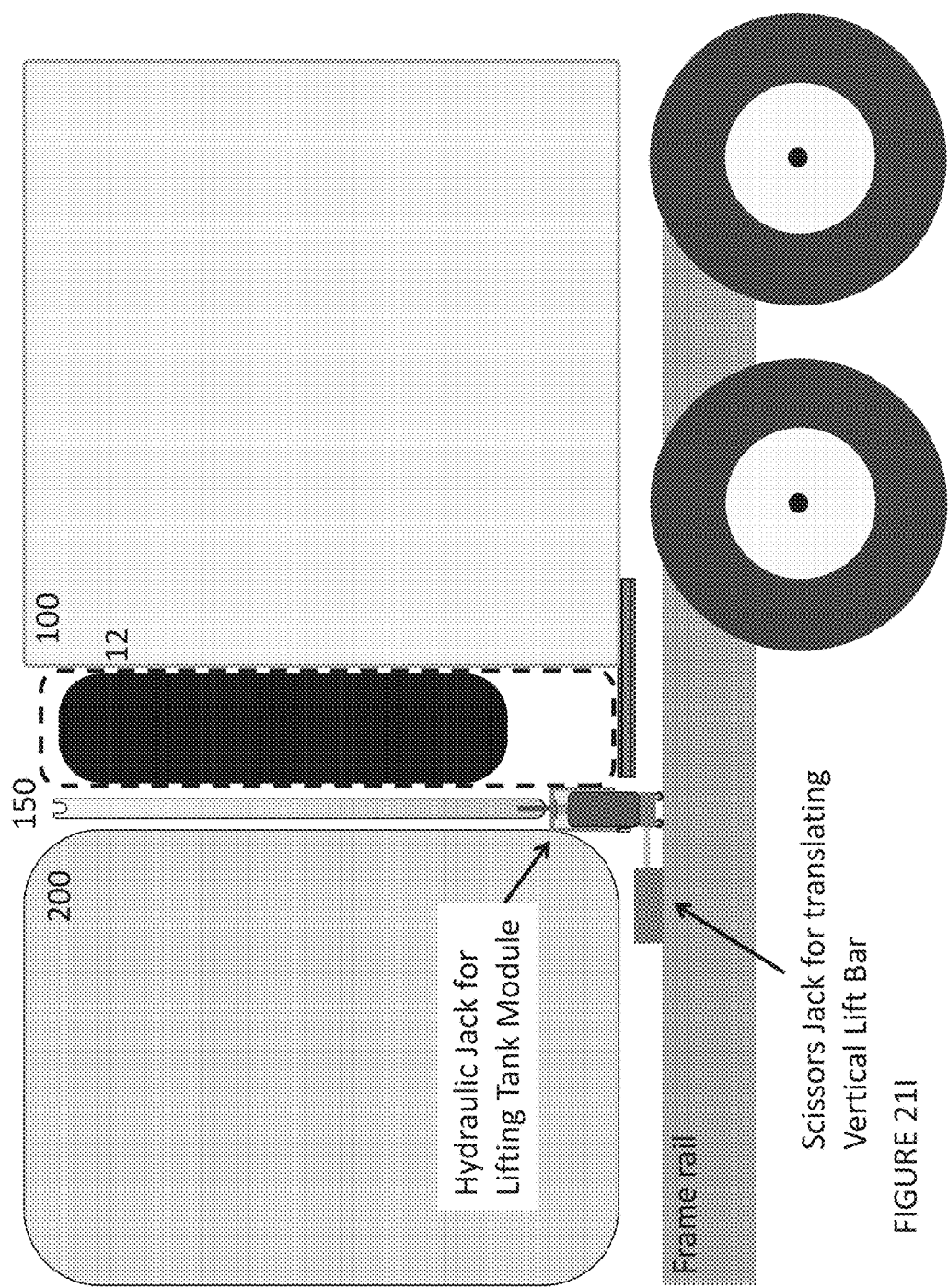

FIGS. 21A-H show a sample embodiment. FIG. 21A shows am embodiment wherein the tractor 200 is connected to a transfer mechanism 150. Parts of the transfer mechanism 150 can include a vertical lift bar, a scissors jack used to translate the vertical lift bar scissors jack, and a hydraulic jack to lift the tank module. The transfer mechanism 150 may also include an actuator for positioning transfer beams. In FIG. 21B, tanks 12 have been attached. FIG. 21C shows the trailer 100 attached to the tractor 200 via cantilever 300. The tanks 12 can be lifted, as shown in FIG. 21D. The tanks can be translated back towards the front of the trailer 100, as shown in FIG. 21E. FIG. 21F shows the tanks 12 lowered to their final position at the front of the trailer 100. In some embodiments, the transfer mechanism 150 may stay connected to the tanks 12. In other implementations, the transfer mechanism 150 disengages from the connection to the tanks 12 and moves towards the final position for the transfer mechanism 150, which can be closer to the tractor 200 than the trailer 100. This motion is shown in FIG. 21G. FIG. 21H shows the transfer mechanism 150 in its final position. In some embodiments, however, the transfer mechanism 150 may further retract to the configuration shown in FIG. 21I when the truck is on the road.

FIGS. 22A-H show a flow diagram, data flow, and embodiments where the tanks 12 are mounted on the tractor 200 of a semi-tractor-trailer truck. The tanks 12 can be mounted on a fixture, which can be translated outward. In some embodiments, this can ensure that the tanks 12 do not interfere with the trailer 100 when the truck is turning a corner or maneuvering in such a way that might result in interference with the trailer 100. During usual operation, such as when the truck is driving on the highway, the truck is traveling on the road, and there is only a small angle between the tractor 200 and trailer 100, even when the truck makes turns. Thus, while driving, the tanks 12 can be in an inboard position that is within the maximum width of the tractor 200 and/or trailer 100. When the truck is turning a tight corner or otherwise maneuvering, the angle between the tractor 200 and trailer 100 can increase. Generally, this occurs when the truck is moving at relatively low speeds. In such embodiments, the tanks 12 can be moved outward, such as to the position shown as 12A, to avoid interference with the trailer 100. This can allow larger tanks 12 to be mounted on the back of the tractor 200.

In some embodiments, this articulated wing tank module can be comprised of any combination of: tanks 12, modules or fixtures to support and/or enclose the tanks 12, moveable support structures, a horizontal support bar, horizontal translation actuators, a control system, and various sensors to measure at least one of: the front wheel steering angle, the angle between the tractor 200 and the trailer 100, and the positions of the horizontal actuators.

Figure 22A:
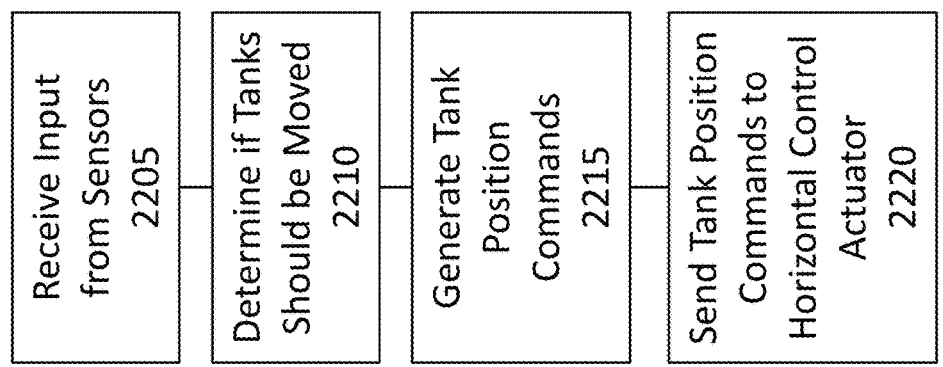

As shown in FIG. 22A, the control system can receive inputs from various sensors (stage 2205), such as angle and/or position sensors, and can determine when the tanks 12 should be moved (stage 2210). In some embodiments, the inputs may include whether a trailer is mounted on the tractor, the trailer angle, steering angle, truck speed, GPS data, and/or the like. Once the control system makes this determination, the control system can generate tank position commands (stage 2215) and send the tank position commands to activate the horizontal control actuator (stage 2220). In some embodiments, the control unit can determine that the sensor(s) have detected an angle and/or position above a preset threshold, which can trigger the signal to the horizontal control actuator.

Figure 22B:
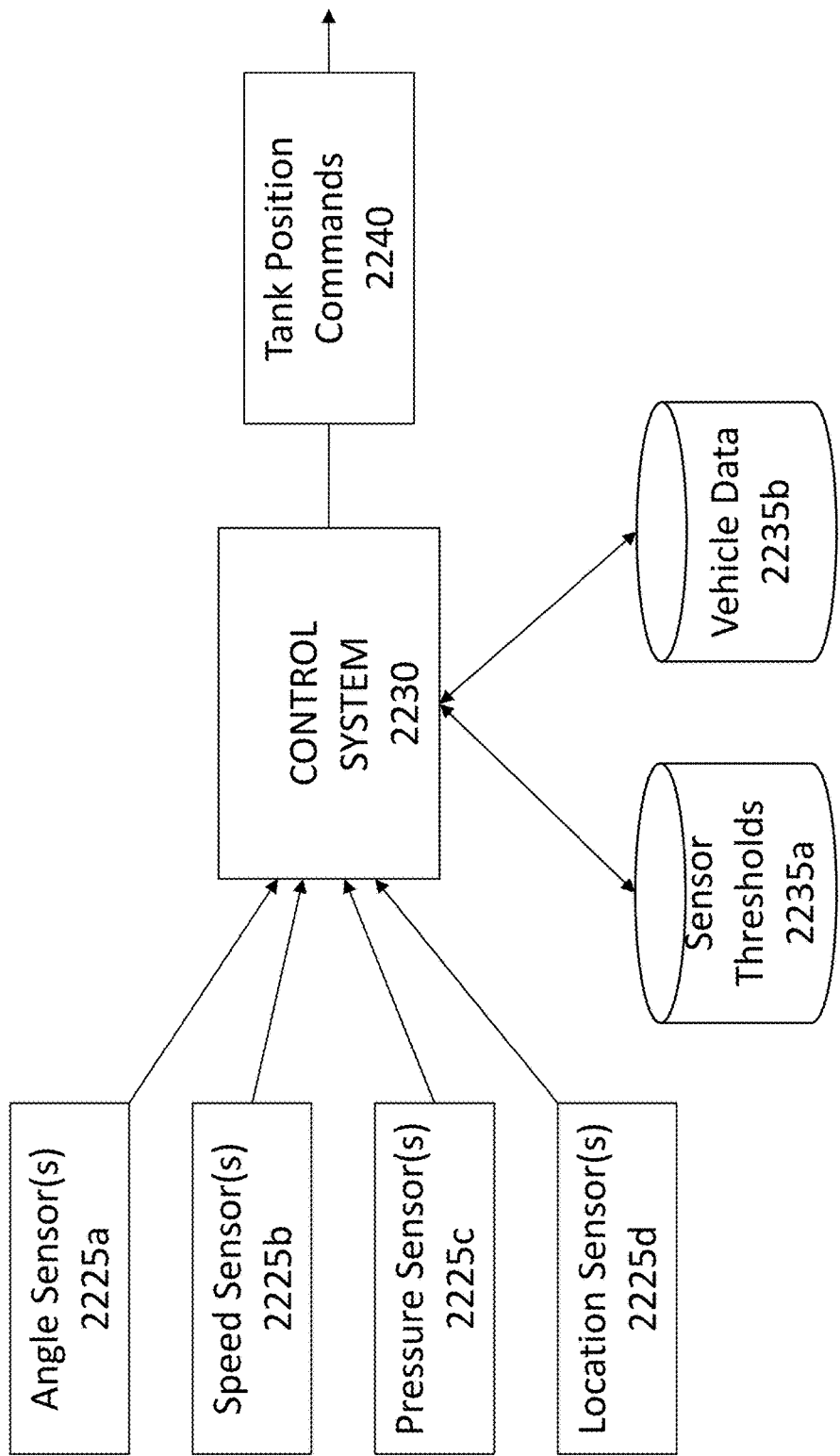

FIG. 22B shows an example embodiment of data flow for the control system. The control system receives data from sensors, such as angle sensor(s) 2225a, speed sensor(s) 2225b, pressure sensor(s) 2225c, location sensors 2225d, and/or the like. The control system may include or be connected to one or more databases. For example, the sensor thresholds database 2235a may include thresholds above which tank position commands are generated. Vehicle data may include information such as dimensions of the tractor, dimensions of the trailer, weight of the trailer, and/or the interference radius 103. If the control system 2230 determines that the sensor readings are above the sensor thresholds for the vehicle, the control system sends tank position commands 2240 in order to trigger the signal to the horizontal control actuator and move the tanks 12.

The moveable support structures that move the tanks 12 can have rollers or may slide along the horizontal support bar. The horizontal support bar can be attached, via a fastening mechanism, to the frame rails. In some embodiments, the fastening mechanism is a U-bolt fastener attached either on top of or underneath the frame rails. The horizontal translation actuators can attach to the moveable support structures and to the frame rails or the horizontal support bar. In some embodiments, the horizontal translation actuators can be electrically driven or could operate off the compressed air system of the tractor.

Figure 22C:
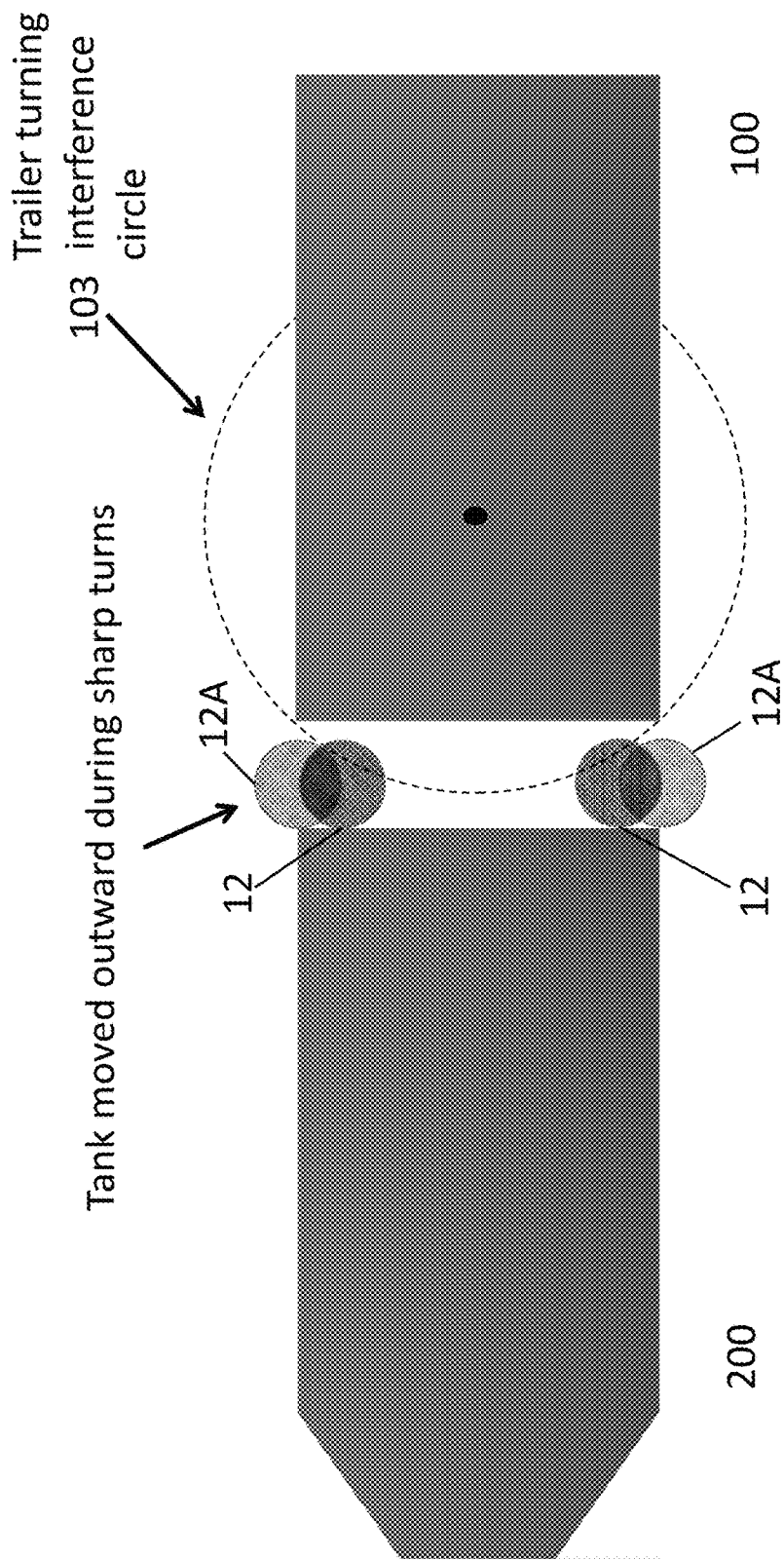

FIG. 22C shows an embodiment where one tank 12 is mounted on each side of the tractor 200. The tanks 12 can be moved to position 12A when the control unit determines that the tanks 12 should be moved. When the tanks 12 are moved to position 12A, they can be outside the interference radius 103, such that the tanks 12 do not interfere with trailer 100 when the truck turns sharp corners. In some embodiments, the tank movement may be approximately thirteen inches. In other embodiments, the tank movement may be about twenty-four inches, about twenty inches, about eighteen inches, about sixteen inches, about fourteen inches, about twelve inches, about ten inches, about eight inches, or about six inches. The movement may also be more than twenty-four inches or less than six inches.

Figure 22D:
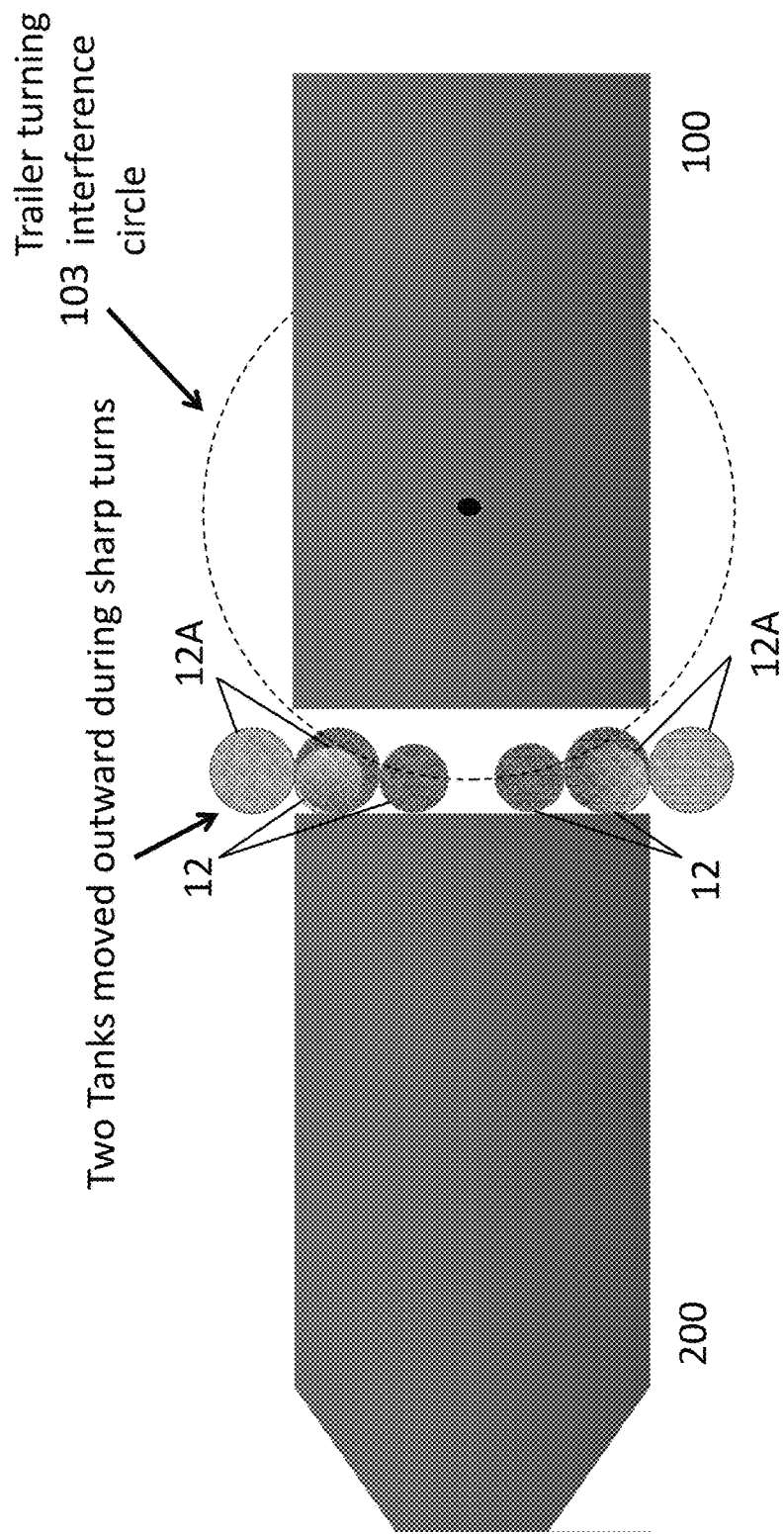

FIG. 22D shows an embodiment where two tanks 12 of different sizes are mounted on each side of the tractor 200, such that there are four tanks 12 attached to the trailer 100. In some embodiments, the four tanks 12 can all be of equal size. The tanks 12 can be moved outwardly to position 12A when the control unit determines that the tanks 12 should be moved.

Figure 22E:
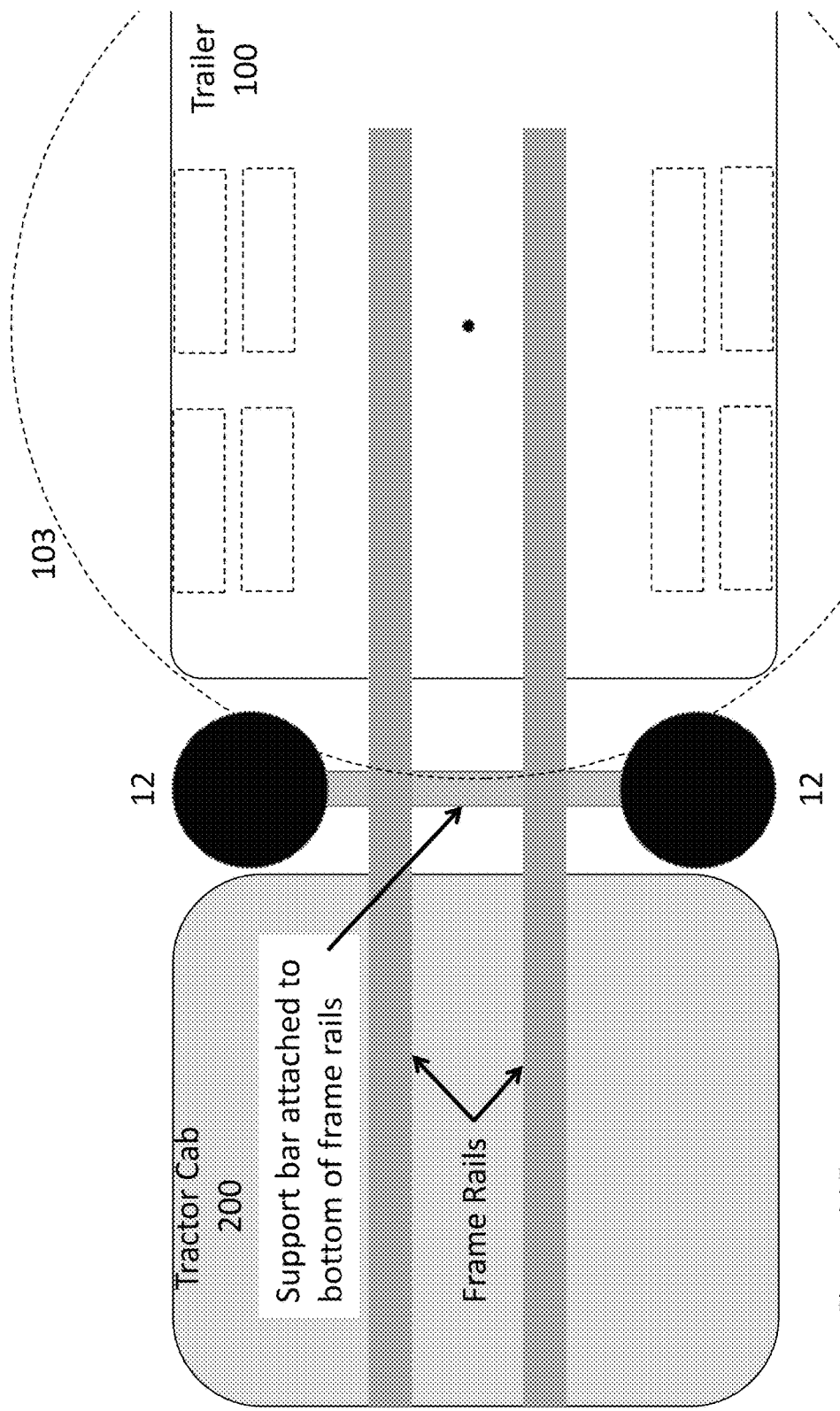

FIG. 22E shows an embodiment where the horizontal support bar is attached to the underside of the frame rails.

Figure 22F:
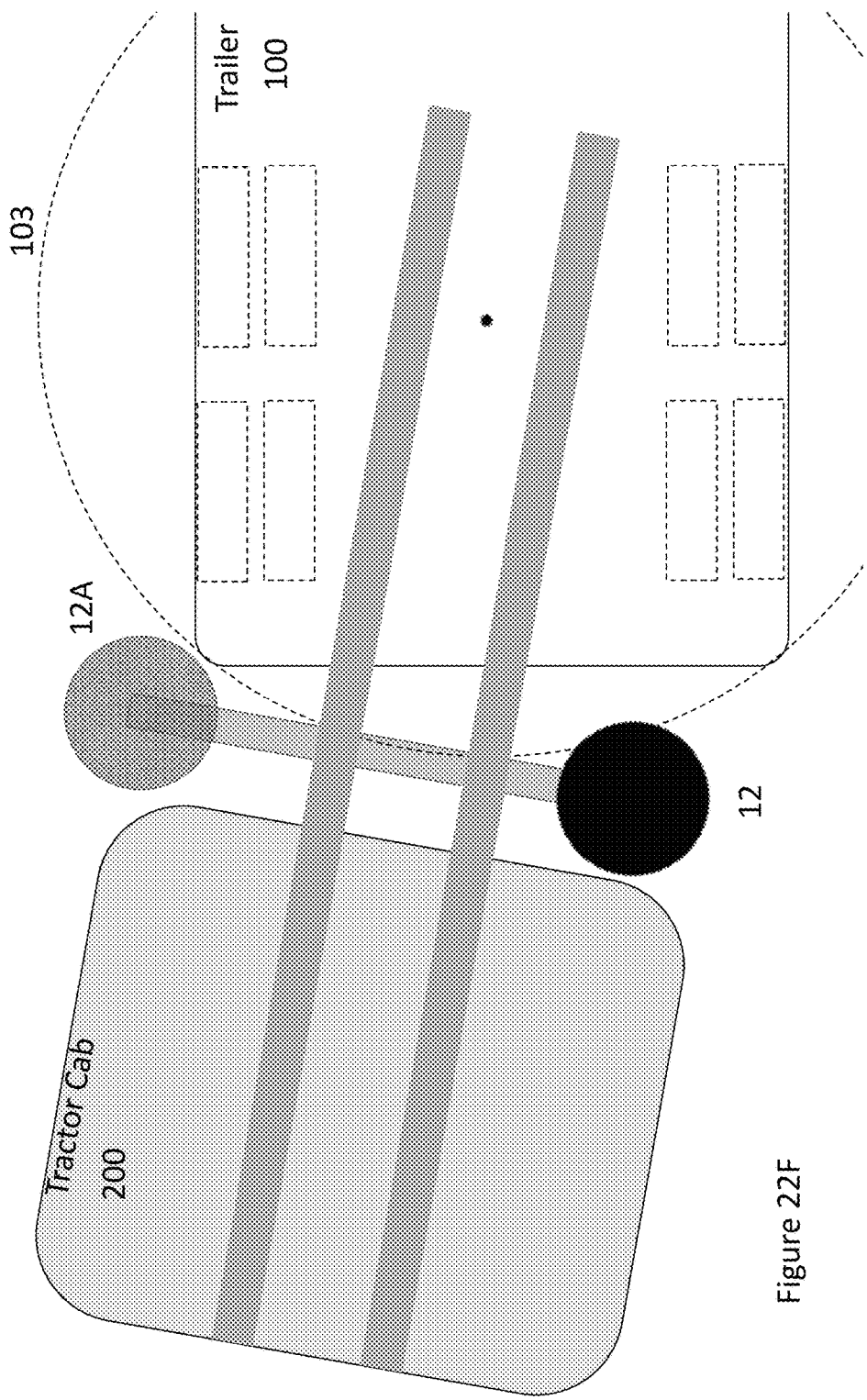

FIG. 22F shows an embodiment with two tanks 12, where one tank 12 is on each side of the tractor 200. In the configuration shown, the truck can be taking a right turn. The tank 12 on the right side of the truck is translated outward. The tank 12 on the left side of the truck can remain in its original position. In other embodiments, the tank 12 on the left side of the truck can translate outwards, as well.

FIG. 22G shows an embodiment with two tanks 12 where the trailer 100 has a refrigerator 400 mounted on the front. The tanks 12 can be oriented on the tractor 200 such that they do not interfere with the refrigerator 400 during regular turns, as shown by the interference radius 103. In some embodiments, the tanks 12 can be oriented on the tractor such that they do not interfere with the refrigerator 400 during turns while driving, such as turns under a certain degree angle. The tanks 12 can translate outwards during high angle turns or during certain maneuvers. In some embodiments, the tanks 12 can only translate when the truck is moving under a certain speed.

Figure 22H:
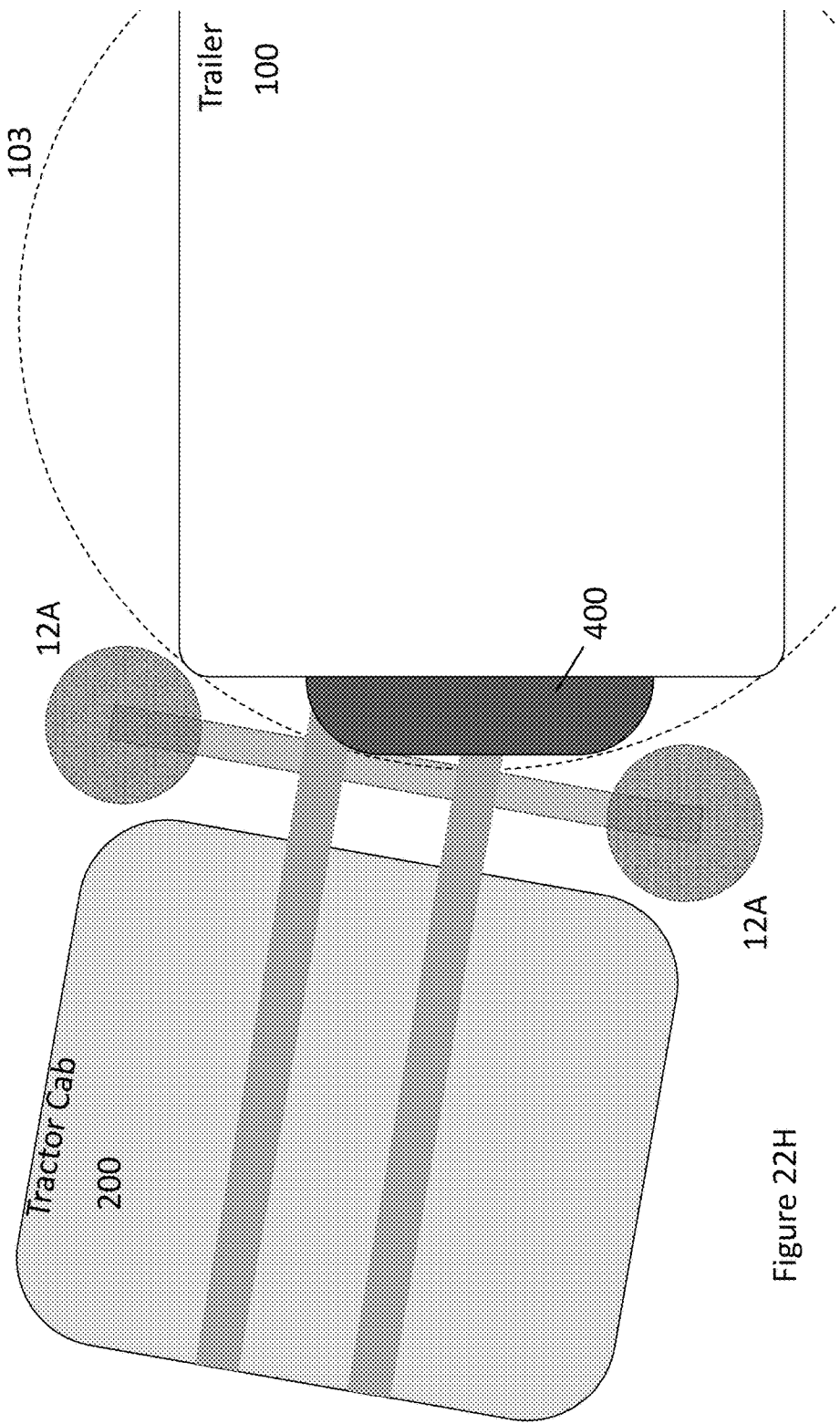

FIG. 22H shows an embodiment with two tanks 12 where the trailer 100 has a refrigerator 400 mounted on the front. As shown, the truck is taking a right-hand turn, and the tanks 12 are moved outward in order to avoid interference with the trailer 100 and/or refrigerator 400. In some embodiments, both tanks 12 move outward, while in other implementations only the tank 12 on the side of the truck in which the truck is turning moves outward.

Figure 23A:
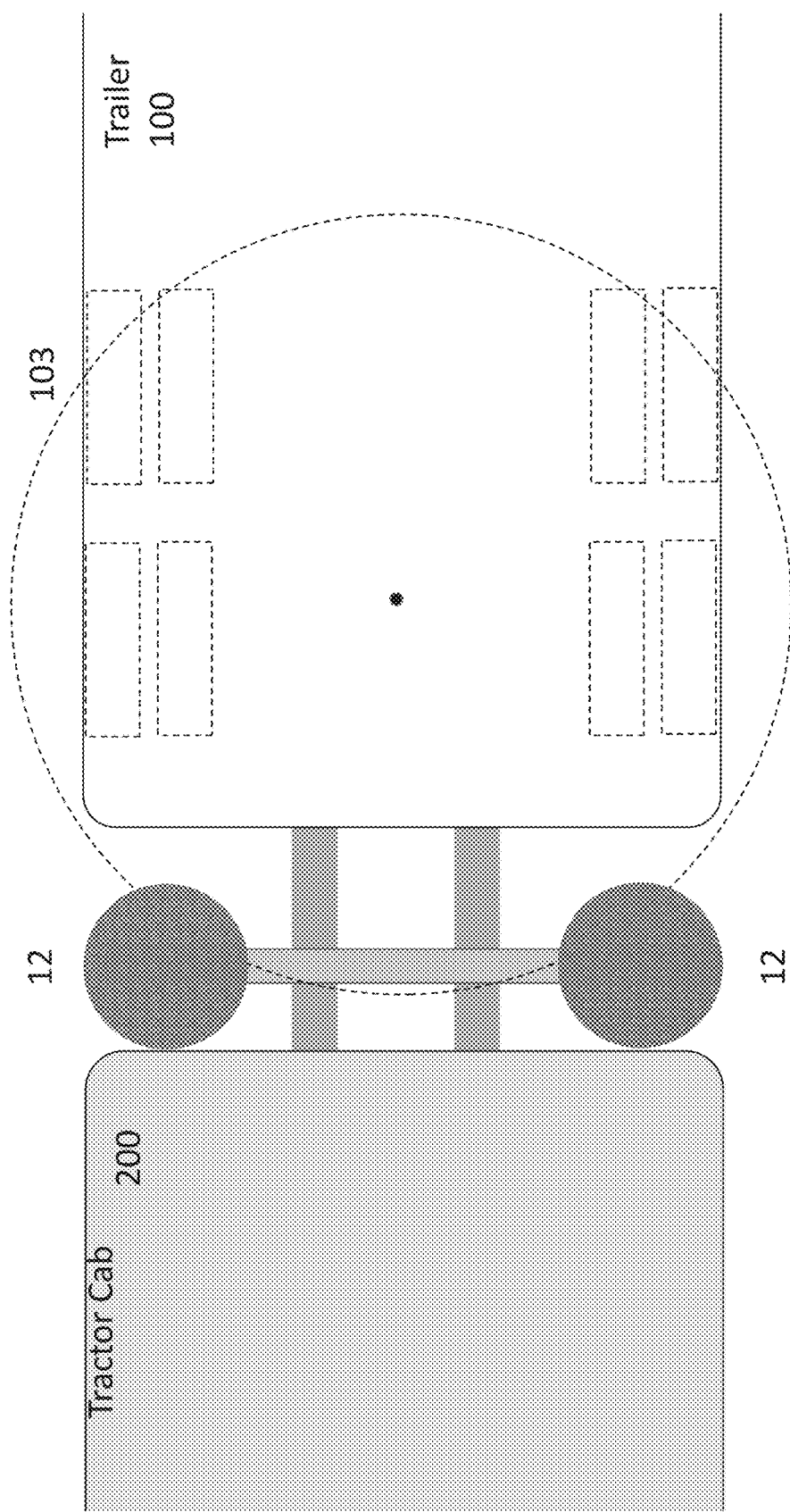
Figure 23C:
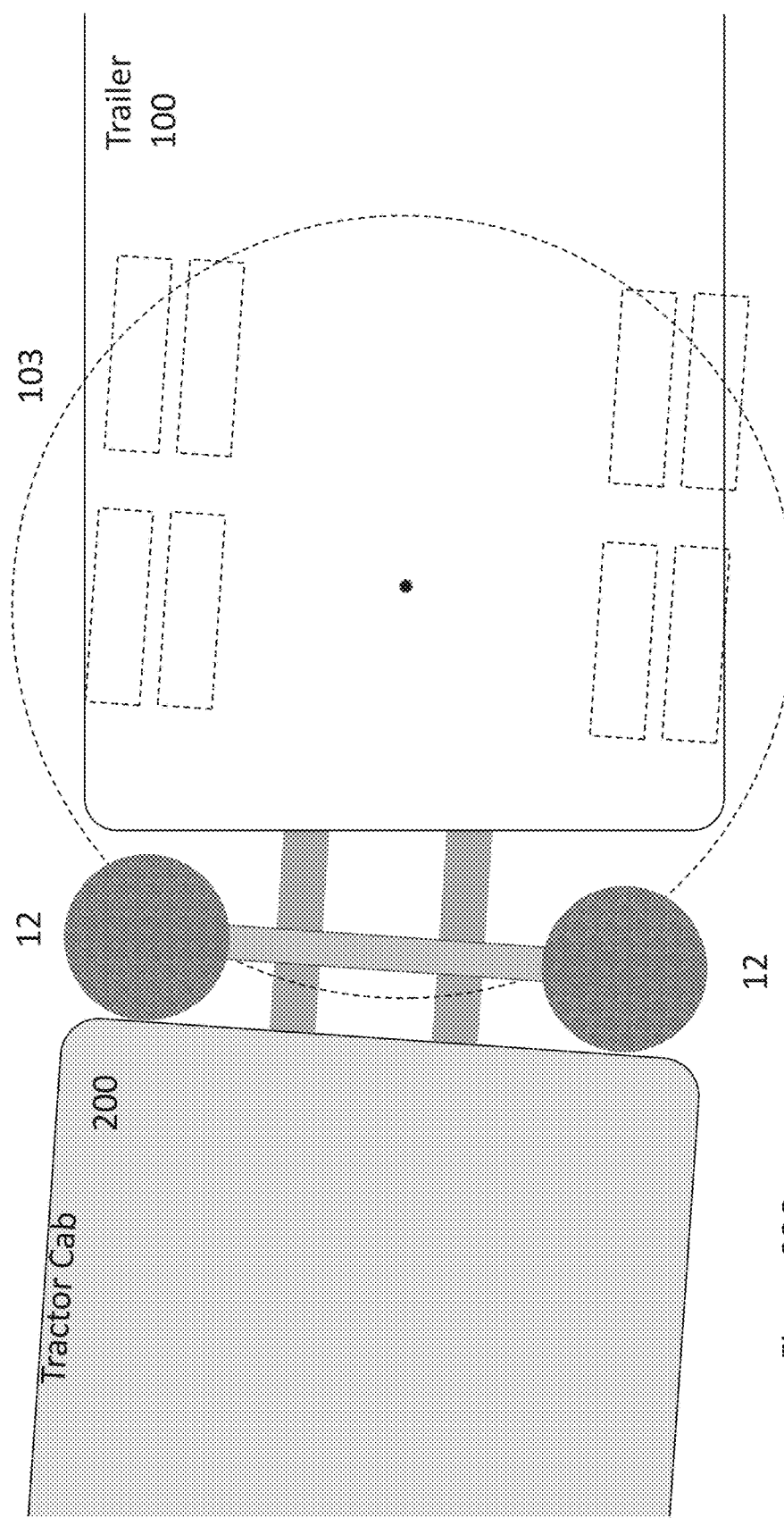
Figure 23D:
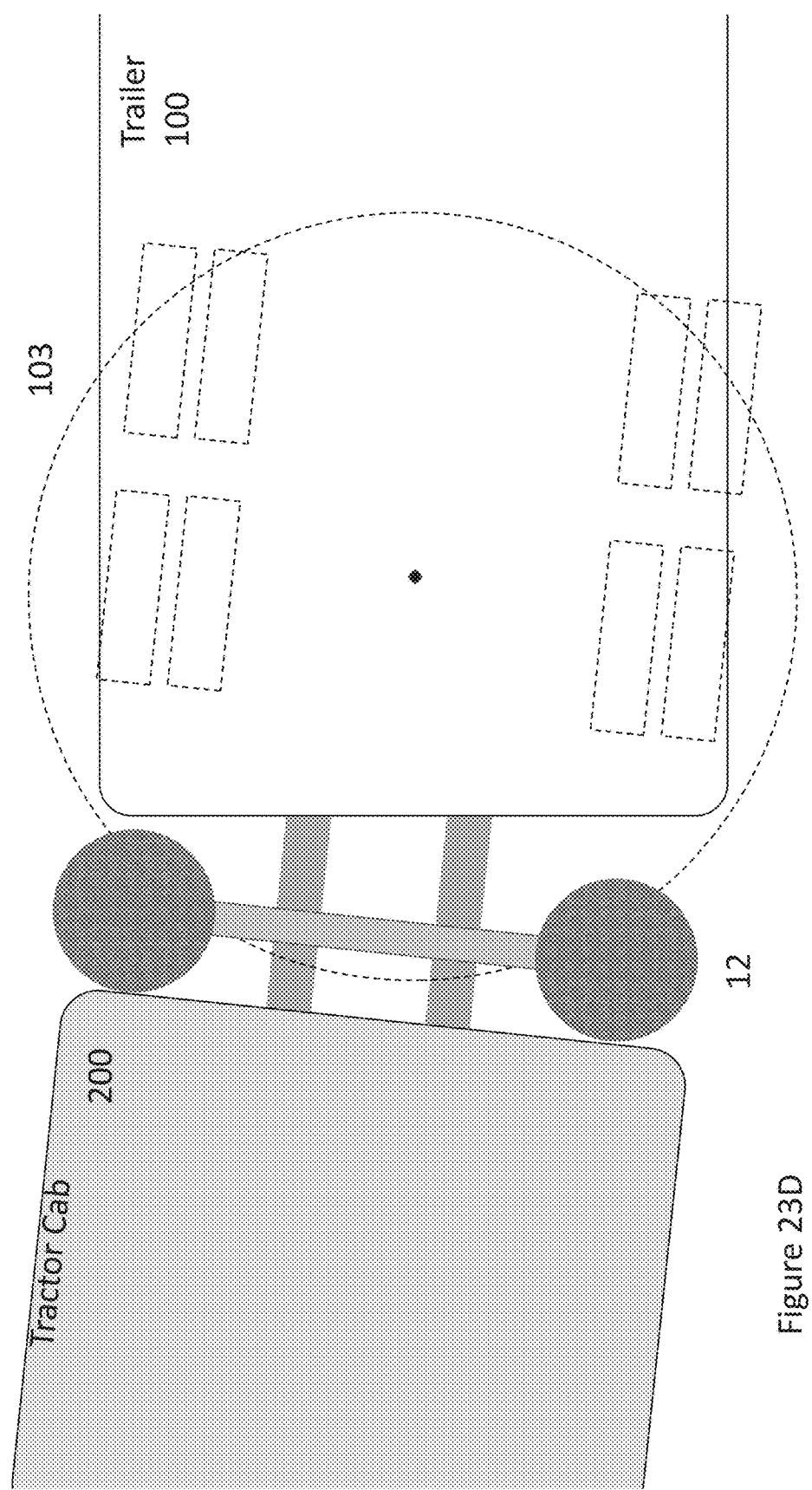
Figure 23E:
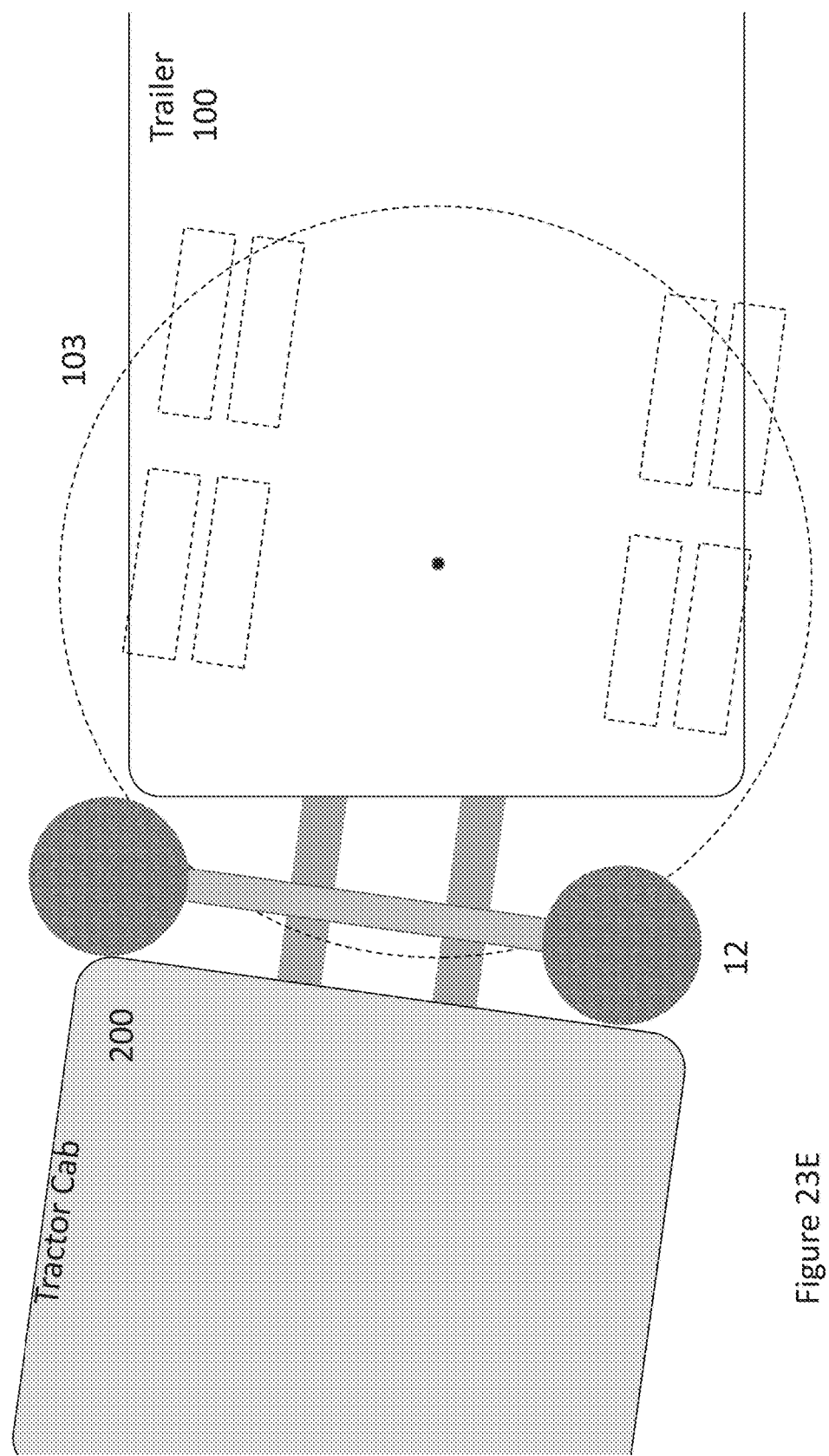
Figure 23F:
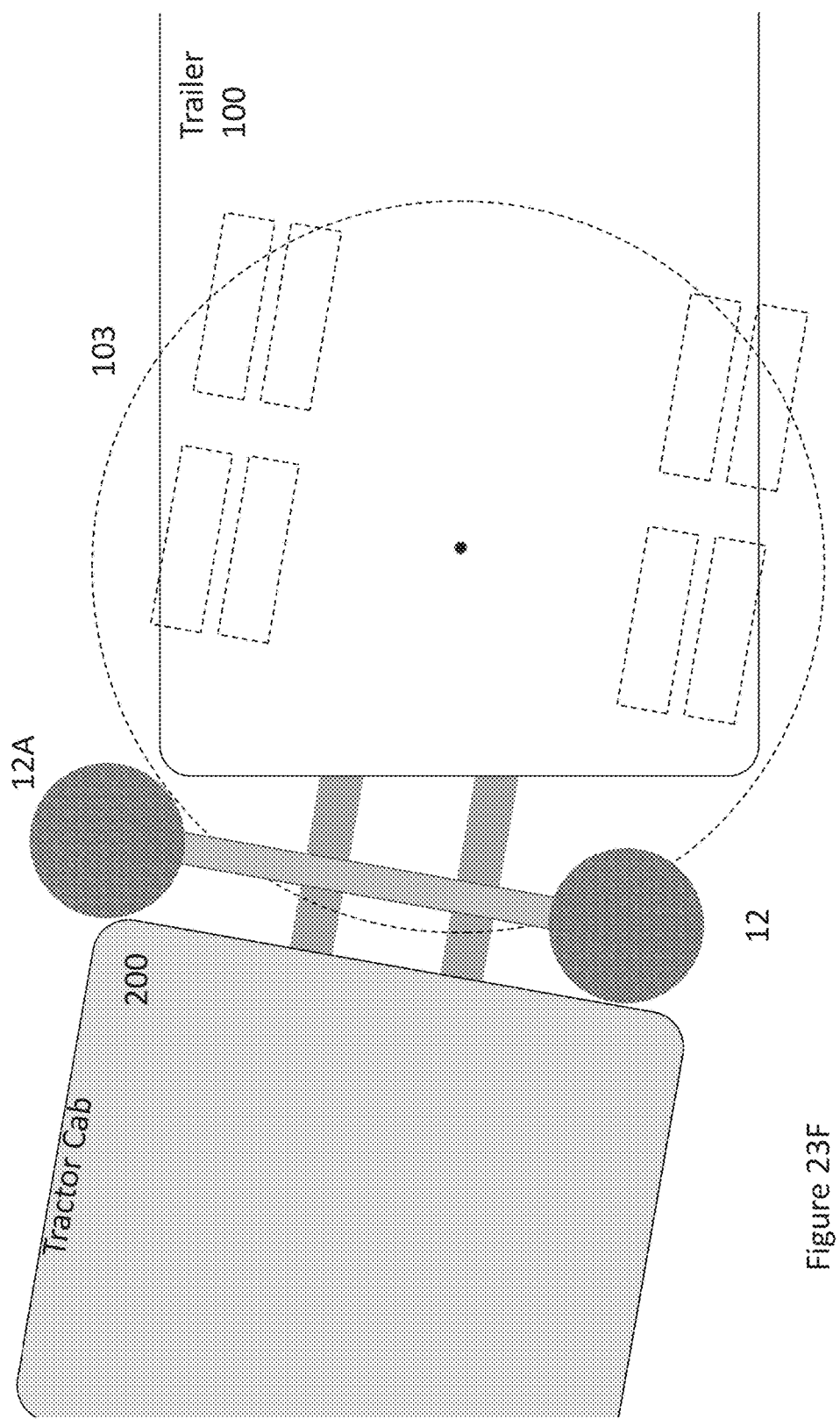

FIGS. 23A-F show top views of an exemplary progression of the tanks 12 as the truck turns to the right. In the embodiment shown, one tank 12 is mounted on each side of the tractor 200. In FIG. 23A, the tractor trailer truck is moving in a straight line. As the truck starts to turn, as shown in FIGS. 23B and 23C, the tanks move along interference radius 103. Thus, the control system has not yet determined that the tanks 12 need to be moved. When the truck begins to turn at a sharper angle, the control system sends signals that activate the horizontal control actuator. The right tank is then moved outside the interference radius 103 towards position 12A. This process starts in FIG. 23D and FIG. 23E, as the tank 12 moves further outside interference radius 103. In FIG. 23F, the right tank reaches position 12A, which is outside interference radius 12A.

Figure 24B:
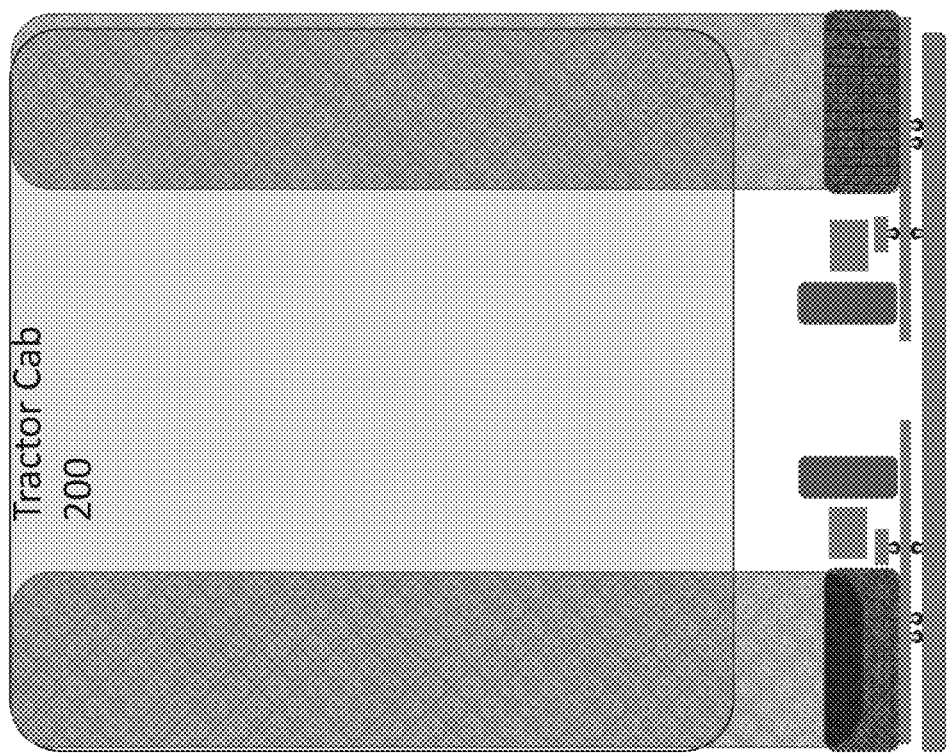
Figure 24C:
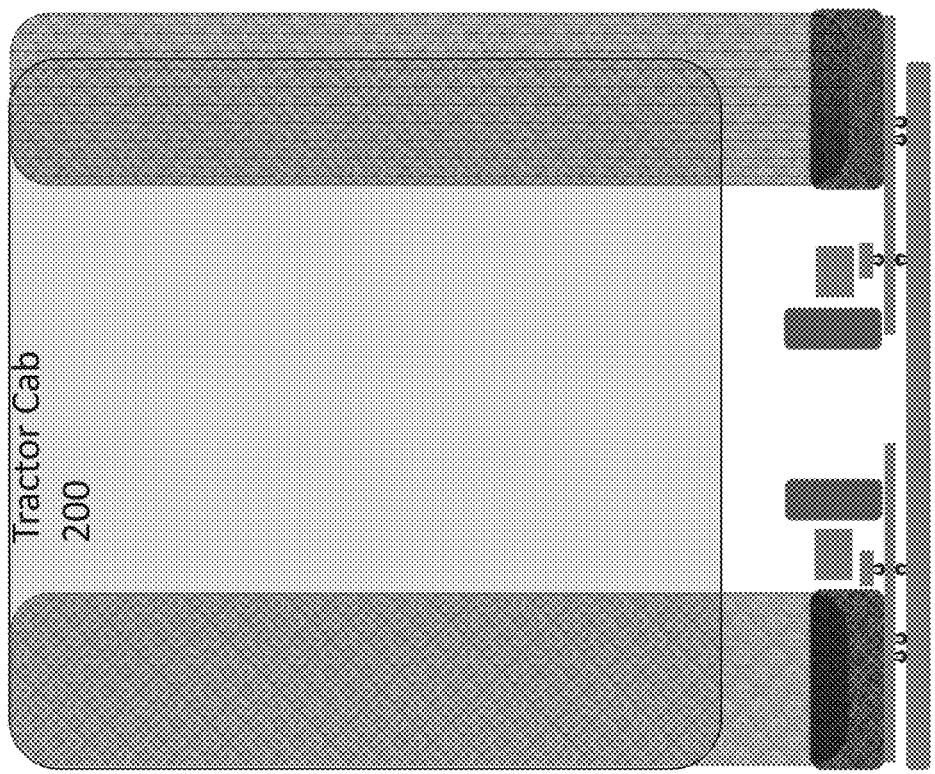
Figure 24D:
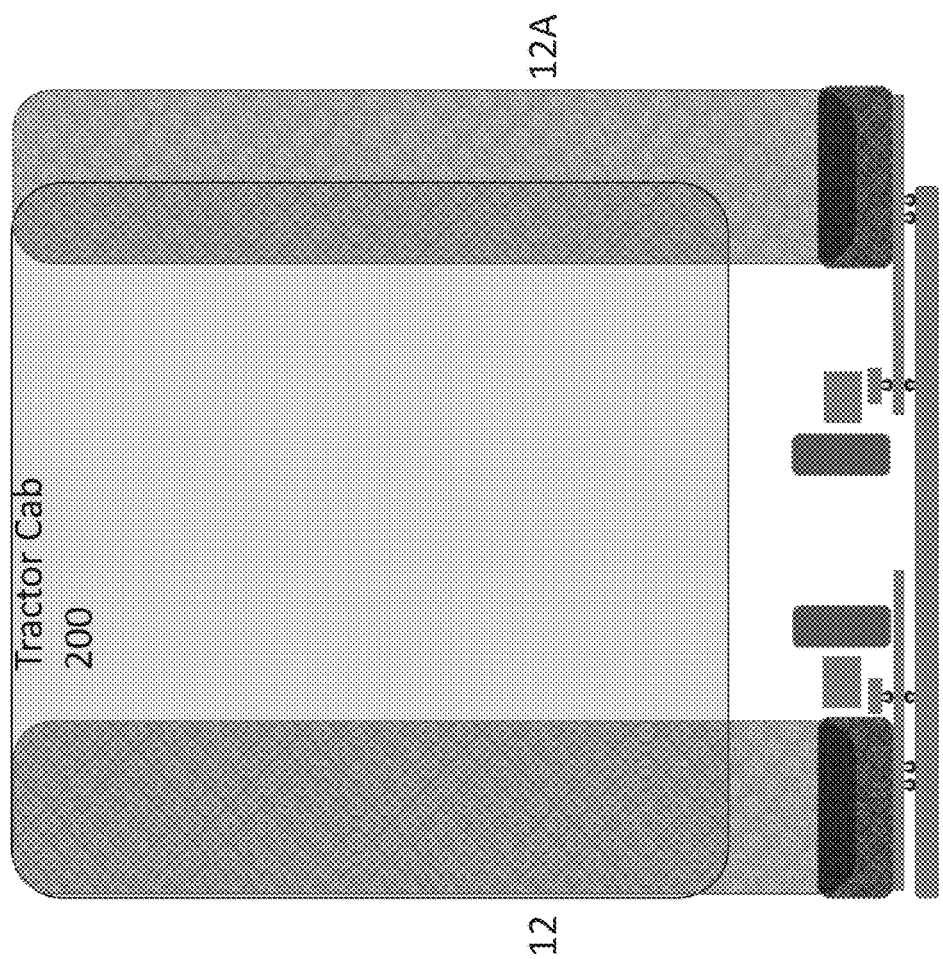

FIGS. 24A-D show a back view (i.e., looking from trailer 100 towards the back of tractor 200) of an embodiment showing an exemplary progression of the tanks 12 as the truck turns to the right. In FIG. 24A, both tanks 12 are in their original position, and in FIGS. 24B and 24C, the right tank moves outward—e.g., using a translation jack—until it reaches position 12A in FIG. 24D. In some embodiments, position 12A may be further outside of the outer perimeter of tractor 200 than is shown in FIG. 24D; in other embodiments, position 12A may be closer to the outer perimeter of tractor 200.

Figure 25A:
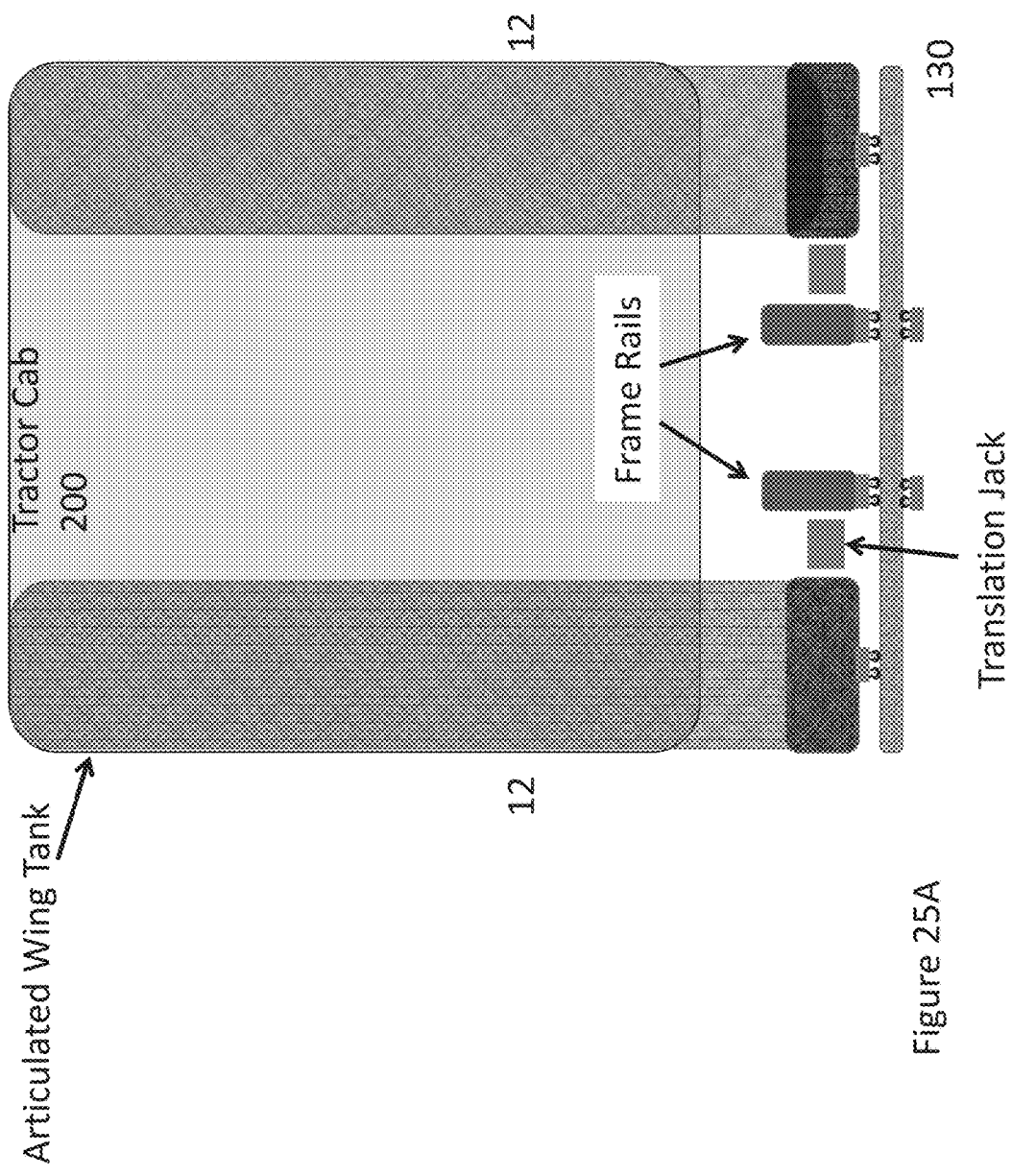
FIGS. 25A-G show a view towards the back of the tractor according to some embodiments, where the CNG tanks are moved outward to avoid interference with the trailer.
Figure 25B:
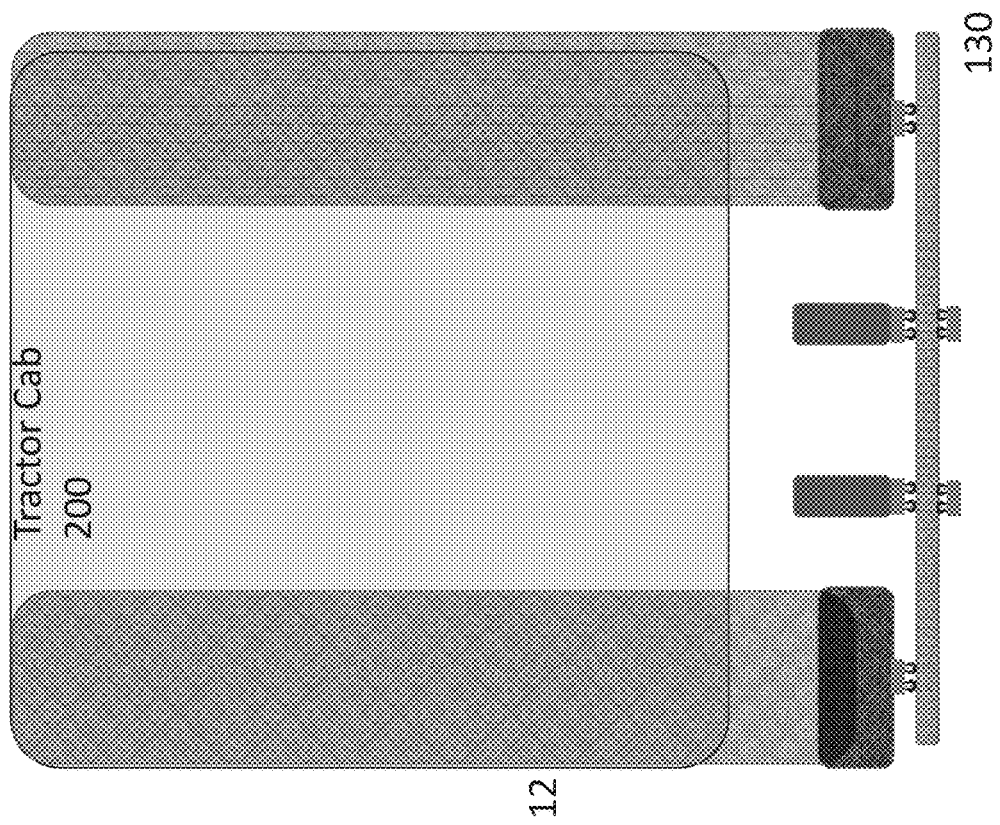
Figure 25C:
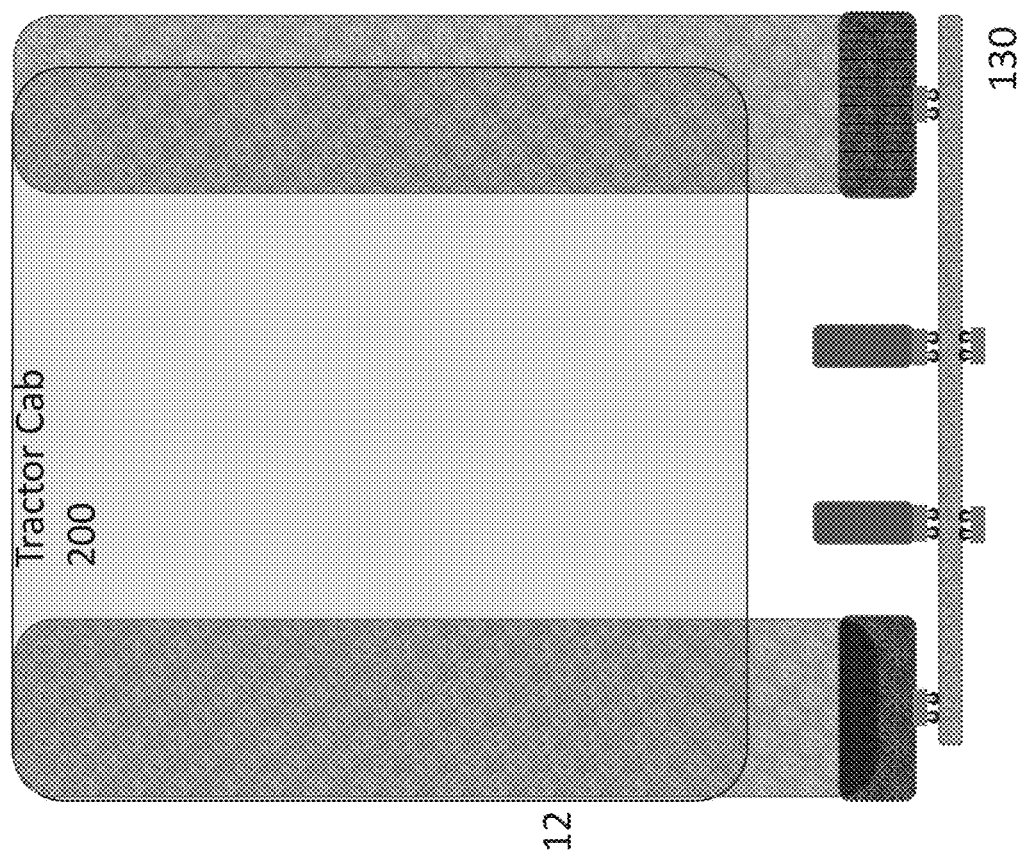
Figure 25D:
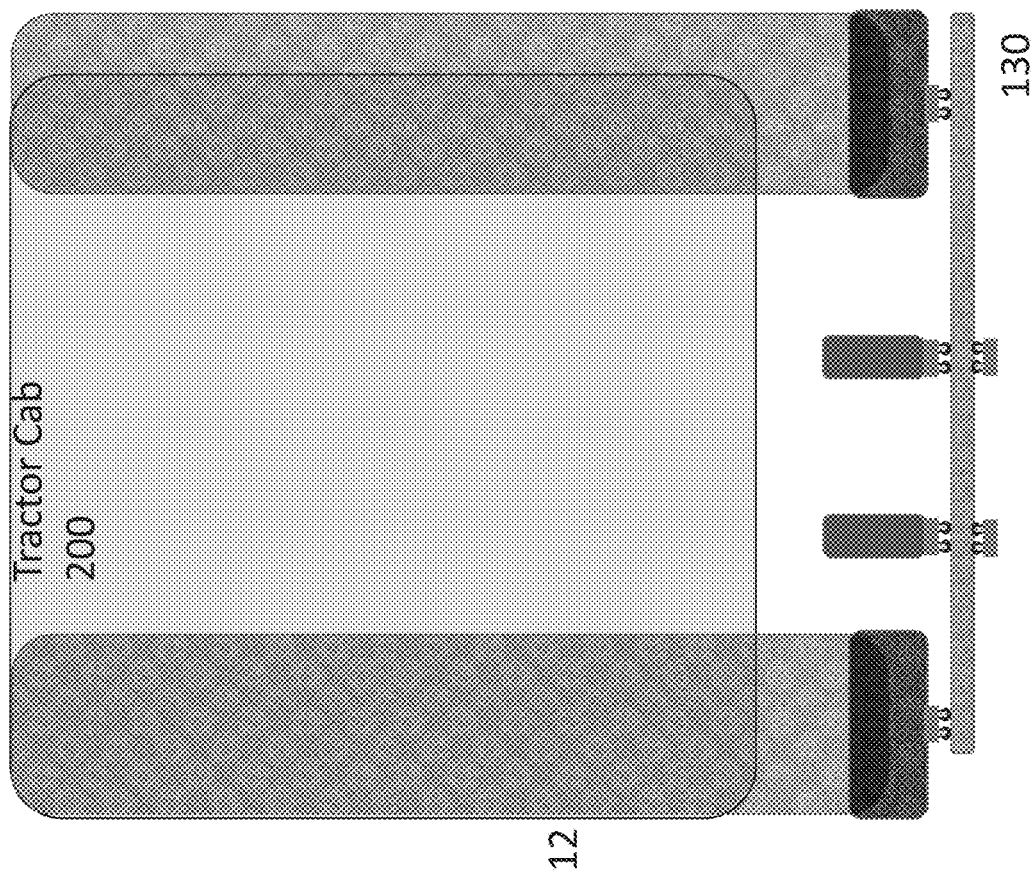
Figure 25E:
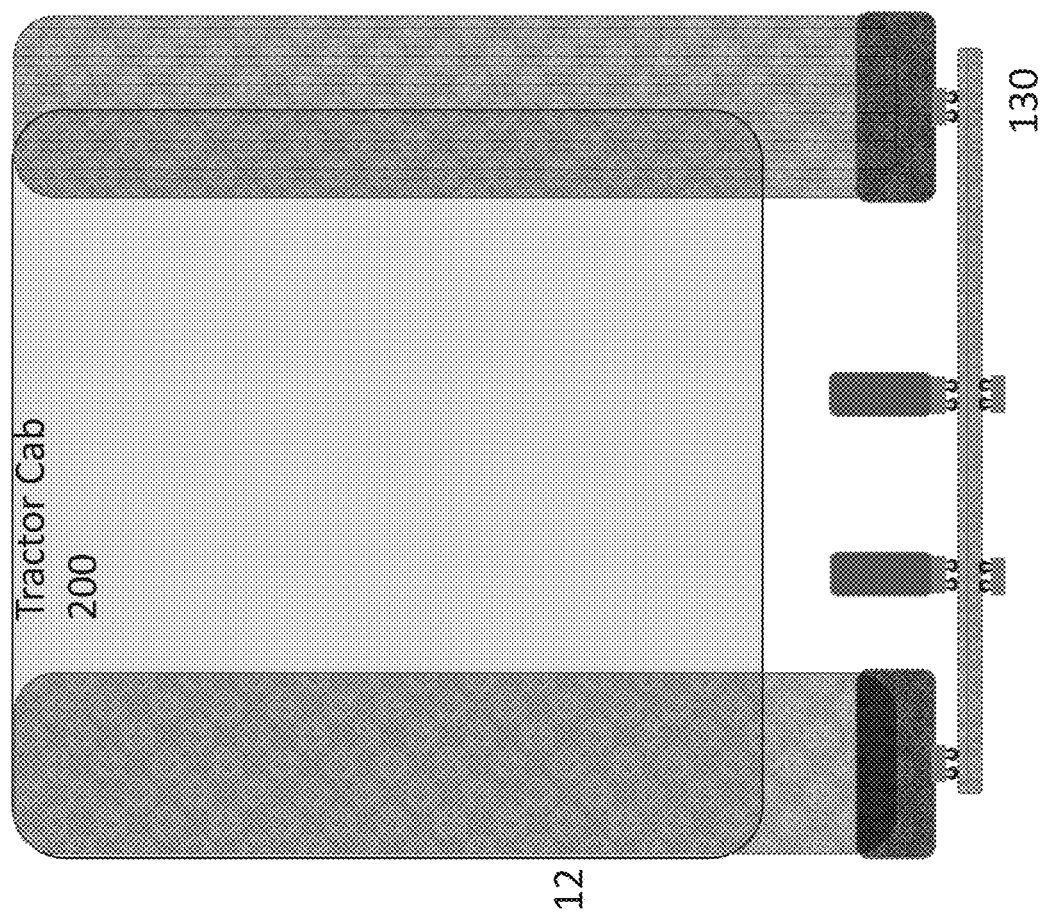
Figure 25F:
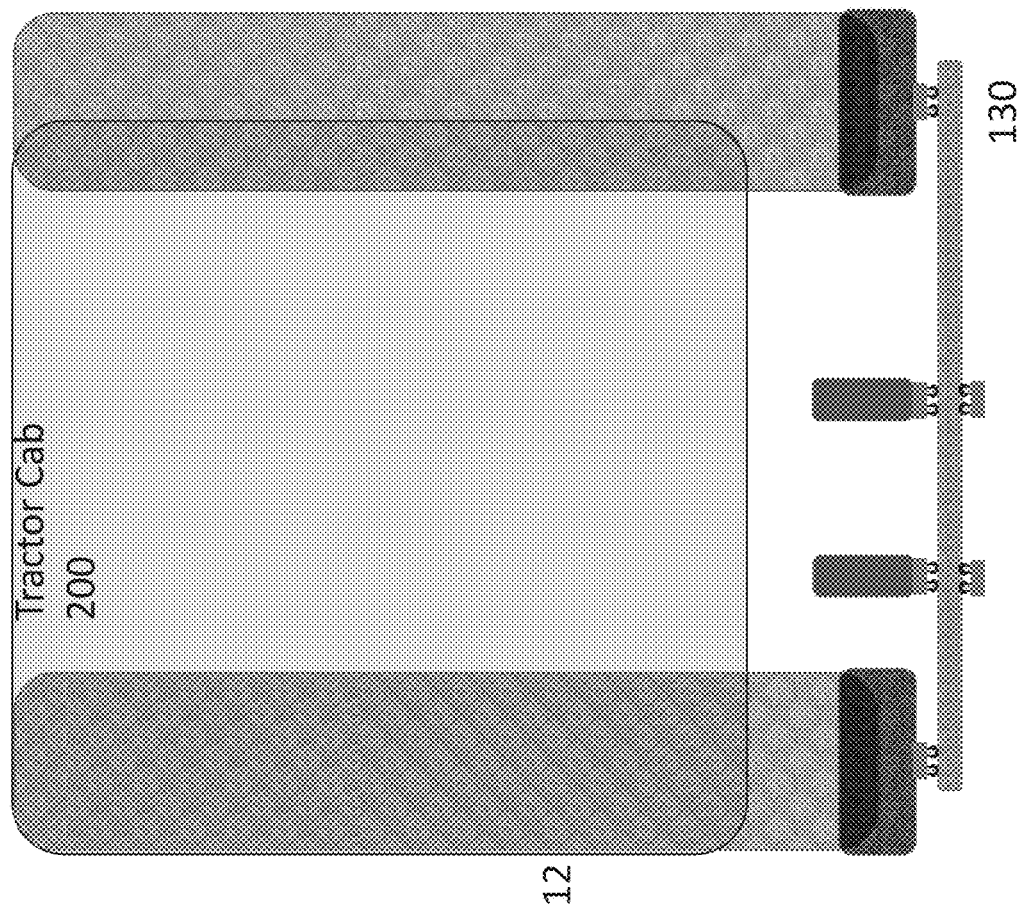
Figure 25G:
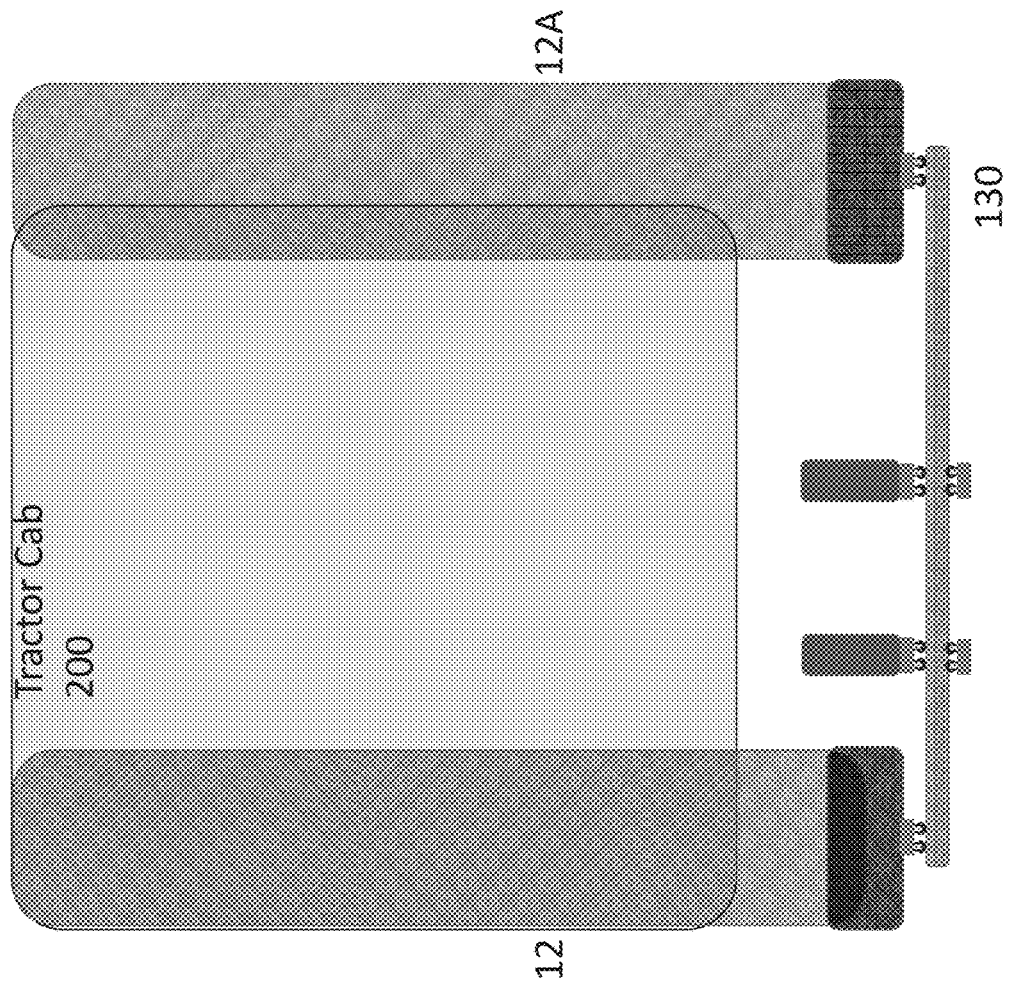

FIGS. 25A-G show a back view of another embodiment where the tanks 12 move as the truck turns to the right. In FIG. 25A, both tanks 12 are in their original position. The tanks 12 are mounted on beam 130. In FIGS. 25B and 25C, the beam 130 translates towards the right side. The right tank stays fixed in relation to the beam 130, while the left tank stays fixed in relation to the tractor 200 as the beam 130 moves to the right. As shown in FIG. 25D, once the beam 130 has moved to its farthest rightwards position, the right tank 12 may translate to the right along the beam 130, as shown in FIGS. 25E and 25F.

Figure 26:
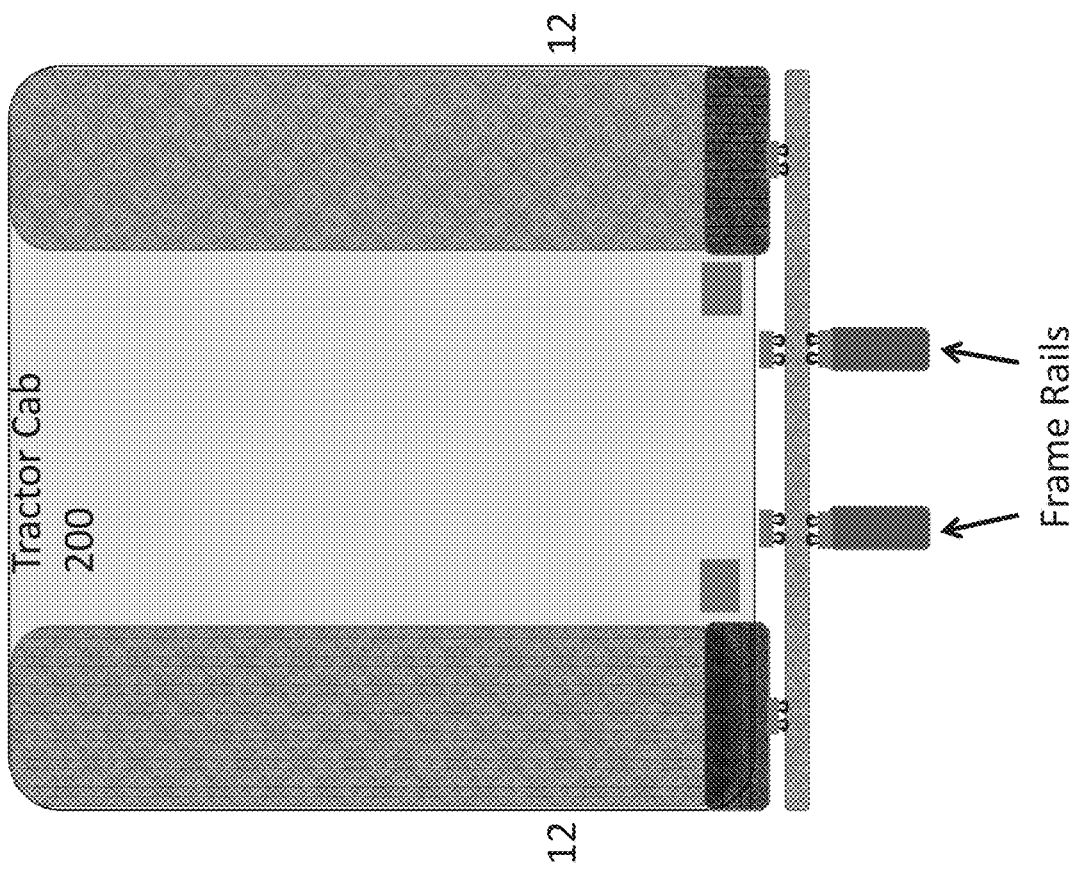
FIG. 26 shows a view towards the back of the trailer of an embodiment with the tanks mounted on top of the frame rails.

In some embodiments, the tanks may be positioned on top of the frame rails, as shown in FIG. 26. This may reduce the volume of the tanks, e.g., about 10%.

Figure 27:
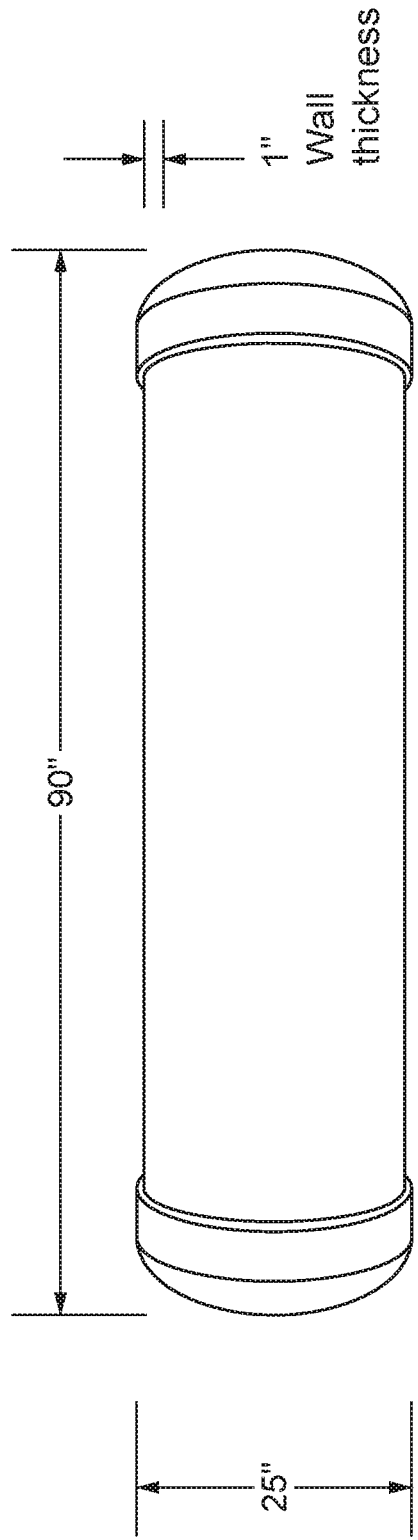
FIG. 27 shows a CNG tank that may be used in some embodiments.

In some embodiments, the CNG tanks may be from Quantum Technologies, as shown in FIG. 27. Such a tank may have a CNG capacity of 46.5 diesel gallons equivalent (DGE), with a tank volume of 159 gallons, a tank weight of 253 lbs., and a weight full of 508 lbs. When the tank is filled with fast fill, the CNG capacity may be 37 DGE with a weight full of 450 lbs.

Figure 28:
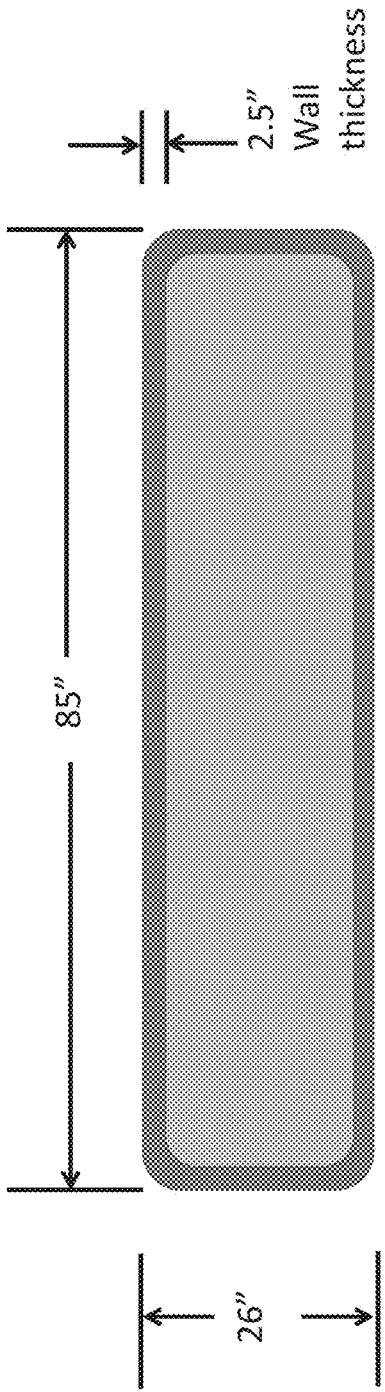
FIG. 28 shows an LNG tank that may be used in some embodiments.

In some embodiments, LNG Tanks may be the Westport Ice Pack 120 shown in FIG. 28. This tank may have a capacity of 60 DGE, a tank volume of 120 gallons, a tank weight of 900 lbs., and a weight full of 1200 lbs. In some embodiments, the Blu V2 LNG Fuel Tanks may also be used.

Figure 29:
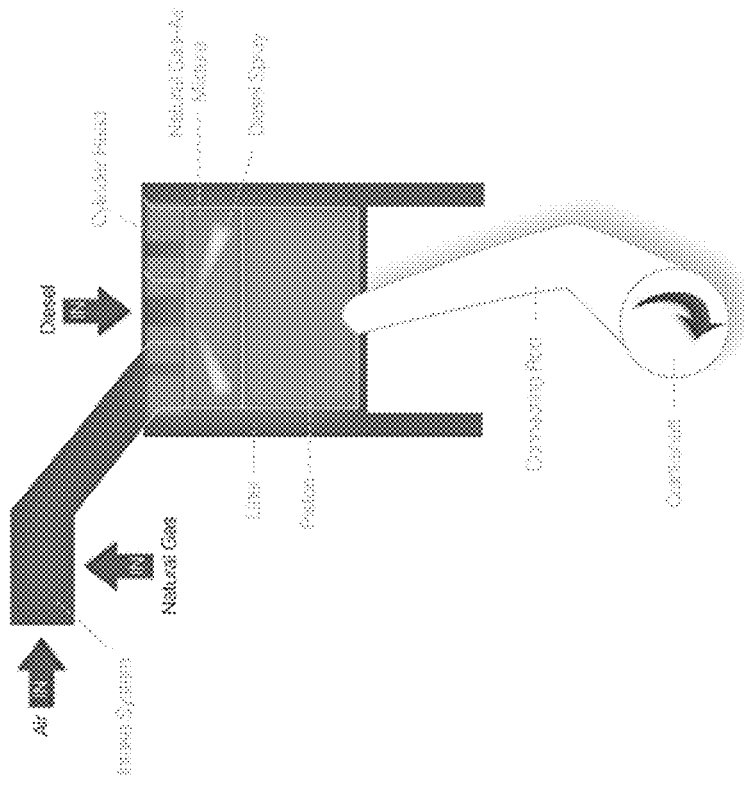
FIG. 29 shows a dual fuel engine that may be used in some embodiments.

In each of the embodiments discussed throughout this disclosure, CNG, LNG, and/or diesel may be used. It may be advantageous, for example, to use a CNG and diesel combination, and, as such, a dual fuel engine may be used. An exemplary dual fuel engine is shown in FIG. 29. Such a dual fuel engine (e.g., diesel and CNG) may be based on a diesel engine that has dual fuel-specific hardware added thereto. When the engine is operating in dual fuel mode, natural gas may be introduced into the intake system. The air-to-natural gas mixture from the intake may be drawn into the cylinder, just as it would be in a spark-ignited engine, but with a leaner air-to-fuel ratio. Near the end of the compression stroke, diesel fuel may be injected, just as it would be in a traditional diesel engine. The diesel fuel ignites, and the diesel combustion causes the natural gas to burn. A dual fuel engine can operate either on all diesel fuel or the substitution mixture of diesel and natural gas, but it may be unable to operate on natural gas alone. Dual fuel engines deliver the same power density, torque curve and transient response as the base diesel engine does.

The Westport™ HPDI 2.0 natural gas engine may be used. This engine may be capable of delivering performance and fuel economy equivalent to that of current high performance diesel-fueled engines, but with diesel substitution of over 90%. The Clean Air Power Dual Fuel Engine, Genesis-EDGE Dual-Fuel product, or Solaris dual fuel systems may also be used. In some embodiments, a conversion kit, such as a Peake Fuel Solutions Dual-Fuel Conversion Kit may also be implemented.

As used in this specification, a module can be, for example, any assembly and/or set of operatively-coupled electrical components associated with performing a specific function(s), and can include, for example, a memory, a processor, electrical traces, optical connectors, software (that is stored in memory and/or executing in hardware) and/or the like.

As used in this specification, the singular forms "a," "an" and "the" include plural referents unless the context clearly dictates otherwise. Thus, for example, the term "an actuator" is intended to mean a single actuator or a combination of actuators.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described embodiments.

Some embodiments of the items tracking techniques described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The invention claimed is:

1. An articulated wing system for a vehicle, the system comprising:
   a moveable support structure attached to at least a first tank;
   at least one sensor; and
   a controller configured to cause the support structure to translate a position of the first tank a translation distance relative to the vehicle wherein the translation distance is based upon a signal from the at least one sensor and an interference radius associated with the vehicle.

2. The system of claim 1, wherein the vehicle includes a pair of frame rails extending parallel to a longitudinal axis of the vehicle, the moveable support structure being configured for attachment to the pair of frame rails.

3. The system of claim 2, wherein the moveable support structure includes at least one horizontal translation actuator attached to the first tank, the horizontal translation actuator moving the first tank in a direction perpendicular to a longitudinal axis of the vehicle.

4. The system of claim 3, wherein the moveable support structure includes a horizontal support bar fixedly attached to the pair of frame rails and wherein the at least one horizontal translation actuator is fixedly attached to the horizontal support bar.

5. The system of claim 1, wherein the moveable support structure is further attached to a second tank and wherein the first tank and the second tank are positioned on opposite sides of a longitudinal axis of the vehicle and are intersected by a line perpendicular to the longitudinal axis.

6. The system of claim 1, wherein the at least one sensor comprises at least one of an angle sensor and a position sensor.

7. The system of claim 1, wherein the at least one sensor comprises a GPS sensor.

8. The system of claim 1, wherein the vehicle comprises a tractor and the at least one sensor is configured to provide a signal indicative of at least one of: whether a trailer is mounted on the tractor, an angle between the tractor and a trailer connected to the tractor, and a steering angle of the tractor.

9. An articulated wing system for a tractor, the system comprising:
    a moveable support structure attached to a first tank and a second tank;
    at least one sensor; and
    a controller configured to cause the support structure to translate a position of at least one of the first tank and the second tank a translation distance relative to a longitudinal axis of the vehicle wherein the translation distance is based upon a signal from the at least one sensor and an interference radius associated with the vehicle.

10. The system of claim 9, wherein the tractor includes a pair of frame rails extending parallel to the longitudinal axis, the moveable support structure being attached to the pair of frame rails.

11. The system of claim 10, wherein the moveable support structure includes a first horizontal translation actuator attached to the first tank and a second horizontal translation actuator attached to the second tank, the first horizontal translation actuator and the second horizontal translation actuator being configured to move the first tank and the second tanks, respectively, along a transverse axis substantially perpendicular to the longitudinal axis.

12. A method for moving at least one tank associated with a vehicle connected to a trailer, the method comprising:
    receiving, from at least one sensor, a signal indicative of at least one of a steering angle of the vehicle and an angle between the vehicle and the trailer;
    generating, based upon the signal and an interference radius associated with the vehicle, a tank position command; and
    translating a position of the at least one tank a translation distance relative to the vehicle in response to the tank position command.

13. The method of claim 12, wherein the translating is along a transverse axis perpendicular to a longitudinal axis of the vehicle.

14. The method of claim 12, wherein the tank position command is received by a horizontal translation actuator configured to translate the at least one tank along a transverse axis perpendicular to a longitudinal axis of the vehicle.

15. A vehicle, comprising:
    a first tank and a second tank containing fuel for the vehicle;
    a pair of frame rails extending parallel to a longitudinal axis of the vehicle; and
    an articulated wing system including:
        a moveable support structure attached to the pair of frame rails, the first tank and the second tank;
        at least one sensor; and
        a controller configured to cause the support structure to translate, based upon signals from the at least one sensor and an interference radius associated with the vehicle, positions of the first tank and the second tank along a transverse axis intersecting the longitudinal axis.

16. An articulated wing tank system for a vehicle, the system comprising:
    a first tank;
    a second tank;
    a moveable support structure configured to move the first tank and the second tank, the moveable support structure including a first horizontal translation actuator attached to the first tank and a second horizontal translation actuator attached to the second tank;
    at least one sensor; and
    a controller configured to send tank position commands to the first horizontal translation actuator and the second horizontal translation actuator in response to signals from the at least one sensor wherein the tank position commands cause the at least one of the first tank and the second tank to move a translation distance wherein the translation distance is based upon the signals and an interference radius associate with the vehicle.

17. The system of claim 16, wherein the at least one sensor comprises at least one of an angle sensor and a position sensor.

18. The system of claim 16, wherein the vehicle is a tractor and wherein the at least one sensor is configured to detect at least one of: whether a trailer is mounted on the tractor, a tractor angle, a steering angle, a tractor speed, and GPS data.

19. The system of claim 16, wherein the moveable support structure is fixedly attached to at least one of the first tank and the second tank.

20. The system of claim 16, wherein the moveable support structure further includes a horizontal support bar fixedly attached to frame rails associated with the vehicle and wherein the first horizontal translation actuator and the second horizontal translation actuator are fixedly attached to the horizontal support bar.

21. The system of claim 16, wherein the first horizontal translation actuator and the second horizontal translation actuator operate using a compressed air system associated with the vehicle.

22. The system of claim 16, wherein the signal indicates that the vehicle is taking a sharp turn.

23. The system of claim 22, wherein the controller is configured to send a command to one of the first horizontal translation actuator and the second horizontal translation actuator in response to at least one of the signals.

24. The system of claim 22, wherein the controller is configured to send commands to each of the first horizontal translation actuator and the second horizontal translation actuator in response to the signals.

25. The system of claim 16, wherein the vehicle is a tractor and wherein the first tank, the second tank and the moveable support structures are positioned in an area between the tractor and a trailer.

26. The system of claim 16, wherein the controller is configured to determine, based on at least one of the signals, that at least one of the first tank and the second tank is within an interference radius associated with the tractor and a trailer.

27. The system of claim 16, wherein the first tank is positioned behind the vehicle and left of a longitudinal axis of the vehicle and the second tank is positioned behind the vehicle and right of the longitudinal axis of the vehicle and wherein a first of the tank position commands causes the first horizontal translation actuator to move the first tank and a second of the tank position commands causes the second horizontal translation actuator to move the second tank wherein the first of the tank position commands and the second of the tank position commands are generated by the controller in response to one of the signals indicative of a left turn and a right turn, respectively.

* * * * *